US012777171B2

(12) United States Patent
Xu

(10) Patent No.: US 12,777,171 B2
(45) Date of Patent: Oct. 27, 2026

(54) CODING/DECODING METHOD AND DEVICE, AND STORAGE MEDIUM

(71) Applicant: Hangzhou Hikvision Digital Technology Co., Ltd., Hangzhou (CN)

(72) Inventor: Liying Xu, Hangzhou (CN)

(73) Assignee: Hangzhou Hikvision Digital Technology Co., LTD., Hangzhou (CN)

( * ) Notice: Subject to any disclaimer, the term of this patent is extended or adjusted under 35 U.S.C. 154(b) by 0 days.

(21) Appl. No.: 18/790,588

(22) Filed: Jul. 31, 2024

(65) Prior Publication Data

US 2024/0397062 A1 Nov. 28, 2024

Related U.S. Application Data

(63) Continuation of application No. 17/621,644, filed as application No. PCT/CN2020/097144 on Jun. 19, 2020, now Pat. No. 12,075,066.

(30) Foreign Application Priority Data

Jun. 21, 2019 (CN) ......................... 201910545251.0

(51) Int. Cl.
*H04N 19/186* (2014.01)
*H04N 19/103* (2014.01)
(Continued)

(52) U.S. Cl.
CPC ......... *H04N 19/186* (2014.11); *H04N 19/103* (2014.11); *H04N 19/147* (2014.11);
(Continued)

(58) Field of Classification Search
CPC .. H04N 19/186; H04N 19/103; H04N 19/147; H04N 19/176; H04N 19/18; H04N 19/70
See application file for complete search history.

(56) References Cited

U.S. PATENT DOCUMENTS 4,549,304 A 10/1985 Weirich et al.
10,390,021 B2 8/2019 Xu et al.
(Continued)

FOREIGN PATENT DOCUMENTS

CN 101106721 A 1/2008
CN 102857763 A 1/2013
(Continued)

OTHER PUBLICATIONS

International search report of PCT application No. PCT/CN2020/097144 issued on Sep. 29, 2020.
(Continued)

*Primary Examiner* — On S Mung
(74) *Attorney, Agent, or Firm* — Knobbe, Martens, Olson & Bear, LLP

(57) ABSTRACT

The present application discloses a coding/decoding method and device, and a storage medium thereof, and belongs to the field of image processing technologies. The method includes: predicting, when a multi-reference line prediction mode is enabled for a current block, the current block based on a target reference line when the current block is predicted according to the multi-reference line prediction mode, wherein the target reference line is determined based on reference line indication information; wherein the reference line indication information is configured to indicate index information of the target reference line used in predicting the current block based on the multi-reference line prediction mode, and the target reference line is one line selected from candidate reference lines, which are three lines and three columns closest to a boundary of the current block, wherein the number of the candidate reference lines corresponding to the multi-reference line prediction mode is 3.

18 Claims, 31 Drawing Sheets

(51) Int. Cl.

| | |
|---|---|
| ***H04N 19/147*** | (2014.01) |
| ***H04N 19/176*** | (2014.01) |
| ***H04N 19/18*** | (2014.01) |
| ***H04N 19/70*** | (2014.01) |

(52) U.S. Cl.

CPC ........... *H04N 19/176* (2014.11); *H04N 19/18* (2014.11); *H04N 19/70* (2014.11)

(56) References Cited

U.S. PATENT DOCUMENTS

| | | | |
|---|---|---|---|
| 2010/0316132 | A1 | 12/2010 | Macinnis |
| 2012/0081241 | A1 | 4/2012 | Misra et al. |
| 2013/0034152 | A1 | 2/2013 | Song et al. |
| 2013/0114668 | A1 | 5/2013 | Misra et al. |
| 2013/0121416 | A1 | 5/2013 | He et al. |
| 2013/0142255 | A1 | 6/2013 | Matsunobu et al. |
| 2014/0092991 | A1 | 4/2014 | Sullivan et al. |
| 2014/0098859 | A1 | 4/2014 | Lim et al. |
| 2014/0226719 | A1 | 8/2014 | Yamamoto et al. |
| 2014/0254677 | A1 | 9/2014 | Oh et al. |
| 2015/0189289 | A1 | 7/2015 | Kim et al. |
| 2015/0264354 | A1 | 9/2015 | Zhang et al. |
| 2015/0296217 | A1 | 10/2015 | Song et al. |
| 2016/0105682 | A1 | 4/2016 | Rapaka et al. |
| 2016/0191953 | A1 | 6/2016 | Wang et al. |
| 2016/0269738 | A1 | 9/2016 | Henry et al. |
| 2016/0330471 | A1 | 11/2016 | Zhu et al. |
| 2017/0272757 | A1 | 9/2017 | Xu et al. |
| 2017/0289572 | A1 | 10/2017 | Ye et al. |
| 2017/0295380 | A1 | 10/2017 | Huang et al. |
| 2017/0339403 | A1 | 11/2017 | Min et al. |
| 2018/0332284 | A1 | 11/2018 | Liu et al. |
| 2018/0343469 | A1 | 11/2018 | Jin et al. |
| 2019/0141318 | A1 | 5/2019 | Li et al. |
| 2019/0182481 | A1 | 6/2019 | Lee |
| 2019/0222837 | A1 | 7/2019 | Lee et al. |
| 2019/0238835 | A1 | 8/2019 | Lee |
| 2019/0238839 | A1 | 8/2019 | Ikeda |
| 2019/0306494 | A1* | 10/2019 | Chang .................. H04N 19/105 |
| 2019/0306516 | A1 | 10/2019 | Misra et al. |
| 2019/0313116 | A1 | 10/2019 | Lee |
| 2019/0320200 | A1 | 10/2019 | Heo |
| 2020/0045305 | A1 | 2/2020 | Jang et al. |
| 2020/0260111 | A1 | 8/2020 | Liu et al. |
| 2020/0288172 | A1 | 9/2020 | Huang et al. |
| 2020/0329257 | A1 | 10/2020 | Zhao et al. |
| 2021/0092413 | A1 | 3/2021 | Tsukuba |
| 2022/0070460 | A1 | 3/2022 | Ikonin et al. |
| 2022/0070473 | A1 | 3/2022 | Ye et al. |
| 2022/0078425 | A1 | 3/2022 | Wang et al. |
| 2022/0360800 | A1 | 11/2022 | Xu |

FOREIGN PATENT DOCUMENTS

| | | | |
|---|---|---|---|
| CN | 102986213 | A | 3/2013 |
| CN | 103024384 | A | 4/2013 |
| CN | 103024389 | A | 4/2013 |
| CN | 103026707 | A | 4/2013 |
| CN | 103621099 | A | 3/2014 |
| CN | 104521232 | A | 4/2015 |
| CN | 104662906 | A | 5/2015 |
| CN | 105745928 | A | 7/2016 |
| CN | 105917650 | A | 8/2016 |
| CN | 106059593 | A | 10/2016 |
| CN | 106105203 | A | 11/2016 |
| CN | 106797471 | A | 5/2017 |
| CN | 106797479 | A | 5/2017 |
| CN | 107046642 | A | 8/2017 |
| CN | 108093264 | A | 5/2018 |
| CN | 108293116 | A | 7/2018 |
| CN | 108293128 | A | 7/2018 |
| CN | 108781297 | A | 11/2018 |
| CN | 109076221 | A | 12/2018 |
| CN | 109314782 | A | 2/2019 |
| CN | 109314783 | A | 2/2019 |
| CN | 109417628 | A | 3/2019 |
| CN | 109565591 | A | 4/2019 |
| CN | 109716773 | A | 5/2019 |
| CN | 109788285 | A | 5/2019 |
| CN | 109804632 | A | 5/2019 |
| CN | 109874011 | A | 6/2019 |
| CN | 109891892 | A | 6/2019 |
| CN | 110677655 | A | 1/2020 |
| CN | 110677663 | A | 1/2020 |
| CN | 110784712 | A | 2/2020 |
| EP | 1363458 | A2 | 11/2003 |
| EP | 3985970 | B1 | 9/2025 |
| JP | 3542572 | B2 | 7/2004 |
| JP | 2022529307 | A | 6/2022 |
| JP | 2022530480 | A | 6/2022 |
| JP | 2022537275 | A | 8/2022 |
| WO | 2014189236 | A1 | 11/2014 |
| WO | 2016048186 | A1 | 3/2016 |
| WO | 2016072611 | A1 | 5/2016 |
| WO | 2016202259 | A1 | 12/2016 |
| WO | 2017190288 | A1 | 11/2017 |
| WO | 2018016823 | A1 | 1/2018 |
| WO | 2018045332 | A1 | 3/2018 |
| WO | 2018062950 | A1 | 4/2018 |
| WO | 2018205950 | A1 | 11/2018 |
| WO | 2020214651 | A1 | 10/2020 |
| WO | 2020216376 | A1 | 10/2020 |
| WO | 2020218793 | A1 | 10/2020 |
| WO | 2020251260 | A1 | 12/2020 |
| WO | 2020254335 | A1 | 12/2020 |
| WO | 2020257557 | A1 | 12/2020 |

OTHER PUBLICATIONS

Santiago De Luxan Hernandez et al., CE3: Line-based intra coding mode (Tests 2.1.1 and 2.1.2), Joint Video Experts Team (JVET) of ITU-T SG 16 WP 3 and ISO/IEC JTC 1/SC 29/WG 11, 12th Meeting: Macao, JVET-L0076, Sep. 30, 2018, text, pp. 1-4.

International search report of PCT application No. PCT/CN2020/097130 issued on Sep. 10, 2020.

International search report of PCT application No. PCT/CN2020/097088 issued on Sep. 9, 2020.

International search report of PCT application No. PCT/CN2020/097148 issued on Sep. 9, 2020.

Jiahao Li et al., Multiple line-based intra prediction, Joint Video Exploration Team (JVET) of ITU-T SG 16 WP 3 and ISO/IEC JTC 1/SC 29/WG 11 3rd Meeting: Geneva, CH, May 26-Jun. 1, 2016, JVET-C0071, Jun. 1, 2016, pp. 1-3.

Yao-Jen Chang et al., Arbitrary reference tier for intra directional modes, Joint Video Exploration Team (JVET) of ITU-TSG 16 WP 3 and ISO/IEC JTC 1/SC 29/WG 11 3rd Meeting: Geneva, CH, May 26-Jun. 1, 2016, JVET-C0043, Jun. 1, 2016, pp. 1-3.

China National Intellectual Property Administration, First office action of Chinese application No. 201910545251.0 issued on Jun. 6, 2022, which is foreign counterpart application of this US application.

Benjamin Bross et al., Versatile Video Coding (Draft 4), Joint Video Experts Team (JVET) of ITU-T SG 16 WP 3 and ISO/IEC JTC 1/SC 29/WG 11 13th Meeting: Marrakech, MA, Jan. 9-18, 2019, JVET-M1001-v7, Jan. 18, 2019, pp. 89, 95, 96, 112, 279-282.

Mohsen Abdoli et al., CE8: BDPCM with horizontal/vertical predictor and independently decodable areas (test 8.3.1b), Joint Video Experts Team (JVET) of ITU-T SG 16 WP 3 and ISO/IEC JTC 1/SC 29/WG 11 13th Meeting: Marrakech, MA, Jan. 9-18, 2019, JVET-M0057, Jan. 18, 2019, p. 2.

Jani Lainema, CE7: Joint coding of chrominance residuals (CE7-1), Joint Video Experts Team (JVET) of ITU-T SG 16 WP 3 and ISO/IEC JTC 1/SC 29/WG 11 14th Meeting: Geneva, CH, Mar. 19-27, 2019, JVET-N0054, Mar. 27, 2019, sections 1 and 2.

China National Intellectual Property Administration, First office action of Chinese application No. 201911061873.2 issued on Feb. 8, 2021, which is foreign counterpart application of this US application.

(56) References Cited

OTHER PUBLICATIONS

Mohsen Abdoli et al., AHG11: Block DPCM for Screen Content Coding, Joint Video Experts Team (JVET) of ITU-T SG 16 WP 3 and ISO/IEC JTC 1/SC 29/WG 11 12th Meeting: Macao, CN, Oct. 3-12, 2018, JEVT-L0078, Oct. 8, 2018, pp. 1-8.

Marta Karczewicz et al., CE8-related: Quantized residual BDPCM, Joint Video Experts Team (JVET) of ITU-T SG 16 WP 3 and ISO/IEC JTC 1/SC 29/WG 11 14th Meeting: Geneva, CH, Mar. 19-27, 2019, JEVT-N0413, May 14, 2019, pp. 1-7.

China National Intellectual Property Administration, Second office action of Chinese application No. 201911061873.2 issued on Apr. 14, 2021, which is foreign counterpart application of this US application.

China National Intellectual Property Administration, Decision of rejection of Chinese application No. 201911061873.2 issued on Jul. 26, 2021, which is foreign counterpart application of this US application.

Cuiling Lan et al., Intra transform skipping, Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, JCTVC I0408, May 7, 2012, entire document.

China National Intellectual Property Administration, Notification to grant patent right for invention of Chinese application No. 201911061873.2 issued on Jun. 21, 2022, which is foreign counterpart application of this US application.

China National Intellectual Property Administration, First office action of Chinese application No. 201911061275.5 issued on Feb. 5, 2021, which is foreign counterpart application of this US application.

Christian Helmrich et al., CE7-related: Joint chroma residual coding with multiple modes, Joint Video Experts Team (JVET) of ITU-T SG 16 WP 3 and ISO/IEC JTC 1/SC 29/WG 11 14th Meeting: Geneva, CH, Mar. 19-27, 2019, JVET-N0282-v3, Mar. 15, 2019, entire document.

Christian Helmrich et al., CE7: Joint chroma residual coding with multiple modes (tests CE7-2.1, CE7-2.2), Joint Video Experts Team (JVET) of ITU-T SG 16 WP 3 and ISO/IEC JTC 1/SC 29/WG 11 15th Meeting: Gothenburg, SE, Jul. 3-12, 2019, JVET-O0105-v1, Jun. 18, 2019, entire document.

Bappaditya Ray et al., CE7-2.3: Joint coding of chroma residuals, Joint Video Experts Team (JVET) of ITU-T SG 16 WP 3 and ISO/IEC JTC 1/SC 29/WG 11 15th Meeting: Gothenburg, SE, Jul. 3-12, 2019, JVET-00115-v1, Jun. 19, 2019, entire document.

China National Intellectual Property Administration, First office action of Chinese application No. 201911090138.4 issued on Feb. 1, 2021, which is foreign counterpart application of this US application.

China National Intellectual Property Administration, Notification to grant patent right for invention of Chinese application No. 202110688052.2 issued on Apr. 1, 2022, which is foreign counterpart application of this US application.

Benjamin Bross et al., Versatile Video Coding (Draft 5), Joint Video Experts Team (JVET) of ITU-T SG 16 WP 3 and ISO/IEC JTC 1/SC 29/WG 11 14th Meeting: Geneva, JVET-N1001-v8, Jun. 11, 2019, chapters 7 and 9, pp. 142-144.

China National Intellectual Property Administration, First office action of Chinese application No. 202110688030.6 issued on Dec. 14, 2021, which is foreign counterpart application of this US application.

China National Intellectual Property Administration, Notification to grant patent right for invention of Chinese application No. 202110688030.6 issued on Mar. 7, 2022, which is foreign counterpart application of this US application.

China National Intellectual Property Administration, First office action of Chinese application No. 202110686662.9 issued on Feb. 8, 2022, which is foreign counterpart application of this US application.

China National Intellectual Property Administration, Second office action of Chinese application No. 202110686662.9 issued on Apr. 22, 2022, which is foreign counterpart application of this US application.

China National Intellectual Property Administration, Notification to grant patent right for invention of Chinese application No. 202110688048.6 issued on Apr. 1, 2022, which is foreign counterpart application of this US application.

China National Intellectual Property Administration, First office action of Chinese application No. 202110688028.9 issued on Dec. 3, 2021, which is foreign counterpart application of this US application.

China National Intellectual Property Administration, Notification to grant patent right for invention of Chinese application No. 202110688028.9 issued on Mar. 2, 2022, which is foreign counterpart application of this US application.

China National Intellectual Property Administration, First office action of Chinese application No. 202110686665.2 issued on Apr. 25, 2022, which is foreign counterpart application of this US application.

China National Intellectual Property Administration, First office action of Chinese application No. 202110688049.0 issued on Dec. 24, 2021, which is foreign counterpart application of this US application.

China National Intellectual Property Administration, Notification to grant patent right for invention of Chinese application No. 202110688049.0 issued on Apr. 13, 2022, which is foreign counterpart application of this US application.

China National Intellectual Property Administration, Notification to grant patent right for invention of Chinese application No. 202110688047.1 issued on Apr. 1, 2022, which is foreign counterpart application of this US application.

Extended European search report of counterpart European application No. 20825445.8 issued on Feb. 17, 2023.

Albrecht M et al., Description of SDR, HDR and 360° video coding technology proposal by Fraunhofer HHI, 122. MPEG Meeting, San Diego, (Motion Picture Expert Group Oriso/ IEC JTC1/SC29/ WG11), JVET-J0014-v1, Apr. 2, 2018, Syntax elements for MRL intra prediction, p. 22, paragraph 2.1.4.1, MRL intra prediction, p. 54, paragraph 2.1.9.5—p. 55, figure 32.

Jie Yao (Fujitsu) et al., Non-CE3: Intra prediction information coding, 13. JVET Meeting, Marrakech, (The Joint Video Exploration Team of ISO/IEC JTC1/ SC29/WG11 and ITU-T .SG.16 ), JVET-M0210-v4, Jan. 11, 2019, p. 1-p. 2.

Notice of Reasons for Refusal of Japanese application No. 2021-576392 issued on Feb. 20, 2023.

L. Xu et al., CE8-related: A SPS Level Flag For BDPCM and JCCR, Joint Video Experts Team (JVET) of ITU-TSG 16 WP 3 and ISO/IEC JTC 1/SC 29/WG 11, JVET-00376-v3, 15th Meeting: Gothenburg, Jul. 12, 2019, pp. 1-4.

Jani Lainema, CE7-related: Joint coding of chrominance residuals, JVET-M0305, Joint Video Experts Team (JVET) of ITU-TSG 16 WP 3 and ISO/IEC JTC 1/SC 29/WG11 13th Meeting: Marrakech, Jan. 16, 2019, entire document.

Christian Rudat et al., Inter-Component Transform for Color Video Coding, 2019 Picture Coding Symposium (PCS), IEEE Nov. 12, 2019.

Notice of Reasons for Refusal of Japanese application No. 2023-084090 issued on Mar. 4, 2024.

Decision of Refusal of Japanese application No. 2023-084090 issued on Jun. 28, 2024.

Non-final office Action of U.S. Appl. No. 17/621,644 issued on Nov. 7, 2023.

Notice of allowance of U.S. Appl. No. 17/621,644 issued on Apr. 15, 2024.

Extended European search report received in European application No. 24218443.0 issued on Feb. 24, 2025.

Chen Jianle et al., Algorihm description for Versatile Video Coding and Test Model 6 (VTM 6), Jun. 10, 2019, pp. 1-89, Joint Video Experts Team (JVET) of ITU-T SG 16 WP 3 And ISO/IEC JTC 1/SC 29/WG 11, vol. JVET-O2002_v2, Joint coding of chroma residuals, p. 61, paragraph f—p. 62.

(56) References Cited

OTHER PUBLICATIONS

Geert Van Der Auwera et al., Description of Core Experiment 3: Intra Prediction and Mode Coding, Joint Video Experts Team (JVET) of ITU-T SG 16 WP 3 and ISO/IEC JTC 1/SC 29/WG 11, 10th Meeting: San Diego, USA, Apr. 10-20, 2018, [JVET-J1023_r2] (version 3), Jun. 21, 2018, pp. 40-41.
Benjamin Bross et al., CE3: Multiple reference line intra prediction (Test 1.1.1, 1.1.2, 1.1.3 and 1.1.4), Joint Video Experts Team (JVET) of ITU-T SG 16 WP 3 and ISO/IEC JTC 1/SC 29/WG 11, 12th Meeting: Macao, CN, Oct. 3-12, 2018, [JVET-L0283-v2] (version 2), Oct. 3, 2018, entire document.
Benjamin Bross et al., CE3: Multiple reference line intra prediction (Test 5.4.1, 5.4.2, 5.4.3 and 5.4.4), Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0051-v1, Jul. 7, 2018, pp. 1-8.
Benjamin Bross et al., Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, JVET-L1001-v6, Jan. 10, 2019, p. 39, paragraph 7.3.4.11, p. 61, paragraph 7.4.5.6-p. 62, p. 184-p. 185, table 9.4.
Gordon Clare et al., CE8-related: SPS flag for BDPCM, Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0165, Jun. 2019, pp. 1-2.
Sunmi Yoo et al., CE8-related : Unified condition between BDPCM and transform skip, Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0206_v1, Jun. 2019, pp. 1-2.

* cited by examiner

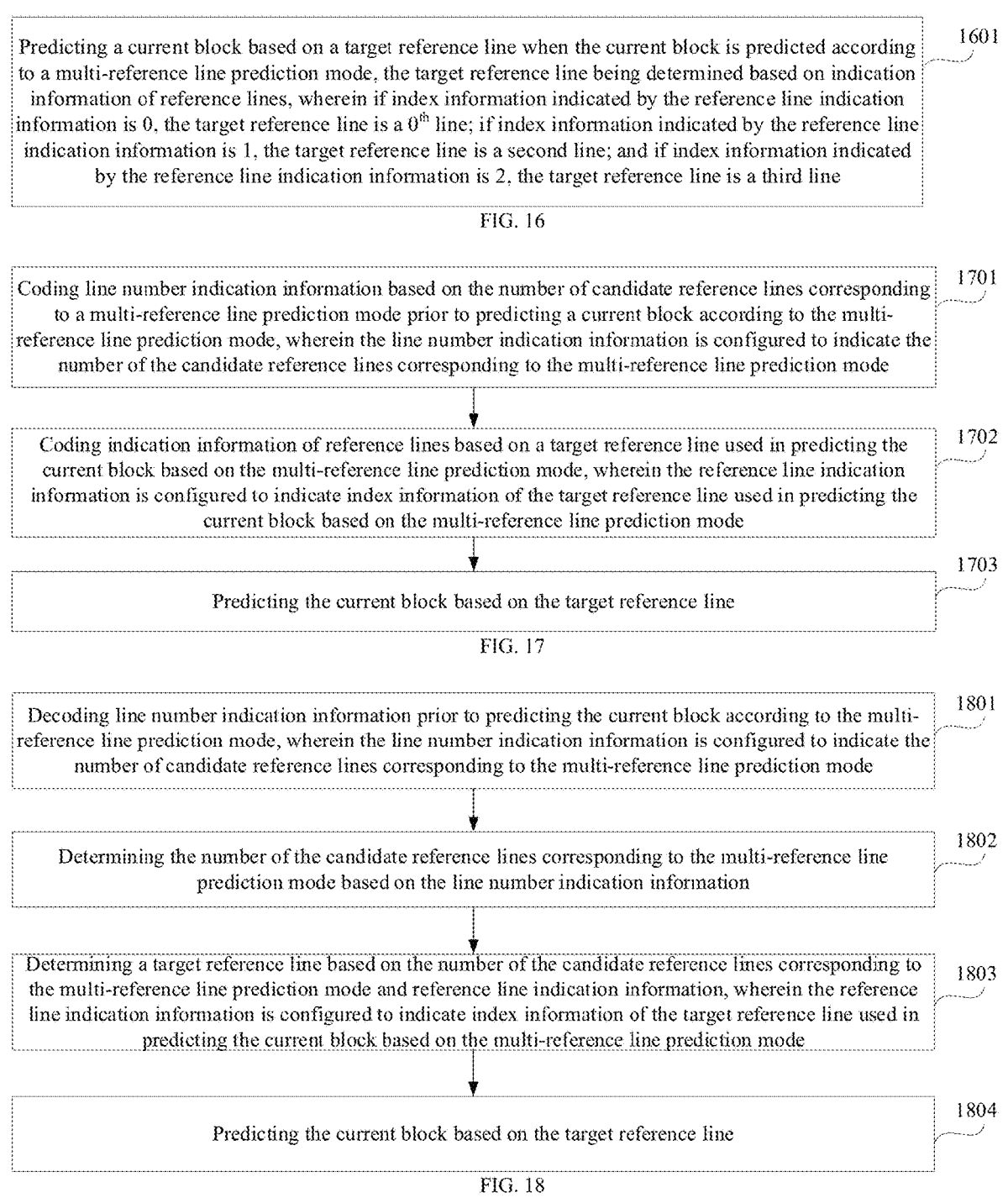

1601: Predicting a current block based on a target reference line when the current block is predicted according to a multi-reference line prediction mode, the target reference line being determined based on indication information of reference lines, wherein if index information indicated by the reference line indication information is 0, the target reference line is a $0^{th}$ line; if index information indicated by the reference line indication information is 1, the target reference line is a second line; and if index information indicated by the reference line indication information is 2, the target reference line is a third line

FIG. 16

1701: Coding line number indication information based on the number of candidate reference lines corresponding to a multi-reference line prediction mode prior to predicting a current block according to the multi-reference line prediction mode, wherein the line number indication information is configured to indicate the number of the candidate reference lines corresponding to the multi-reference line prediction mode

↓

1702: Coding indication information of reference lines based on a target reference line used in predicting the current block based on the multi-reference line prediction mode, wherein the reference line indication information is configured to indicate index information of the target reference line used in predicting the current block based on the multi-reference line prediction mode

↓

1703: Predicting the current block based on the target reference line

FIG. 17

1801: Decoding line number indication information prior to predicting the current block according to the multi-reference line prediction mode, wherein the line number indication information is configured to indicate the number of candidate reference lines corresponding to the multi-reference line prediction mode

↓

1802: Determining the number of the candidate reference lines corresponding to the multi-reference line prediction mode based on the line number indication information

↓

1803: Determining a target reference line based on the number of the candidate reference lines corresponding to the multi-reference line prediction mode and reference line indication information, wherein the reference line indication information is configured to indicate index information of the target reference line used in predicting the current block based on the multi-reference line prediction mode

↓

1804: Predicting the current block based on the target reference line

FIG. 18

CODING/DECODING METHOD AND DEVICE, AND STORAGE MEDIUM

This application is a continuation application based on U.S. application Ser. No. 17/621,644, filed on Dec. 21, 2021, which is a 371 of PCT Patent Application Serial No. PCT/CN2020/097144, filed on Jun. 19, 2020, which claims priority to Chinese Patent Application No. 201910545251.0, filed on Jun. 21, 2019 and entitled "CODING/DECODING METHOD AND DEVICE, AND STORAGE MEDIUM", the entire contents of all of which are incorporated herein by reference.

TECHNICAL FIELD

The present disclosure relates to the field of image processing technologies, and more particularly to a coding/decoding method and device, and a storage medium thereof.

BACKGROUND

At present, in the field of image coding/decoding technologies, when coding a picture block, a coding terminal usually needs to code some syntax elements by using context models to send these syntax elements to a decoding terminal in such a way that they are carried in a coded stream of the picture block. After receiving the coded stream of the picture block, the decoding terminal needs to analyze these syntax elements by using context models the same as those at the coding terminal to reconstruct a picture based on these syntax elements. These syntax elements may be all kinds of indication information, such as first intra sub-block-partitions (ISP) indication information or second ISP indication information. The first ISP indication information is configured to indicate whether to enable an intra sub-block prediction mode, and the second ISP indication information is configured to indicate a fashion of the sub-block partition of the intra sub-block prediction mode.

However, context-based adaptive binary arithmetic coding/decoding on different syntax elements may need different context models, and even context-based adaptive binary arithmetic coding/decoding on the same syntax element in different situations may also need different context models. As a result, a relatively large number of context models are required in a coding/decoding process, such that the coding/decoding process is complex and memory overheads are high.

SUMMARY

Embodiments of the present disclosure provide a coding/decoding method and a storage medium thereof, which may be used in solving problems of a relatively large number of context models and high memory overheads in a coding/decoding process in the related art. The technical solutions are as follows.

In an aspect, a coding/decoding method is provided. If a current block supports a multi-reference line prediction mode, the number of candidate reference lines corresponding to the multi-reference line prediction mode is 3, and reference line indication information corresponding to the multi-reference line prediction mode occupies at most 2 bits and is configured to indicate index information of a target reference line used in predicting the current block based on the multi-reference line prediction mode, the method includes:

performing context-based adaptive binary arithmetic coding or adaptive binary arithmetic decoding on a first bit of the reference line indication information based on one context model; and performing bypass binary arithmetic coding or decoding on a second bit of the reference line indication information when coding or decoding of the second bit of the reference line indication information is required.

In another aspect, a coding/decoding method is provided. If a current block supports a multi-reference line prediction mode, the number of candidate reference lines corresponding to the multi-reference line prediction mode is 4, and reference line indication information corresponding to the multi-reference line prediction mode occupies at most 3 bits and is configured to indicate index information of a target reference line used in predicting the current block based on the multi-reference line prediction mode, the method includes:

performing context-based adaptive binary arithmetic coding or adaptive binary arithmetic decoding on a first bit of the reference line indication information based on one context model;

performing bypass binary arithmetic coding or decoding on a second bit of the reference line indication information when coding or decoding of the second bit of the reference line indication information is required; and performing bypass binary arithmetic coding or decoding on a third bit of the reference line indication information when coding or decoding of the third bit of the reference line indication information is required.

In another aspect, a coding/decoding method is provided. If a current block supports a multi-reference line prediction mode, and the number of candidate reference lines corresponding to the multi-reference line prediction mode is 3, wherein a candidate reference line having index information of 0 is a $0^{th}$ line which is the line adjacent to a boundary of the current block, a candidate reference line having index information of 1 is a first line which is a line next adjacent to the boundary of the current block, and a candidate reference line having index information of 2 is a second line which is a line adjacent to the first line, the method includes:

predicting the current block based on a target reference line when the current block is predicted according to the multi-reference line prediction mode, wherein the target reference line is determined based on reference line indication information, wherein if index information indicated by the reference line indication information is 0, the target reference line is the $0^{th}$ line;

if index information indicated by the reference line indication information is 1, the target reference line is the first line; and if index information indicated by the reference line indication information is 2, the target reference line is the second line.

In another aspect, a coding/decoding method is provided. If it is determined that a multi-reference line prediction mode is enabled for a current block, and the number of candidate reference lines corresponding to the multi-reference line prediction mode is 3, wherein a candidate reference line having index information of 0 is a $0^{th}$ line which is the line adjacent to a boundary of the current block, a candidate reference line having index information of 1 is a first line which is a line next adjacent to the boundary of the current block, a candidate reference line having index information of 2 is a second line which is a line adjacent to the first line, and a candidate reference line having index information of 3 is a third line which is a line adjacent to the second line, the method includes:

predicting the current block based on a target reference line when the current block is predicted according to the multi-reference line prediction mode, wherein the target reference line is determined based on reference line indication information, wherein if index information indicated by the reference line indication information is 0, the target reference line is the $0^{th}$ line;

if index information indicated by the reference line indication information is 1, the target reference line is the second line; and if index information indicated by the reference line indication information is 2, the target reference line is the third line.

In another aspect, a decoding method is provided. If a current block supports a multi-reference line prediction mode, the method includes:

decoding line number indication information prior to predicting the current block according to the multi-reference line prediction mode, wherein the line number indication information is configured to indicate the number of candidate reference lines corresponding to the multi-reference line prediction mode;

determining the number of the candidate reference lines corresponding to the multi-reference line prediction mode based on the line number indication information;

determining a target reference line based on the number of the candidate reference lines corresponding to the multi-reference line prediction mode and reference line indication information, wherein the reference line indication information is configured to indicate index information of the target reference line used in predicting the current block based on the multi-reference line prediction mode; and predicting the current block based on the target reference line.

In some embodiments of the present disclosure, the line number indication information exists in a sequence parameter set, a picture parameter set, a slice level, or a Tile level.

In another aspect, a coding/decoding device is provided, wherein the device includes:

a processor; and a memory configured to store an instruction executable by the processor, wherein the processor is configured to execute any one of the above coding/decoding methods or decoding methods.

In another aspect, a computer-readable storage medium storing an instruction therein is provided, wherein the instruction, when executed by a processor, causes the processor to execute any one of the above coding/decoding methods or decoding methods.

In another aspect, a computer program product including an instruction therein is provided, wherein the instruction, when run on a computer, causes the computer to execute any one of the above coding/decoding methods or decoding methods.

The advantageous effects brought by the technical solutions of embodiments of the present disclosure are as below.

In the embodiments of the present disclosure, the context-based adaptive binary arithmetic coding or context-based adaptive binary arithmetic decoding is performed on the first ISP indication information based on one context model when it is determined to code or decode the first ISP indication information, and bypass binary arithmetic coding or decoding is performed on the second ISP indication information when it is determined to code or decode the second ISP indication information, such that the number of context models required during a coding/decoding process can be reduced, the complexity of the coding/decoding process is reduced, and memory overheads are reduced.

BRIEF DESCRIPTION OF THE DRAWINGS

In order to illustrate the technical solutions of the embodiments provided by the present disclosure more clearly, a brief introduction may be given hereinafter to the accompanying drawings that may be used in the description of the embodiments. Apparently, the accompanying drawings in the description below are merely used for illustrating some embodiments of the present disclosure, and other accompanying drawings may be acquired by those skilled in the art according to these drawings without paying any creative work.

FIG. 16 is a flowchart of a coding/decoding method according to an embodiment of the present disclosure;

FIG. 17 is a flowchart of a coding method according to an embodiment of the present disclosure;

FIG. 18 is a flowchart of a decoding method according to an embodiment of the present disclosure;

DETAILED DESCRIPTION

To make the objectives, technical solutions and advantages of the present disclosure clearer, the following will further describe the embodiments of the present disclosure in detail with reference to the accompanying drawings.

Application scenes of the embodiments of the present disclosure are described first before explaining the embodiments of the present disclosure in detail.

Figure 1:
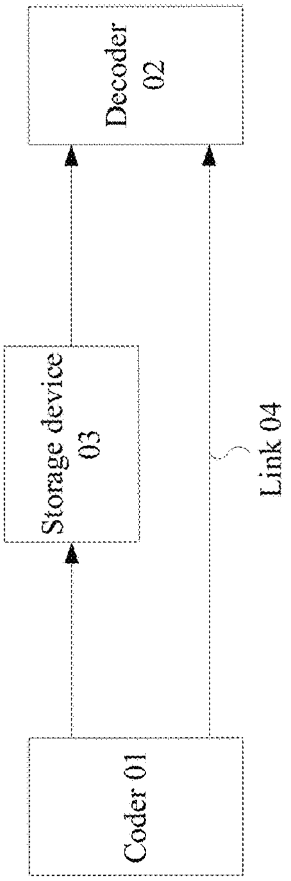
FIG. 1 is a schematic structural diagram of a coding/decoding system according to an embodiment of the present disclosure.

FIG. 1 is a schematic structural diagram of a coding/decoding system according to an embodiment of the present disclosure. As shown in FIG. 1, the coding/decoding system includes a coder 01, a decoder 02, a storage device 03, and a link 04. The coder 01 may communicate with the storage device 03, and may also communicate with the decoder 02 through the link 04. The decoder 02 may also communicate with the storage device 03.

The coder 01 is configured to acquire a data source, code the data source, and transmit a coded stream to the storage device 03 for storage or directly transmit the coded stream to the decoder 02 through the link 04. The decoder 02 may acquire the coded stream from the storage device 03 and may acquire the data source by decoding the coded stream, or may acquire the data source by decoding the coded stream transmitted by the coder 01 through the link 04. The data source may be a captured image or a captured video. Each of the coder 01 and the decoder 02 may be used as an electronic device. The storage device 03 may include any of various distributed or locally accessible data storage media, such as, a hard drive, a Blu-ray disc, a read-only disc, a flash memory, or any other suitable digital storage media for storing coded data. The link 04 may include at least one communication medium which may include a wireless and/or wired communication medium, such as a radio frequency (RF) spectrum or one or more physical transmission lines.

Figure 2:
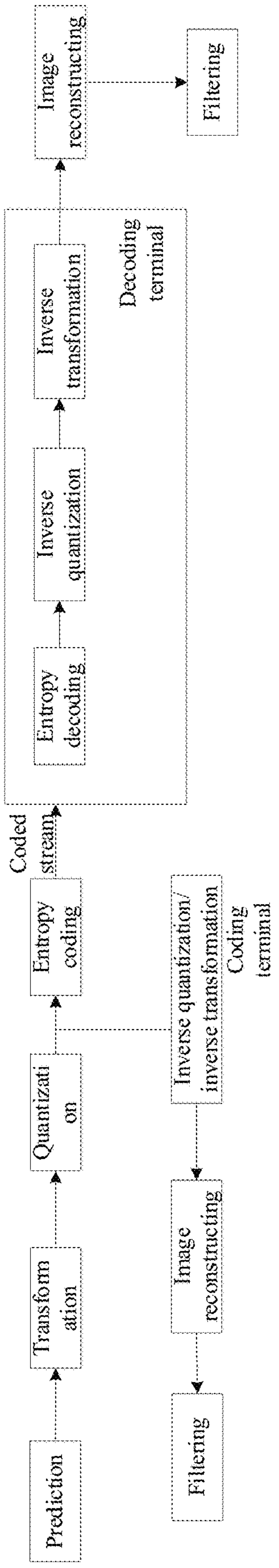
FIG. 2 is a schematic flowchart of a coding/decoding according to an embodiment of the present disclosure.

Please refer to FIG. 2, which is a schematic diagram of a coding/decoding process according to an exemplary embodiment. Coding includes prediction, transformation, quantization, and entropy coding. Decoding includes decoding, inverse transformation, inverse quantization, and prediction. At present, binary arithmetic coding/decoding technologies are usually employed to code/decode current syntax elements. Prediction in coding/decoding generally includes intra prediction, multi-reference line prediction, cross-component linear model prediction, matrix-based intra prediction, etc. In addition, an intra luma candidate list, an adaptive loop filterer, adaptive motion vector resolution coding/decoding technology, block-based quantized residual domain differential pulse code modulation (BDPCM) coding/decoding technology and the like are further used in coding/decoding. These prediction fashions and coding/decoding technologies are briefly introduced below.

Binary Arithmetic Coding

Binary arithmetic coding refers to acquisition of a final coded stream by performing arithmetic coding on each bin based on a probability model parameter thereof after a current syntax element is binarized, and includes two coding fashions: context-based adaptive arithmetic coding and bypass binary arithmetic coding.

Context-based adaptive binary arithmetic coding (CABAC) is a method that combines adaptive binary arithmetic coding with a well-designed context model. In coding, the coding of each symbol is related to the result of previous coding. Adaptively assigning a codeword to each symbol according to statistical characteristics of a symbol stream is especially suitable for symbols with an unequal probability of occurrence, such that a code rate can be further compressed. All bits of each syntax element enter a context modeler in sequence; and a coder assigns an appropriate probability model to each input bit based on a previously coded syntax element or bit. This process is called context modeling. The bit and the probability model assigned to it are sent to a binary arithmetic coder for coding. The coder needs to update the context model based on a bit value, which is the adaptation of the coding.

Bypass binary arithmetic coding is a binary arithmetic coding mode (also known as a bypass coding mode) based on an equal probability. Compared with CABAC, Bypass does not need a probability update process or does not need to adaptively update a probability state, but uses a fixed probability of 50% of 0 and 50% of 1 for coding. This coding method is simpler, has low coding complexity and less memory consumption, and is suitable for symbols with the equal probability.

Intra Prediction

Intra prediction refers to prediction of pixels of a current image block using pixels of coded and reconstructed neighboring blocks around the current image block by use of a correlation of a picture space domain, so as to remove spatial redundancy of a picture. There are various intra prediction modes specified in the intra prediction, and each intra prediction mode (other than a DC mode) corresponds to a texture direction. For example, if textures of the picture are arranged horizontally, a selected horizontal prediction mode can better predict image information. In an exemplary embodiment, a luma component in high-efficiency video coding (HEVC) can support 5 sizes of prediction units (image blocks or sub-blocks). Each size of the prediction unit corresponds to 35 intra prediction modes, including Planar mode, DC mode and 33 angular modes, as shown in Table 1.

TABLE 1

| Mode No. | Intra prediction mode |
|---|---|
| 0 | Intra_Planar |
| 1 | Intra_DC |
| 2 . . . 34 | Intra_angular 2 . . . Intra_angular 34 |

Figure 3:
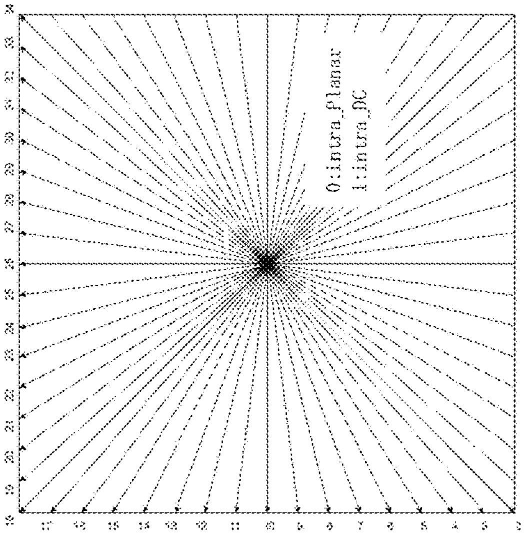
FIG. 3 is an example of a direction corresponding to an intra prediction mode according to an embodiment of the present disclosure.
Figure 4:
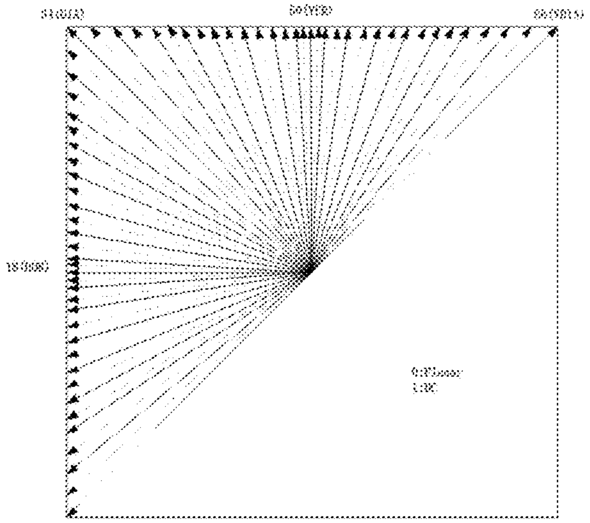
FIG. 4 is an example of a direction corresponding to an angular mode according to an embodiment of the present disclosure.

Prediction directions corresponding to the various intra prediction modes are shown in FIG. 3. The Planar mode is suitable for regions where pixel values change slowly. In implementation, two linear filters in the horizontal and vertical directions may be used for filtering, and an average of the two linear filters is used as a predicted value of the current image block. The DC mode is suitable for a large-area flat region, and an average pixel value of coded and reconstructed neighboring blocks around the current image block may be used as the predicted value of the current image block. As an example, the Planar mode and the DC mode may also be referred to as non-angular modes. Please continue to refer to FIG. 3, in the angular modes, the intra prediction modes corresponding to the mode No. 26 and the mode No. 10 respectively indicate the vertical direction and the horizontal direction respectively. In some embodiments, the intra prediction modes corresponding to mode numbers adjacent to mode No. 26 may be collectively referred to as vertical prediction modes, and the intra prediction modes corresponding to mode numbers adjacent to mode No. 10 may be collectively referred to as horizontal prediction modes. In an exemplary embodiment, the vertical prediction modes may include mode numbers 2 to 18, and the horizontal prediction modes may include mode numbers 19 to 34. In addition, the angular modes are partitioned in more detail in the new generation coding/decoding standard of versatile video coding (VVC), as shown in FIG. 4.

Conventional Intra Prediction

A method for conventional intra prediction uses surrounding pixels to predict the current block, wherein spatial redundancy is removed. In the conventional intra prediction mode, a used target prediction mode may derive from a most probable mode (MPM) list or from a non-MPM list.

Intra Sub-Block-Partitions (ISP)

A method for intra prediction in ISP technology is to partition a picture block into several sub-blocks for prediction. For the picture block supporting the ISP technology, supported partition methods include horizontal partition and vertical partition. For a decoding terminal, when an ISP mode is enabled for the current block, if a size of the current block only supports one partition mode by default, the current block is partitioned based on a default partition direction, and the partitioned blocks are subjected to prediction, inverse transformation, inverse quantization, etc.; if the size of the current block supports two partition modes, it is required to further analyze the partition direction of the current block, then, the current block is partitioned based on the determined partition direction, and the partitioned blocks are subjected to prediction, inverse transformation, inverse quantization, etc.

Multi-Reference Line (MRL)

Figure 5:
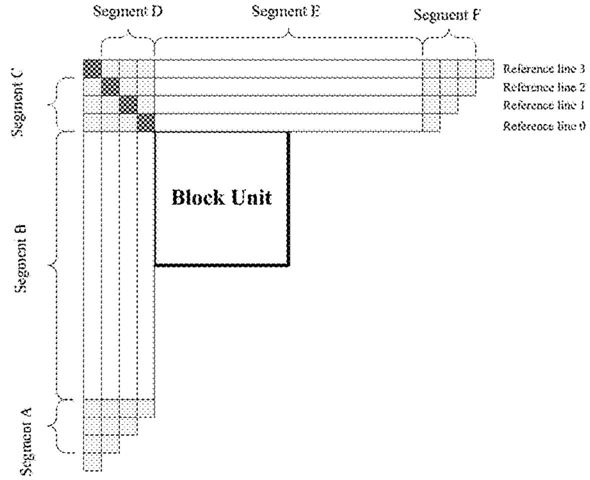
FIG. 5 is a schematic diagram of partition of a picture block according to an embodiment of the present disclosure.

A method used in MRL technology is to predict based on reference pixels of a current block, wherein the reference pixels may derive from adjacent lines of the current block. For example, the reference pixels may derive from Reference line 0 (the $0^{th}$ line), Reference line 1 (the first line), Reference line 2 (the second line) and Reference line 3 (the third line 3) as shown in FIG. 5. The $0^{th}$ line is the line adjacent to the boundary of the current block; the first line is the line next adjacent to the boundary of the current block; the second line is the line adjacent to the first line; and the third line is the line adjacent to the second line. At present, in the new generation coding/decoding standard of the VVC, the reference pixels derive from Reference line 0, Reference line 1 and Reference line 3, other than Reference line 2. The line may be the line on the upper side of the current block or a column on the left side of the current block.

MPM

The number of MPMs in HEVC is 3, and the number of MPMs in current VVC is 6. For the ISP and MRL modes, their intra prediction modes must be from MPMs. For conventional intra prediction, its intra prediction mode may derive from MPMs or non-MPMs.

Cross-Component Linear Model Prediction (CCLM)

A method in CCLM technology is to use a linear prediction model to reconstruct a pixel value through a luma component and acquire a chroma component through a linear equation to predict the pixel value, such that the redundancy between image components is removed, and the coding performance is further improved. At present, there are three cross-component prediction modes, namely MDLM_L mode, MDLM_T mode and DM mode. The MDLM-L is a cross-component prediction mode that uses only left template information to acquire linear parameters. MDLM-T is a cross-component prediction mode that uses only upper template information to deduct linear model parameters. DM is a prediction mode in which the adopted chrominance and luma are the same.

Adaptive Loop Filter

An adaptive loop filter (ALF) can select one filter from fixed filters for filtering based on its gradient direction; and whether ALF filtering is enabled can be indicated by flag of CTU level. Chroma and luma can be controlled separately.

Adaptive Motion Vector Resolution (AMVR)

AMVR is configured to indicate that different resolutions may be used in performing motion vector difference coding. The used resolution may be an integer pixel resolution, such as 4 pixel resolution, or a non-integer pixel resolution, such as 1/16 pixel resolution. This technology may be applied to the coding of motion vector data in the conventional intra prediction, and may also be used in coding of motion vector data in the affine prediction mode.

Matrix-Based Intra Prediction (MIP)

Matrix-based intra prediction technology refers to determination of the predicted pixel value of the current block by adding an offset value to upper and left adjacent pixels of the current block which are input into a matrix-vector multiplier as reference pixels.

BDPCM

BDPCM refers to directly copying a pixel value of a corresponding reference pixel in a vertical or horizontal direction when predicting a pixel in a prediction segment, which is similar to vertical prediction and horizontal prediction. Then, a residual value between the predicted pixel and an original pixel is quantized, and the quantized residual is differentially coded.

For example, if the size of the current block is M*N, $r_{i,j}$, $0\le i\le M-1, 0\le j\le N-1$ represents a predicted residual, and $Q(r_{i,j})$, $0\le i\le M-1, 0\le j\le N-1$ represents a quantized residual acquired after the predicted residual $r_{i,j}$ is quantized. Then, a differential coding result $\tilde{r}_{i,j}$ is acquired by differentially coding the quantized residual $Q(r_{i,j})$.

When it is in a vertical RDPCM mode, $$\tilde{r}_{i,j} = \begin{cases} Q(r_{i,j}), & i = 0, 0 \le j \le (N-1) \\ Q(r_{i,j}) - Q(r_{i-1,j}), & 1 \le i \le (M-1), 0 \le j \le (N-1) \end{cases}.$$

When it is in a horizontal RDPCM mode, $$\tilde{r}_{i,j} = \begin{cases} Q(r_{i,j}), & 1 \le i \le (M-1), j = 0 \\ Q(r_{i,j}) - Q(r_{i-1,j}), & 1 \le i \le (M-1), 0 \le j \le (N-1) \end{cases}.$$

Finally, $\tilde{r}_{i,j}$ is programmed into a coded stream.

For a decoding terminal, an inverse accumulation process is configured to acquire quantized residual data.

For the vertical predication, $$Q(r_{i,j}) = \sum_{k=0}^{i} \tilde{r}_{k,j}, 0 \le i \le (M-1), 0 \le j \le (N-1).$$

For the horizontal predication, $$Q(r_{i,j}) = \sum_{k=0}^{j} \tilde{r}_{i,k}, 0 \le i \le (M-1), 0 \le j \le (N-1).$$

Then, a reconstructed pixel value is acquired by performing inverse quantization on the quantized residual and adding the quantized residual subjected to the inverse quantization to the predicted value.

Joint Coding of Chroma Residuals (JCCR)

JCCR is a joint coding fashion of a (chroma blue) CB component and a (chroma red) CR component. By observing the distribution of chroma residuals, it is not difficult to find that CB and CR always show a negative correlation trend. Thus, JCCR proposes the joint coding fashion of CB and CR by taking advantages of this phenomenon, wherein, for example, it only needs to code (CB−CR)/2, which is a mean value of the CB component and the CR component.

In the related art, the decoding terminal needs to transmit different syntax elements to the coding terminal under different prediction modes or coding/decoding technologies, and more context models are required to transmit the syntax elements, resulting in a complex coding/decoding process and high memory overheads. Based on this, the present disclosure provides a coding/decoding method which can reduce the number of required context models, thereby reducing complexity of the coding/decoding process and the memory overheads. Coding/decoding methods according to the embodiments of the present disclosure will be introduced next respectively with respect to the above prediction modes and coding/decoding technologies.

ISP Mode

In the ISP mode, syntax elements that need to be transmitted between the decoding terminal and the coding terminal may include first ISP indication information and second ISP indication information. The first ISP indication information is configured to indicate whether to enable an intra sub-block prediction mode, and the second ISP indication information is configured to indicate a fashion of sub-block partition of the intra sub-block prediction mode. In an exemplary embodiment, the first indication information is intra_subpartitions_mode_flag, and the second indication information is intra_subpartitions_split_flag.

Moreover, it is necessary to perform context-based adaptive binary arithmetic coding or context-based adaptive binary arithmetic decoding on the first ISP indication information based on one context model when it is determined to code or decode the first ISP indication information. It is required to perform context-based adaptive binary arithmetic coding or context-based adaptive binary arithmetic decoding on the second ISP indication information based on a different context model when it is determined to code or decode the second ISP indication information. That is, as shown in Table 2 below, two context models are required to code/decode the first ISP indication information and the second ISP indication information.

TABLE 2

| | Bin Idx | | | | | |
|---|---|---|---|---|---|---|
| Syntax element | 0 | 1 | 2 | 3 | 4 | 5 |
| intra_subpartitions_mode_flag | 0 | na | na | na | na | na |
| intra_subpartitions_split_flag | 0 | na | na | na | na | na |

The First Implementation of the ISP Mode

Figure 6:
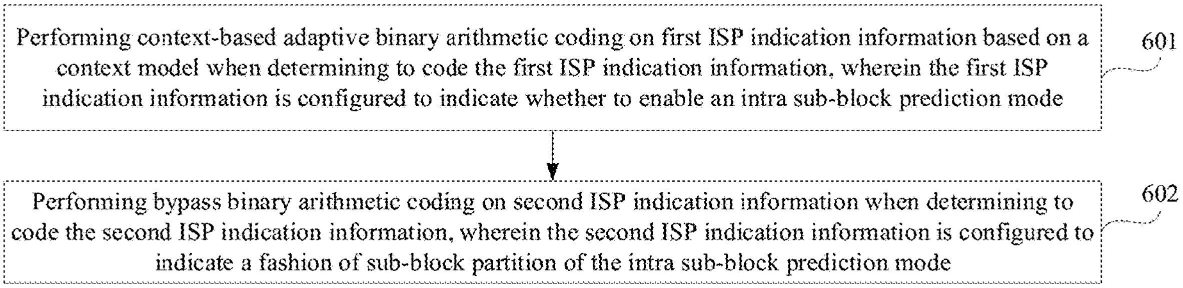
FIG. 6 is a flowchart of a coding method according to an embodiment of the present disclosure.

FIG. 6 is a flowchart of a coding method according to an embodiment of the present disclosure. The method is applicable to a coding terminal. As shown in FIG. 6, the method includes the following steps.

In 601, context-based adaptive binary arithmetic coding is performed on first ISP indication information based on a context model when determining to code the first ISP indication information, wherein the first ISP indication information is configured to indicate whether to enable an intra sub-block prediction mode.

As an example, if a current block meets a condition of supporting sub-block partition technology, the current block may try to use the sub-block partition technology. The coding terminal may decide whether to use the sub-block partition technology finally based on rate distortion optimization (RDO), and may code the first ISP indication information. Whether the intra sub-block prediction mode is enabled for the current block is indicated by the first ISP indication information. The conditions of supporting the sub-block partition technology include: the current block is a luma block; the multi-reference line prediction mode is not enabled for the current block; and the size of the current block meets a certain restriction. Of course, the conditions of supporting the sub-block partition technology are not limited to the above three conditions, and may also include others.

In an exemplary embodiment, the first ISP indication information is intra_subpartitions_mode_flag which is a flag bit indicating whether the intra sub-block prediction mode is enabled for the current block. If intra_subpartitions_mode_flag is 0, it indicates that the intra sub-block prediction mode is not enabled for the current block. If intra_subpartitions_mode_flag is 1, it indicates that the intra sub-block prediction mode is enabled for the current block.

In 602, bypass binary arithmetic coding is performed on second ISP indication information when determining to code the second ISP indication information, wherein the second ISP indication information is configured to indicate a fashion of sub-block partition of the intra sub-block prediction mode.

The fashion of sub-block partition includes a horizontal partition direction and a vertical partition direction. When the current block supports the two partition directions, it is required to determine the finally used partition direction. The coding of the second ISP indication information is continued based on the determined partition direction. When the current block supports only one partition direction, there is no need to continue coding the second ISP indication information.

The second ISP indication information may be intra_subpartitions_split_flag which is a flag bit indicating the fashion of sub-block partition of the ISP mode of the current block. In an exemplary embodiment, if the intra_subpartitions_split_flag is 0, it indicates that the fashion of sub-block partition of the ISP mode of the current block is horizontal partition. If the intra_subpartitions_split_flag is 1, it indicates that the sub-block partition mode of the ISP mode of the current block is vertical partition.

As an example, the coding fashions of the syntax elements in the ISP mode are shown in Table 3 below.

TABLE 3

| | Bin Idx | | | | | |
|---|---|---|---|---|---|---|
| Syntax element | 0 | 1 | 2 | 3 | 4 | 5 |
| intra_subpartitions_mode_flag | 0 | na | na | na | na | na |
| intra_subpartitions_split_flag | Bypass | na | na | na | na | na |

That is, the coding fashion of the second ISP indication information in the related art is modified, and a complex CABAC coding fashion is replaced with the bypass coding fashion. Thus, the memory overheads and the coding complexity can be reduced. In addition, the coding performance remains basically unchanged as for the performance.

Figure 7:
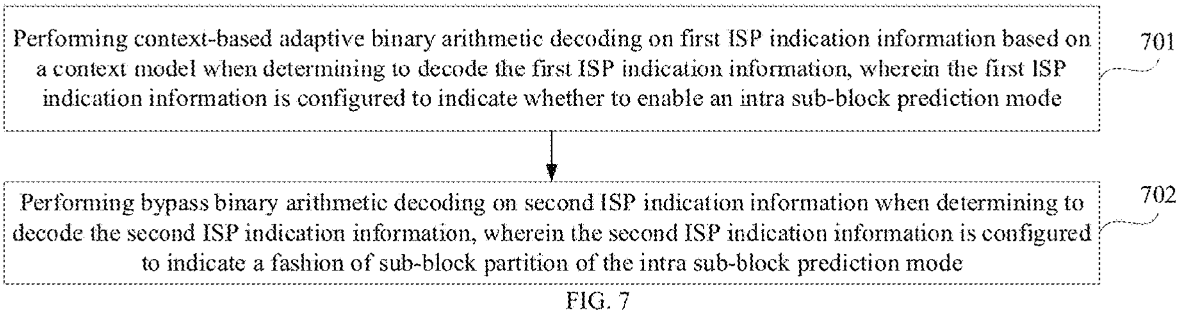
FIG. 7 is a flowchart of a decoding method according to an embodiment of the present disclosure.

FIG. 7 is a flowchart of a decoding method according to an embodiment of the present disclosure. The method is applicable to a decoding terminal and is a decoding method corresponding to the coding method according to the embodiment shown in FIG. 6. As shown in FIG. 7, the method includes the following steps.

In 701, context-based adaptive binary arithmetic decoding is performed on first ISP indication information based on a context model when determining to decode the first ISP indication information, wherein the first ISP indication information is configured to indicate whether to enable an intra sub-block prediction mode.

As an example, a coded stream of a current block may be received first; if the current block meets an analytic condition, the first ISP indication information in the coded stream is decoded to analyze whether the intra sub-block prediction mode is enabled for the current block. The analytic condition includes: the current block is a luma block, the multi-reference line prediction mode is not enabled for the current block, and the size of the current block meets a certain restriction condition. Of course, the analytic condition is not limited to the above three conditions, and may also include others.

In an exemplary embodiment, the first indication information is intra_subpartitions_mode_flag. If intra_subpartitions_mode_flag is 0, it indicates that the intra sub-block prediction mode is not enabled for the current block. If intra_subpartitions_mode_flag is 1, it indicates that the intra sub-block prediction mode is enabled for the current block.

In 702, bypass binary arithmetic decoding is performed on second ISP indication information when determining to decode the second ISP indication information, wherein the second ISP indication information is configured to indicate a fashion of sub-block partition of the intra sub-block prediction mode.

In an exemplary embodiment, when the first ISP indication information indicates that the intra sub-block prediction mode is enabled for the current block and the current block supports two partition directions, it is determined that the second ISP indication information needs to be decoded. If the first ISP indication information indicates that the intra sub-block prediction mode is not enabled for the current block, or if the first ISP indication information indicates that the intra sub-block prediction mode is enabled for the current block and the current block supports only one partition direction, it is determined that there is no need to decode the second ISP indication information.

For example, if intra_subpartitions_mode_flag is 1 and the current block supports two partition directions, it is required to further analyze a flag bit of intra_subpartitions_split_flag of each partition direction. If the intra_subpartitions_mode_flag is 0 or 1 and the current block only supports the partition direction in a certain fixed direction, there is no need to analyze the flag bit indicating the partition direction.

The decoding terminal may determine whether the ISP mode is enabled for the current block and the corresponding partition direction based on the above two pieces of the ISP indication information, so as to acquire a predicated value used in a subsequent reconstruction process by predicting the current block based on the determined partition direction.

The Second Implementation of the ISP Mode

Figure 8:
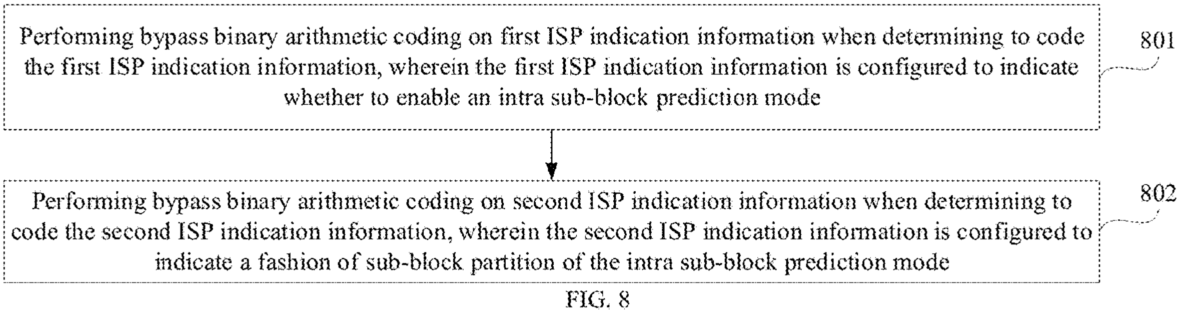
FIG. 8 is a flowchart of a coding method according to an embodiment of the present disclosure.

FIG. 8 is a flowchart of a coding method according to an embodiment of the present disclosure. The method is applicable to a coding terminal. As shown in FIG. 8, the method includes the following steps.

In 801, bypass binary arithmetic coding is performed on first ISP indication information when determining to code the first ISP indication information, wherein the first ISP indication information is configured to indicate whether to enable an intra sub-block prediction mode.

As an example, if a current block meets a condition of supporting sub-block partition technology, the current block may try to use the sub-block partition technology. The coding terminal may decide whether to use the sub-block partition technology finally based on RDO, and may code the first ISP indication information. Whether the intra sub-block prediction mode is enabled for the current block is indicated by the first ISP indication information. The conditions of supporting the sub-block partition technology include: the current block is a luma block; the multi-reference line prediction mode is not enabled for the current block; and the size of the current block meets a certain restriction. Of course, the conditions of supporting the sub-block partition technology are not limited to the above three conditions, and may also include others.

In an exemplary embodiment, the first ISP indication information is intra_subpartitions_mode_flag which is a flag bit indicating whether the intra sub-block prediction mode is enabled for the current block. If intra_subpartitions_mode_flag is 0, it indicates that the intra sub-block prediction mode is not enabled for the current block. If intra_subpartitions_mode_flag is 1, it indicates that the intra sub-block prediction mode is enabled for the current block.

In 802, bypass binary arithmetic coding is performed on second ISP indication information when determining to code the second ISP indication information, wherein the second ISP indication information is configured to indicate a fashion of sub-block partition of the intra sub-block prediction mode.

The fashion of sub-block partition includes a horizontal partition direction and a vertical partition direction. When the current block supports the two partition directions, it is required to determine the finally used partition direction. The coding of the second ISP indication information is continued based on the determined partition direction. When the current block supports only one partition direction, there is no need to continue coding the second ISP indication information.

The second ISP indication information may be intra_subpartitions_split_flag which is a flag bit indicating the fashion of sub-block partition of the ISP mode of the current block. In an exemplary embodiment, if the intra_subpartitions_split_flag is 0, it indicates that the fashion of sub-block partition of the ISP mode of the current block is horizontal partition. If the intra_subpartitions_split_flag is 1, it indicates that the sub-block partition mode of the ISP mode of the current block is vertical partition.

As an example, the coding fashions of the syntax elements in the ISP mode are shown in Table 4 below.

TABLE 4

| | Bin Idx | | | | | |
|---|---|---|---|---|---|---|
| Syntax element | 0 | 1 | 2 | 3 | 4 | 5 |
| intra_subpartitions_mode_flag | Bypass | na | na | na | na | na |
| intra_subpartitions_split_flag | Bypass | na | na | na | na | na |

That is, the coding fashions of both the flag bit of the intra_subpartitions_mode_flag and the flag bit of the intra_subpartitions_split_flag in the related art are modified, and original complex CABAC coding fashions are replaced with the bypass coding fashion. Thus, the memory overheads can be further reduced, and the coding complexity is reduced. In addition, the coding performance remains basically unchanged as for the performance.

Figure 9:
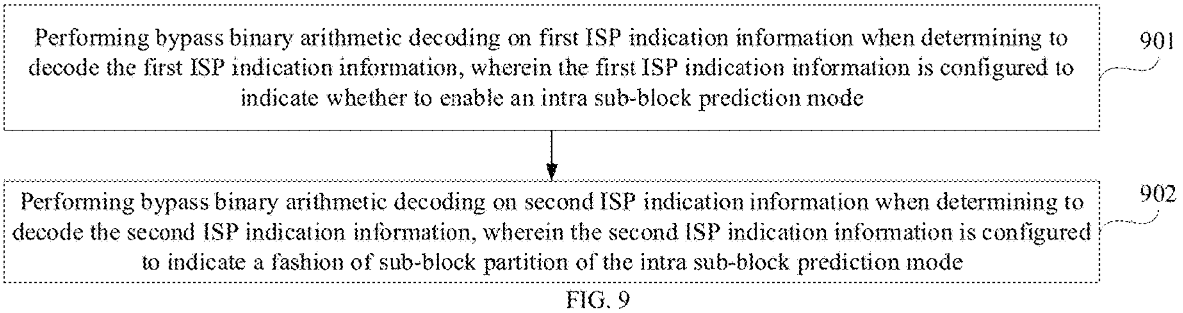
FIG. 9 is a flowchart of a decoding method according to an embodiment of the present disclosure.

FIG. 9 is a flowchart of a decoding method according to an embodiment of the present disclosure. The method is applicable to a decoding terminal and is a decoding method corresponding to the coding method according to the embodiment shown in FIG. 8. As shown in FIG. 9, the method includes the following steps.

In 901, bypass binary arithmetic decoding is performed on first ISP indication information when determining to decode the first ISP indication information, wherein the first ISP indication information is configured to indicate whether to enable an intra sub-block prediction mode.

As an example, a coded stream of a current block may be received first; if the current block meets an analytic condition, the first ISP indication information in the coded stream is decoded to analyze whether the intra sub-block prediction mode is enabled for the current block. The analytic condition includes: the current block is a luma block; the multi-reference line prediction mode is not enabled for the current block; and the size of the current block meets a certain restriction. Of course, the analytic condition is not limited to the above three conditions, and may also include others.

In an exemplary embodiment, the first indication information is intra_subpartitions_mode_flag. If the intra_subpartitions_mode_flag is 0, it indicates that the intra sub-block prediction mode is not enabled for the current block. If the intra_subpartitions_mode_flag is 1, it indicates that the intra sub-block prediction mode is enabled for the current block.

In 902, bypass binary arithmetic decoding is performed on second ISP indication information when determining to decode the second ISP indication information, wherein the second ISP indication information is configured to indicate a fashion of sub-block partition of the intra sub-block prediction mode.

In an exemplary embodiment, when the first ISP indication information indicates that the intra sub-block prediction mode is enabled for the current block and the current block supports two partition directions, it is determined that the second ISP indication information needs to be decoded. If the first ISP indication information indicates that the intra sub-block prediction mode is not enabled for the current block, or if the first ISP indication information indicates that the intra sub-block prediction mode is enabled for the current block and the current block supports only one partition direction, it is determined that there is no need to decode the second ISP indication information.

For example, if intra_subpartitions_mode_flag is 1 and the current block supports two partition directions, it is required to further analyze a flag bit of intra_subpartitions_split_flag of each partition direction. If the intra_subpartitions_mode_flag is 0 or 1 and the current block only supports the partition direction in a certain fixed direction, there is no need to analyze the flag bit indicating the partition direction.

The decoding terminal may determine whether the ISP mode is enabled for the current block and the corresponding partition direction based on the above two pieces of the ISP indication information, so as to acquire a predicated value used in a subsequent reconstruction process by predicting the current block based on the determined partition direction.

MRL Mode

The First Implementation of the MRL Mode

Figure 10:
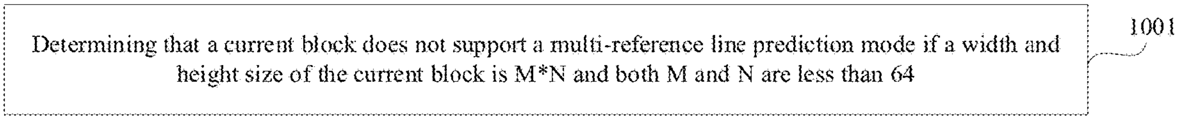
FIG. 10 is a flowchart of a coding/decoding method according to an embodiment of the present disclosure.

FIG. 10 is a flowchart of a coding/decoding method according to an embodiment of the present disclosure. The method is applicable to a coding terminal or a decoding terminal. As shown in FIG. 10, the method includes the following steps.

In 1001, it is determined that a current block does not support a multi-reference line prediction mode if a width and height size of the current block is M*N and both M and N are less than 64.

In an exemplary embodiment, it is determined that the current block does not support the multi-reference line prediction mode if the width and height size of the current block is 4*4.

The Second Implementation of the MRL Mode

In the MRL mode, syntax elements that need to be transmitted between the decoding terminal and the coding terminal may include indication information of reference lines which is configured to indicate index information of a target reference line used in predicting the current block based on the multi-reference line prediction mode. In an exemplary embodiment, the reference line indication information is intra_luma_ref_idx.

In the related art, if it is determined that the current block supports the multi-reference line prediction mode and the number of candidate reference lines corresponding to the multi-reference line prediction mode is 3, the reference line indication information corresponding to the multi-reference line prediction mode occupies at most 2 bits which need to be coded/decoded by using two different context models, as shown in Table 5 and Table 6 below.

TABLE 5

| The first bin | The second bin |
|---|---|
| MultiRefLineIdx(0), namely, the first context model | MultiRefLineIdx(1), namely, the second context model |

The first bin refers to the first bit of the reference line indication information, and needs to be coded/decoded based on the first context model. The second bin refers to the second bit of the reference line indication information, and needs to be coded/decoded based on the second context model. In addition, the first context model and the second context model are different.

TABLE 6

| | Bin Idx | | | | | |
|---|---|---|---|---|---|---|
| Syntax element | 0 | 1 | 2 | 3 | 4 | 5 |
| intra_luma_ref_idx[ ][ ] | 0 | 1 | na | na | na | na |

In addition, a corresponding relationship between index information of target reference lines and the line numbers of the target reference lines is shown in Table 7.

TABLE 7

| intra_luma_ref_idx[x0][y0] | IntraLumaRefLineIdx[x][y] x = x0..x0 + cbWidth − 1 y = y0..y0 + cbHeight − 1 |
|---|---|
| 0 | 0 |
| 1 | 1 |
| 2 | 3 |

It can be seen from Table 7 that if the index information indicated by the reference line indication information is 0, the target reference line is the $0^{th}$ line; if the index information indicated by the reference line indication information is 1, the target reference line is the first line; if the index information indicated by the reference line indication information is 2, the target reference line is the third line.

It should be noted that the line described in the embodiment of the present disclosure may be the line on the upper side of the current block or the column on the left side of the current block.

Figure 11:
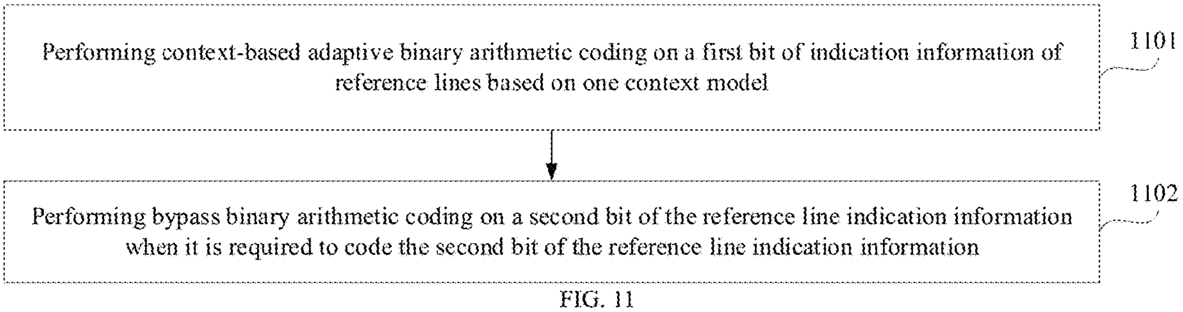
FIG. 11 is a flowchart of a coding method according to an embodiment of the present disclosure.

FIG. 11 is a flowchart of a coding method according to an embodiment of the present disclosure. The method is applicable to a coding terminal. As shown in FIG. 10, if it is determined that a current block supports the multi-reference line prediction mode and the number of candidate reference lines corresponding to the multi-reference line prediction mode is 3, reference line indication information corresponding to the multi-reference line prediction mode occupies at most 2 bits. The method includes the following steps.

In 1101, context-based adaptive binary arithmetic coding is performed on a first bit of the reference line indication information based on one context model.

As an example, whether the current block meets a condition of supporting multi-reference line prediction technology is determined. If the current block meets the condition of supporting the multi-reference line prediction technology, it is determined that the current block may try to use each reference line for coding. The coding terminal may decide a source of a final reference pixel through RDO, and may code reference line index information into a coded stream. The conditions of supporting the multi-reference line prediction technology include: the current block is a luma intra block, a size of the current block meets a certain restriction, and the current block does not include a first line of a coding tree unit. Of course, the conditions of supporting the multi-reference line prediction technology are not limited to the above three conditions, and may also include others.

As an example, if the multi-reference line prediction technology may be used, all the reference lines are traversed, the final target reference line is determined through RDO, and the reference line indication information is coded. The reference line indication information may be coded in the coded stream according to specific conditions. As an example, the reference line indication information may be intra_luma_ref_idx.

It should be noted that the line described in the embodiment of the present disclosure may be the line on the upper side of the current block or the column on the left side of the current block.

In 1102, bypass binary arithmetic coding is performed on a second bit of the reference line indication information when it is required to code the second bit of the reference line indication information.

In the embodiment of the present disclosure, if it is determined that the current block supports the multi-reference line prediction mode, and the number of candidate reference lines corresponding to the multi-reference line prediction mode is 3, the reference line indication information corresponding to the multi-reference line prediction mode occupies at most 2 bits. The first bit in the two bits may be coded by using one context model, and the second bit may be coded based on the bypass coding mode. In this way, only one context model is needed in the coding of the all bits of the reference line indication information, such that the number of context models is reduced to further reduce the coding complexity and the memory consumption, and the coding performance remains unchanged basically.

For example, the context model used by the reference line indication information may be shown in Tables 8 and 9 below.

TABLE 8

| The first bin | The second bin |
|---|---|
| MultiRefLineIdx, namely, the first context model | Coding using bypass instead a context model |

TABLE 9

| | Bin Idx | | | | | |
|---|---|---|---|---|---|---|
| Syntax element | 0 | 1 | 2 | 3 | 4 | 5 |
| intra_luma_ref_idx[ ][ ] | 0 | Bypass | na | na | na | na |

Figure 12:
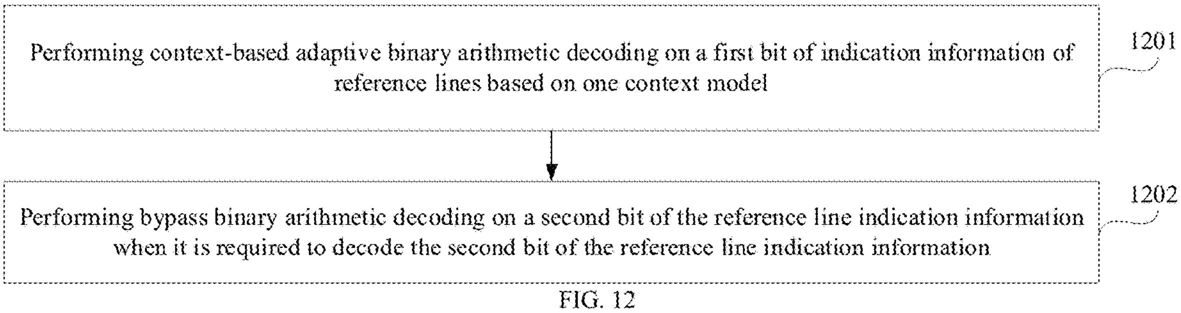
FIG. 12 is a flowchart of a decoding method according to an embodiment of the present disclosure.

FIG. 12 is a flowchart of a decoding method according to an embodiment of the present disclosure. The method is applicable to a decoding terminal and is a decoding method corresponding to the coding method shown in FIG. 11. As shown in FIG. 12, if it is determined that a current block supports the multi-reference line prediction mode and the number of candidate reference lines corresponding to the multi-reference line prediction mode is 3, reference line indication information corresponding to the multi-reference line prediction mode occupies at most 2 bits. The method includes the following steps.

In 1201, context-based adaptive binary arithmetic decoding is performed on a first bit of the reference line indication information based on one context model.

In 1202, bypass binary arithmetic decoding is performed on a second bit of the reference line indication information when it is required to decode the second bit of the reference line indication information.

By decoding the reference line indication information, a target reference line used in predicting the current block based on the multi-reference line prediction mode may be determined based on the reference line indication information, and the current block is predicated by use of the target reference line.

As an example, a coded stream of the current block may be received first; if the current block meets an analytic condition, the reference line indication information is decoded to determine a source of reference pixels of the current block. The analytic condition includes: the current block is a luma intra block, a size of the current block meets a certain restriction, and the current block does not include a first line of a coding tree unit. Of course, the analytic condition is not limited to the above three conditions, and may also include others.

As an example, if the current block can use multi-reference line prediction, intra_luma_ref_idx needs to be analyzed to determine the reference pixel of the current block based on the value of the intra_luma_ref_idx, so as to acquire the predicted value of the current block used in the subsequent reconstruction process.

The Third Implementation of the MRL Mode

In the related art, if it is determined that the current block supports the multi-reference line prediction mode and the number of the candidate reference lines corresponding to the multi-reference line prediction mode is 4, the reference line indication information corresponding to the multi-reference line prediction mode occupies at most 3 bits which need to be coded/decoded by using two different context models, as shown in Tables 10 and 11 below.

TABLE 10

| | Bin Idx | | | | | |
|---|---|---|---|---|---|---|
| Syntax element | 0 | 1 | 2 | 3 | 4 | 5 |
| intra_luma_ref_idx[ ][ ] | 0 | 1 | 2 | na | na | na |

TABLE 11

| The first bin | The second bin | The third bin |
|---|---|---|
| MultiRefLineldx(0) MultiRefLineldx(0), namely, the first context model | MultiRefLineIdx(1), namely, the second context model | MultiRefLineIdx(2), namely, the third context model |

The first bin refers to the first bit of the reference line indication information, and needs to be coded/decoded based on the first context model. The second bin refers to the second bit of the reference line indication information, and needs to be coded/decoded based on the second context model. The third bin refers to the third bit of the reference line indication information, and needs to be coded/decoded based on the third context model. In addition, the three context models are different.

In addition, a corresponding relationship between index information of target reference lines and the corresponding target reference lines is shown in Table 12.

TABLE 12

| intra_luma_ref_idx[x0] [y0] | IntraLumaRefLineIdx[x][y] x = x0..x0 + cbWidth − 1 y = y0..y0 + cbHeight − 1 |
|---|---|
| 0 | 0 |
| 1 | 1 |
| 2 | 2 |
| 3 | 3 |

It can be seen from Table 12 that if the index information indicated by the reference line indication information is 0, the target reference line is the $0^{th}$ line; if the index information indicated by the reference line indication information is 1, the target reference line is the first line; if the index information indicated by the reference line indication information is 2, the target reference line is the second line; if the index information indicated by the reference line indication information is 3, the target reference line is the third line.

Figure 13:
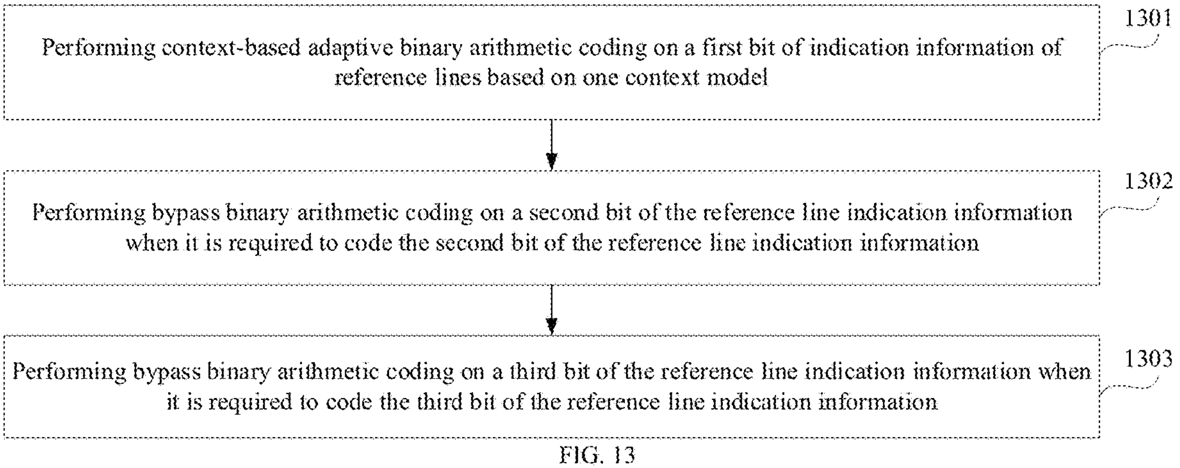
FIG. 13 is a flowchart of a coding method according to an embodiment of the present disclosure.

FIG. 13 is a flowchart of a coding method according to an embodiment of the present disclosure. The method is applicable to a coding terminal. As shown in FIG. 13, if it is determined that a current block supports the multi-reference line prediction mode and the number of candidate reference lines corresponding to the multi-reference line prediction mode is 4, reference line indication information corresponding to the multi-reference line prediction mode occupies at most 3 bits. The method includes the following steps.

In 1301, context-based adaptive binary arithmetic coding is performed on a first bit of the reference line indication information based on one context model.

As an example, whether the current block meets a condition of supporting multi-reference line prediction technology is determined. If the current block meets the condition of supporting the multi-reference line prediction technology, it is determined that the current block may try to use each reference line for coding. The coding terminal may decide a source of a final reference pixel through RDO, and may code reference line index information into a coded stream. The conditions of supporting the multi-reference line prediction technology include: the current block is a luma intra block, a size of the current block meets a certain restriction, and the current block does not include a first line of a coding tree unit. Of course, the conditions of supporting the multi-reference line prediction technology are not limited to the above three conditions, and may also include others.

As an example, if the multi-reference line prediction technology may be used, all the reference lines are traversed, the final target reference line is determined through RDO, and the reference line indication information is coded. The reference line indication information may be coded in the coded stream according to specific conditions. As an example, the reference line indication information may be intra_luma_ref_idx.

In 1302, bypass binary arithmetic coding is performed on a second bit of the reference line indication information when it is required to code the second bit of the reference line indication information.

In 1303, bypass binary arithmetic coding is performed on a third bit of the reference line indication information when it is required to code the third bit of the reference line indication information.

In the embodiment of the present disclosure, if it is determined that the current block supports the multi-reference line prediction mode, and the number of candidate reference lines corresponding to the multi-reference line prediction mode is 4, the reference line indication information corresponding to the multi-reference line prediction mode occupies at most 3 bits. The first bit in the three bits may be coded by using one context model, and the second and third bits may be coded based on the bypass coding mode. In this way, only one context model is needed in the coding of the all bits of the reference line indication information, such that the number of context models is reduced to further reduce the coding complexity and the memory consumption, and the coding performance remains unchanged basically.

For example, the context model used by the reference line indication information may be shown in Tables 13 and 14 below.

TABLE 13

| | Bin Idx | | | | | |
|---|---|---|---|---|---|---|
| Syntax element | 0 | 1 | 2 | 3 | 4 | 5 |
| intra_luma_ref_idx[ ][ ] | 0 | Bypass | Bypass | na | na | na |

TABLE 14

| The first bin | The second bin | The third bin |
|---|---|---|
| MultiRefLineldx(0), namely, the first context model | Coding using bypass instead a context model | Coding using bypass instead a context model |

Figure 14:
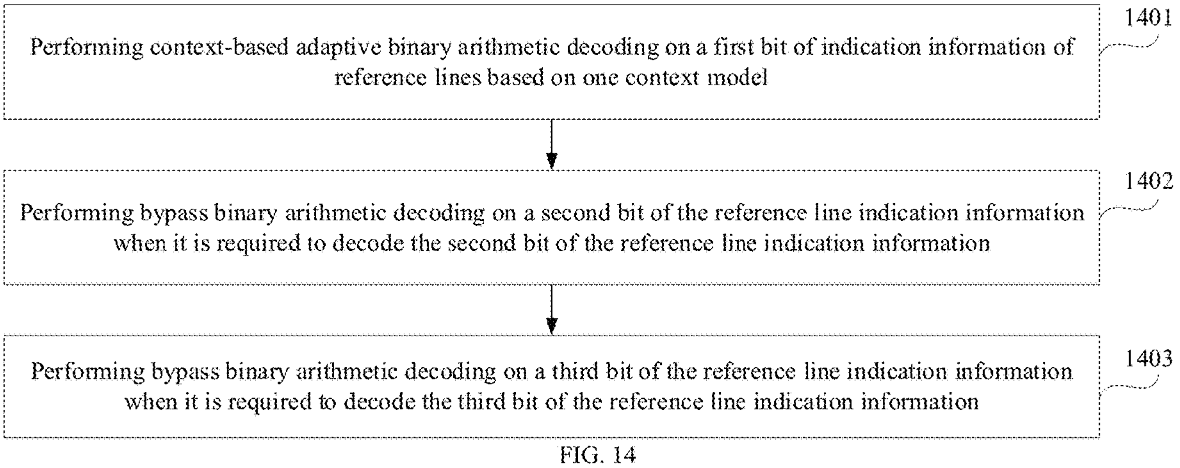
FIG. 14 is a flowchart of a decoding method according to an embodiment of the present disclosure.

FIG. 14 is a flowchart of a decoding method according to an embodiment of the present disclosure. The method is applicable to a decoding terminal and is a decoding method corresponding to the coding method according to the embodiment shown in FIG. 13. As shown in FIG. 14, if it is determined that a current block supports the multi-reference line prediction mode and the number of candidate reference lines corresponding to the multi-reference line prediction mode is 4, reference line indication information corresponding to the multi-reference line prediction mode occupies at most 3 bits. The method includes the following steps.

In 1401, context-based adaptive binary arithmetic decoding is performed on a first bit of the reference line indication information based on one context model.

In 1402, bypass binary arithmetic decoding is performed on a second bit of the reference line indication information when it is required to decode the second bit of the reference line indication information.

In 1403, bypass binary arithmetic decoding is performed on a third bit of the reference line indication information when it is required to decode the third bit of the reference line indication information.

As an example, a coded stream of the current block may be received first; if the current block meets an analytic condition, the reference line indication information is decoded to determine a source of reference pixels of the current block. The analytic condition includes: the current block is a luma intra block, a size of the current block meets a certain restriction, and the current block does not include a first line of a coding tree unit. Of course, the analytic condition is not limited to the above three conditions, and may also include others.

As an example, if the current block may use multi-reference line prediction, intra_luma_ref_idx needs to be analyzed to determine the reference pixel of the current block based on the value of the intra_luma_ref_idx, so as to acquire the predicted value of the current block used in the subsequent reconstruction process.

The Fourth Implementation of the MRL Mode

Figure 15:
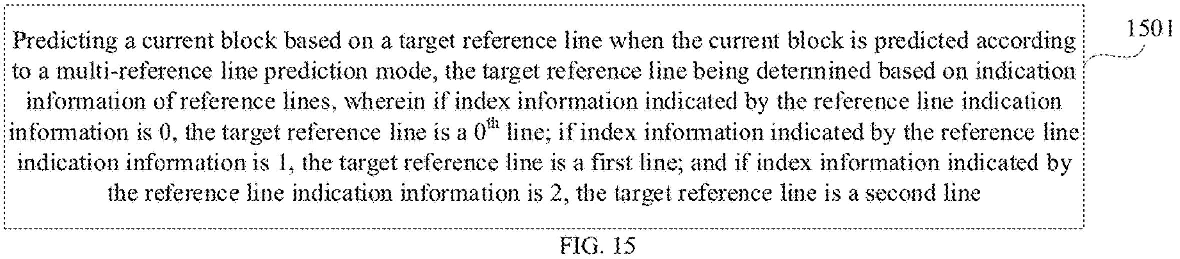
FIG. 15 is a flowchart of a coding/decoding method according to an embodiment of the present disclosure.

FIG. 15 is a flowchart of a coding/decoding method according to an embodiment of the present disclosure. The method is applicable to a coding terminal or a decoding terminal. As shown in FIG. 15, if it is determined that a current block supports the multi-reference line prediction mode and the number of candidate reference lines corresponding to the multi-reference line prediction mode is 3, wherein the candidate reference line having index information of 0 is a $0^{th}$ line, the candidate reference line having index information of 1 is a first line, and the candidate reference line having index information of 2 is a second line, the method includes the following steps.

In 1501, the current block is predicted based on a target reference line when the current block is predicted according to the multi-reference line prediction mode, wherein the target reference line is determined based on indication information of reference lines.

Here, if index information indicated by the reference line indication information is 0, the target reference line is the $0^{th}$ line;

- if index information indicated by the reference line indication information is 1, the target reference line is the first line; and
- if index information indicated by the reference line indication information is 2, the target reference line is the second line.

For example, the index information indicated by the reference line indication information and the corresponding target reference lines may be as shown in Table 15 below.

TABLE 15

| intra_luma_ref_idx[x0] [y0] | IntraLumaRefLineIdx[x][y] x = x0..x0 + cbWidth − 1 y = y0..y0 + cbHeight − 1 |
|---|---|
| 0 | 0 |
| 1 | 1 |
| 2 | 2 |

In the embodiment of the present disclosure, the nearest three lines and three columns may be selected as candidates for the target reference line. That is, the target reference line is one line selected from the candidate reference lines, wherein the number of the candidate reference lines corresponding to the multi-reference line prediction mode is 3, and the three lines and the three columns closest to the boundary of the current block are used as the candidate reference lines.

The Fifth Implementation of the MRL Mode

FIG. 16 is a flowchart of a coding/decoding method according to an embodiment of the present disclosure. The method is applicable to a coding terminal or a decoding terminal. As shown in FIG. 16, if it is determined that a current block supports the multi-reference line prediction mode and the number of candidate reference lines corresponding to the multi-reference line prediction mode is 3, wherein the candidate reference line having index information of 0 is a $0^{th}$ line, the candidate reference line having index information of 1 is a first line, and the candidate reference line having index information of 2 is a second line, the method includes the following steps.

In 1601, the current block is predicted based on a target reference line when the current block is predicted according to the multi-reference line prediction mode, wherein the target reference line is determined based on indication information of reference lines.

Here, if index information indicated by the reference line indication information is 0, the target reference line is the $0^{th}$ line;

- if index information indicated by the reference line indication information is 1, the target reference line is the second line; and
- if index information indicated by the reference line indication information is 2, the target reference line is the third line.

In addition, a corresponding relationship between index information of target reference lines and the corresponding target reference lines is shown in Table 16 below.

TABLE 16

| intra_luma_ref_idx[x0] [y0] | IntraLumaRefLineIdx[x][y] x = x0..x0 + cbWidth − 1 y = y0..y0 + cbHeight − 1 |
|---|---|
| 0 | 0 |
| 1 | 2 |
| 2 | 3 |

In the embodiment of the present disclosure, the $0^{th}$ line, the second line and the third line may be selected as candidates for the target reference line.

The Sixth Implementation of the MRL Mode

FIG. 17 is a flowchart of a coding method according to an embodiment of the present disclosure. The method is applicable to a coding terminal. As shown in FIG. 17, if it is determined that a current block supports the multi-reference line prediction mode, the method includes the following steps.

In 1701, line number indication information is coded based on the number of candidate reference lines corresponding to the multi-reference line prediction mode prior to predicting the current block according to the multi-reference line prediction mode, wherein the line number indication information is configured to indicate the number of the candidate reference lines corresponding to the multi-reference line prediction mode.

In 1702, indication information of reference lines is coded based on a target reference line used in predicting the current block based on the multi-reference line prediction mode, wherein the reference line indication information is configured to indicate index information of the target reference line used in predicting the current block based on the multi-reference line prediction mode.

In 1703, the current block is predicated based on the target reference line.

In the embodiment of the present disclosure, the line number indication information indicating the number of the candidate reference lines corresponding to the multi-reference line prediction mode is added, such that the multi-reference line prediction mode can select the number of the reference lines.

As an example, the line number indication information may exist in a sequence parameter set (SPS), a picture parameter set, a slice level, or a Tile level. Preferably, the line number indication information exists in the sequence parameter set, that is, a syntax for indicating the number of the candidate reference lines corresponding to the multi-reference line prediction mode may be added at the SPS level.

In the embodiment of the present disclosure, the line number indication information indicating the number of the candidate reference lines corresponding to the multi-reference line prediction mode is added, such that the multi-reference line prediction mode can select the number of the reference lines.

As an example, the line number indication information may exist in a sequence parameter set (SPS), a picture parameter set, a slice level, or a Tile level. Preferably, the line number indication information exists in the sequence parameter set, that is, a syntax for indicating the number of the candidate reference lines corresponding to the multi-reference line prediction mode may be added at the SPS level.

AMVR Mode

In the AMVR mode, syntax elements that need to be transmitted between the decoding terminal and the coding terminal may include first AMVR indication information and second AMVR indication information. The first AMVR indication information is configured to indicate whether to enable the AMVR mode, and the second AMVR indication information is configured to indicate index information of pixel precision used in coding or decoding a motion vector difference in the AMVR mode. As an example, the first AMVR indication information is amvr_flag, and the second AMVR indication information is amvr_precision_flag.

In the related art, for an affine prediction mode and a non-affine prediction mode, the non-affine prediction mode refers to prediction modes other than the affine prediction mode. The first AMVR indication information and the second AMVR indication information require 4 context models in total for coding/decoding, as shown in Tables 17 and 18 below.

TABLE 17

| Syntax element | Bin Idx | | | | | |
|---|---|---|---|---|---|---|
| | 0 | 1 | 2 | 3 | 4 | 5 |
| amvr_flag[ ][ ] | inter_affine_flag[ ][ ] ? 0 : 1) | na | na | na | na | na |
| amvr_precision_flag[ ][ ] | inter_affine_flag[ ][ ] ? 0 : 1) | na | na | na | na | na |

FIG. 18 is a flowchart of a coding method according to an embodiment of the present disclosure. The method is applicable to a decoding terminal. As shown in FIG. 18, if it is determined that a current block supports the multi-reference line prediction mode, the method includes the following steps.

In 1801, line number indication information is decoded prior to predicting the current block according to the multi-reference line prediction mode, wherein the line number indication information is configured to indicate the number of candidate reference lines corresponding to the multi-reference line prediction mode.

In 1802, the number of the candidate reference lines corresponding to the multi-reference line prediction mode is determined based on the line number indication information.

In 1803, a target reference line is determined based on the number of the candidate reference lines corresponding to the multi-reference line prediction mode and reference line indication information, wherein the reference line indication information is configured to indicate index information of the target reference line used in predicting the current block based on the multi-reference line prediction mode.

In 1804, the current block is predicated based on the target reference line.

TABLE 18

| | In the affine prediction mode | In the non-affine prediction mode |
|---|---|---|
| amvr_flag[ ][ ] | ImvFlag(2), namely the third context model | ImvFlag(0), namely the first context model |
| amvr_precision_flag[ ][ ] | ImvFlag(3), namely the fourth context model | ImvFlag(1), namely the second context model |

It can be seen from Tables 17 and 18 that if the affine prediction mode is enabled for the current block, it is required to perform context-based adaptive binary arithmetic coding or context-based adaptive binary arithmetic decoding on the first AMVR indication information based on the third context model when coding or decoding the first AMVR indication information. When the second AMVR indication information indicates that the AMVR mode is enabled for the current block, it is required to perform context-based adaptive binary arithmetic coding or context-based adaptive binary arithmetic decoding on the second AMVR indication information based on the fourth context model. If the non-affine prediction mode is enabled for the current block, it is required to perform context-based adaptive binary arithmetic coding or context-based adaptive binary arithmetic decoding on the first AMVR indication information based on the first context model when coding or decoding the first AMVR indication information. When the second AMVR indication information indicates that the AMVR mode is enabled for the current block, it is required to perform context-based adaptive binary arithmetic coding or context-based adaptive binary arithmetic decoding on the second AMVR indication information based on the second context model. That is, totally, four different context models are required to code or decode the AMVR indication information, which consumes higher memory.

The First Implementation of the AMVR Mode

Figure 19:
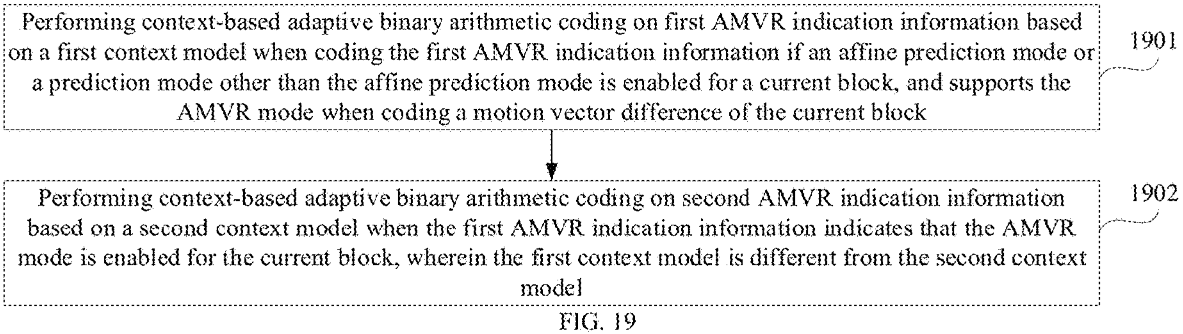
FIG. 19 is a flowchart of a coding method according to an embodiment of the present disclosure.

FIG. 19 is a flowchart of a coding method according to an embodiment of the present disclosure. The method is applicable to a coding terminal. As shown in FIG. 19, the method includes the following steps.

In 1901, context-based adaptive binary arithmetic coding is performed on first AMVR indication information based on a first context model when coding the first AMVR indication information if an affine prediction mode or a prediction mode other than the affine prediction mode is enabled for a current block, and supports the AMVR mode when coding a motion vector difference of the current block.

In 1902, context-based adaptive binary arithmetic coding is performed on second AMVR indication information based on a second context model when the first AMVR indication information indicates that the AMVR mode is enabled for the current block, wherein the first context model is different from the second context model.

As an example, if the current block meets a condition of using the adaptive motion vector precision, the current block may try to use multiple motion vector precisions to code. In an exemplary embodiment, the coding terminal may decide whether to enable the AMVR and may decide adopted motion vector precision through RDO, and may code the corresponding syntax information into the coded stream. The condition of using the adaptive motion vector precision includes: the current block is an inter prediction block, and the motion information of the current clock includes a non-zero motion vector difference. Of course, the condition of using the adaptive motion vector precision is not limited to the above conditions, and may include others.

Figure 20:
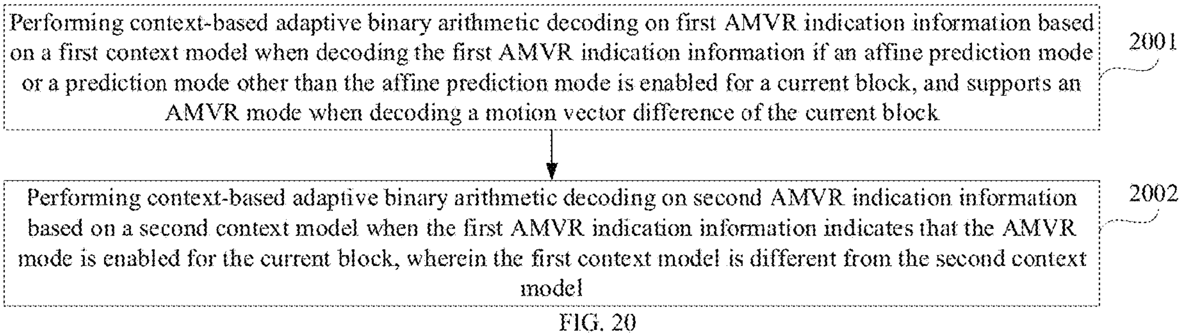
FIG. 20 is a flowchart of a decoding method according to an embodiment of the present disclosure.

FIG. 20 is a flowchart of a decoding method according to an embodiment of the present disclosure. The method is applicable to a decoding terminal and is a decoding method corresponding to the coding method shown in FIG. 19. As shown in FIG. 20, the method includes the following steps.

In 2001, context-based adaptive binary arithmetic decoding is performed on first AMVR indication information based on a first context model when decoding the first AMVR indication information if an affine prediction mode or a prediction mode other than the affine prediction mode is enabled for a current block, and supports an AMVR mode when decoding a motion vector difference of the current block.

As an example, the decoding terminal may receive the coded stream of the current block first, and analyzes the first AMVR to determine whether the AMVR is enabled for the current block, namely, whether the adaptive motion vector precision technology is used, if it is determined that the current block meets an analytic condition. The analytic condition includes: the current block is an intra block, and the current block motion information includes a non-zero motion vector difference. Of course, the analytic condition is not limited to the above conditions, and may include others.

In 2002, context-based adaptive binary arithmetic decoding is performed on second AMVR indication information based on a second context model when the first AMVR indication information indicates that the AMVR mode is enabled for the current block, wherein the first context model is different from the second context model.

When it is determined that the AMVR mode is enabled for the current block, the second AMVR indication information needs to be further analyzed to determine used precision. The decoding terminal may uniquely determine the motion vector precision of the motion information of the current block based on the first AMVR indication information and the second AMVR indication information, so as to acquire a predicted value of the current block used in the subsequent reconstruction process.

In an exemplary embodiment, for the affine prediction mode and the non-affine prediction mode, the context models used by the first AMVR indication information and the second AMVR indication information may be as shown in Table 19 below.

TABLE 19

| | In the affine prediction mode | In the non-affine prediction mode |
|---|---|---|
| amvr_flag[ ][ ] | Sharing one context model, namely, the first context mode | |
| amvr_precision_flag[ ][ ] | Sharing one context model, namely, the second context model | |

In the embodiment of the present disclosure, the AMVR indication information may share the context model in the affine prediction mode and the non-affine affine prediction mode. Thus, the number of the context models required in the AMVR may be reduced to 2, thereby reducing the complexity of coding/decoding and memory overheads.

The Second Implementation of the AMVR Mode

Figure 21:
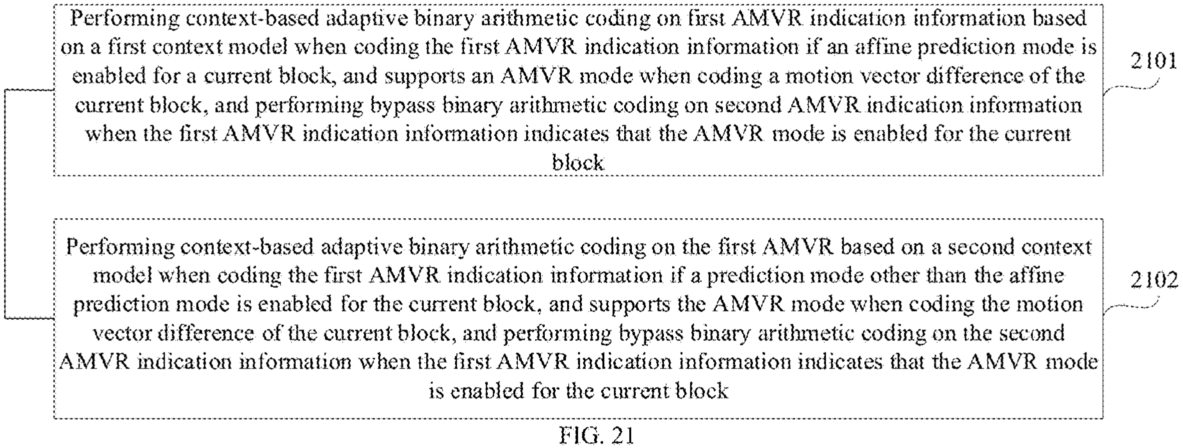
FIG. 21 is a flowchart of a coding method according to an embodiment of the present disclosure.

FIG. 21 is a flowchart of a coding method according to an embodiment of the present disclosure. The method is applicable to a coding terminal. As shown in FIG. 21, the method includes the following steps.

In 2101, context-based adaptive binary arithmetic coding is performed on first AMVR indication information based on a first context model when coding the first AMVR indication information if an affine prediction mode is enabled for a current block, and supports an AMVR mode when coding a motion vector difference of the current block; and bypass binary arithmetic coding is performed on second AMVR indication information when the first AMVR indication information indicates that the AMVR mode is enabled for the current block.

In 2102, context-based adaptive binary arithmetic coding is performed on the first AMVR based on a second context model when coding the first AMVR indication information if a prediction mode other than the affine prediction mode is enabled for the current block, and supports the AMVR mode when coding the motion vector difference of the current block; and bypass binary arithmetic coding is performed on the second AMVR indication information when the first AMVR indication information indicates that the AMVR mode is enabled for the current block.

Figure 22:
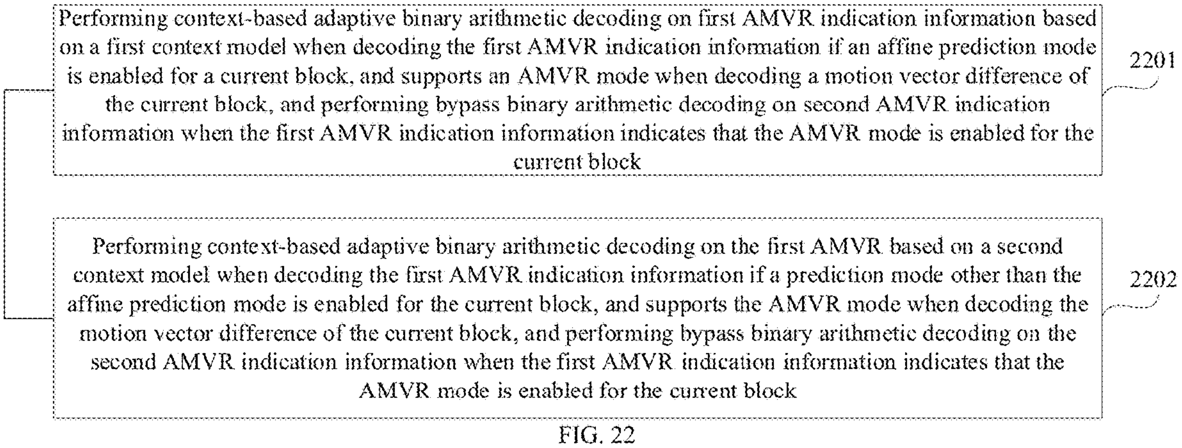
FIG. 22 is a flowchart of a decoding method according to an embodiment of the present disclosure.

FIG. 22 is a flowchart of a decoding method according to an embodiment of the present disclosure. The method is applicable to a decoding terminal and is a decoding method corresponding to the coding method shown in FIG. 21. As shown in FIG. 22, the method includes the following steps.

In 2201, context-based adaptive binary arithmetic decoding is performed on first AMVR indication information based on a first context model when decoding the first AMVR indication information if an affine prediction mode is enabled for a current block, and supports an AMVR mode when decoding a motion vector difference of the current block, and bypass binary arithmetic decoding is performed on second AMVR indication information when the first AMVR indication information indicates that the AMVR mode is enabled for the current block.

In 2202, context-based adaptive binary arithmetic decoding is performed on the first AMVR based on a second context model when decoding the first AMVR indication information if a prediction mode other than the affine prediction mode is enabled for the current block, and supports the AMVR mode when decoding the motion vector difference of the current block, and bypass binary arithmetic decoding is performed on the second AMVR indication information when the first AMVR indication information indicates that the AMVR mode is enabled for the current block.

In an exemplary embodiment, for the affine prediction mode and the non-affine prediction mode, the context models used by the first AMVR indication information and the second AMVR indication information may be as shown in Table 20 below.

TABLE 20

| | In the affine prediction mode | In the non-affine prediction mode |
|---|---|---|
| amvr_flag[ ][ ] | ImvFlag(0), namely the first context model | ImvFlag(1), namely the second context model |
| amvr_precision _flag[ ][ ] | Coding/decoding using bypass instead a context model | Coding/decoding using bypass instead a context model |

In the embodiment of the present disclosure, the coding or decoding of the second AMVR indication information is modified to the bypass binary arithmetic coding or decoding in the affine prediction mode and the non-affine affine prediction mode. Thus, the number of the context models required in the AMVR may be reduced to 2, thereby reducing the complexity of coding/decoding and memory overheads.

The Third Implementation of the AMVR Mode

Figure 23:
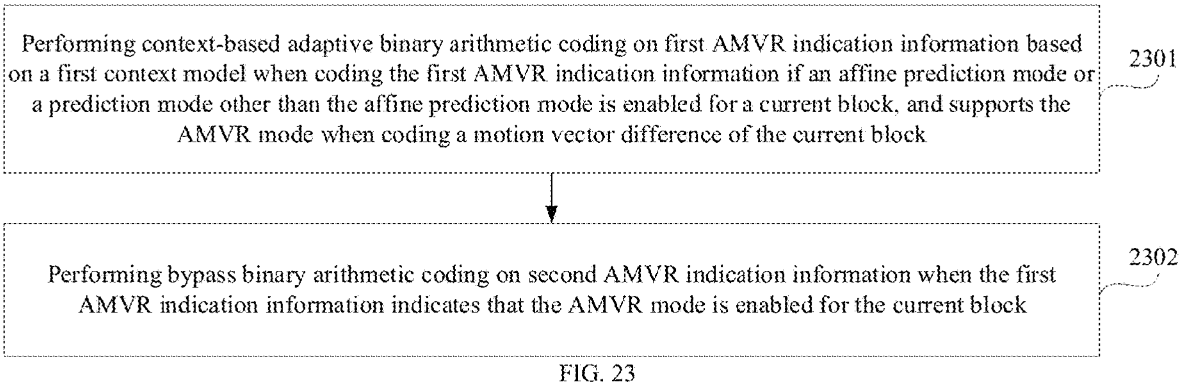
FIG. 23 is a flowchart of a coding method according to an embodiment of the present disclosure.

FIG. 23 is a flowchart of a coding method according to an embodiment of the present disclosure. The method is applicable to a coding terminal. As shown in FIG. 23, the method includes the following steps.

In 2301, context-based adaptive binary arithmetic coding is performed on first AMVR indication information based on a first context model when coding the first AMVR indication information if an affine prediction mode or a prediction mode other than the affine prediction mode is enabled for a current block, and supports the AMVR mode when coding a motion vector difference of the current block.

In 2302, bypass binary arithmetic coding is performed on second AMVR indication information when the first AMVR indication information indicates that the AMVR mode is enabled for the current block.

Figure 24:
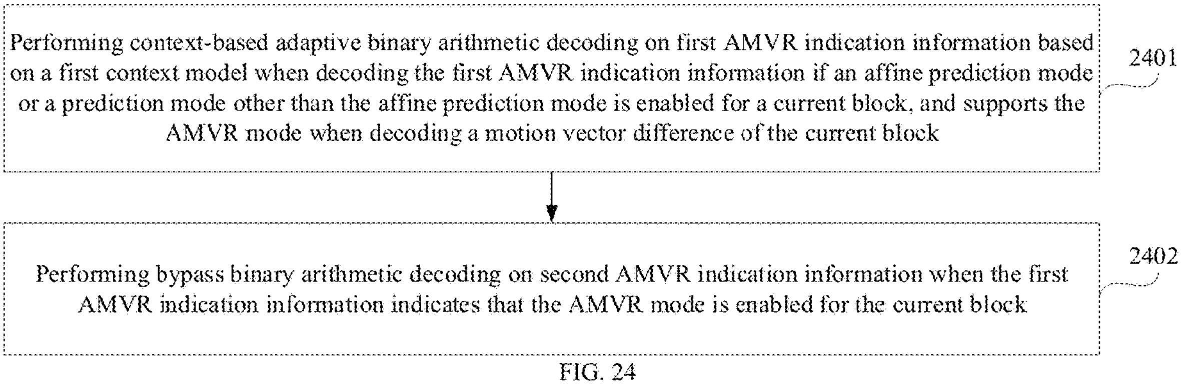
FIG. 24 is a flowchart of a decoding method according to an embodiment of the present disclosure.

FIG. 24 is a flowchart of a decoding method according to an embodiment of the present disclosure. The method is applicable to a decoding terminal and is a decoding method corresponding to the coding method shown in FIG. 23. As shown in FIG. 24, the method includes the following steps.

In 2401, context-based adaptive binary arithmetic decoding is performed on first AMVR indication information based on a first context model when decoding the first AMVR indication information if an affine prediction mode or a prediction mode other than the affine prediction mode is enabled for a current block, and supports the AMVR mode when decoding a motion vector difference of the current block.

In 2402, bypass binary arithmetic decoding is performed on second AMVR indication information when the first AMVR indication information indicates that the AMVR mode is enabled for the current block.

In an exemplary embodiment, for the affine prediction mode and the non-affine prediction mode, the context models used by the first AMVR indication information and the second AMVR indication information may be as shown in Table 21 below.

TABLE 21

| | In the affine prediction mode | In the non-affine prediction mode |
|---|---|---|
| amvr_flag[ ][ ] | Sharing one context model, namely, the first context model | |
| amvr_precision_ flag[ ][ ] | Coding/decoding using bypass instead a context model | Coding/decoding using bypass instead a context model |

In the embodiment of the present disclosure, in the affine prediction mode and the non-affine affine prediction mode, the first AMVR indication information share one context model, and the coding or decoding of the second AMVR indication information is modified to the bypass binary arithmetic coding or decoding. Thus, the number of the context models required in the AMVR may be reduced to 1, thereby reducing the complexity of coding/decoding and memory overheads.

The Fourth Implementation of the AMVR Mode

In another embodiment, a coding method is also provided. The method is applicable to a coding terminal, and includes the following steps.

In step 1, context-based adaptive binary arithmetic coding is performed on first AMVR indication information based on a first context model when coding the first AMVR indication information if an affine prediction mode is enabled for a current block, and supports an AMVR mode when coding a motion vector difference of the current block; and context-based adaptive binary arithmetic coding is performed on second AMVR indication information based on a second context model when the first AMVR indication information indicates that the AMVR mode is enabled for the current block.

In step 2, context-based adaptive binary arithmetic coding is performed on the first AMVR indication information based on a third context model when coding the first AMVR indication information if a prediction mode other than the affine prediction mode is enabled for the current block, and supports the AMVR mode when coding the motion vector difference of the current block, and context-based adaptive binary arithmetic coding is performed on the second AMVR indication information based on the second context model when the first AMVR indication information indicates that the AMVR mode is enabled for the current block.

The first context model, the second context model, and the third context model are different.

In another embodiment, a decoding method is also provided. The method is applicable to a decoding terminal and is a decoding method corresponding to the above coding method, and includes the following steps.

In step 1, context-based adaptive binary arithmetic decoding is performed on first AMVR indication information based on a first context model when decoding the first AMVR indication information if an affine prediction mode is enabled for a current block, and supports an AMVR mode when decoding a motion vector difference of the current block, and context-based adaptive binary arithmetic decoding is performed on second AMVR indication information based on a second context model when the first AMVR indication information indicates that the AMVR mode is enabled for the current block.

In step 2, context-based adaptive binary arithmetic decoding is performed on the first AMVR indication information based on a third context model when decoding the first AMVR indication information if a prediction mode other than the affine prediction mode is enabled for the current block, and supports the AMVR mode when decoding the motion vector difference of the current block, and context-based adaptive binary arithmetic decoding is performed on the second AMVR indication information based on the second context model when the first AMVR indication information indicates that the AMVR mode is enabled for the current block.

The first context model, the second context model, and the third context model are different.

In an exemplary embodiment, for the affine prediction mode and the non-affine prediction mode, the context models used by the first AMVR indication information and the second AMVR indication information may be as shown in Table 22 below.

TABLE 22

| | In the affine prediction mode | In the non-affine prediction mode |
|---|---|---|
| amvr_flag[ ][ ] | ImvFlag(0), namely the first context model | ImvFlag(2), namely the third context model |
| amvr_precision_ flag[ ][ ] | ImvFlag(1), namely the second context model | |

In the embodiment of the present disclosure, the second AMVR indication information may share one context model in the affine prediction mode and the non-affine affine prediction mode. Thus, the number of the context models required in the AMVR mode may be reduced to 3, thereby reducing the complexity of coding/decoding and memory overheads.

Luma MPM

When a current block is a luma block, prediction mode index information needs to be transmitted between the coding terminal and the decoding terminal. The prediction mode index information is configured to indicate index information of a target prediction mode of the current block in an MPM list. The coding terminal and the decoding terminal store the MPM list which may be shared by the conventional intra prediction mode, intra sub-block prediction mode and multi-reference line prediction mode.

In the related art, when a reference line of the target prediction mode of the current block is an adjacent line of the current block, two different context models are required, and context-based adaptive binary arithmetic coding or decoding is performed on a first bit of the prediction mode index information. The specific context model used depends on whether the intra sub-block prediction mode is enabled for the current block.

In an exemplary embodiment, the context model used by the prediction mode index information is shown in Table 23 below.

TABLE 23

| | Bin Idx | | | | | |
|---|---|---|---|---|---|---|
| Syntax element | 0 | 1 | 2 | 3 | 4 | 5 |
| intra_luma_mpm_idx[ ][ ] | intra_luma_ref_idx!= 0 ? na: (intra_subpartitions_mode_flag? 0: 1) | Bypass | Bypass | Bypass | Bypass | na |

The prediction mode index information is intra_luma_mpm_idx. When the intra_luma_ref_idx is equal to 0, it means that the reference line of the target prediction mode of the current block is the adjacent line of the current block, that is, the multi-reference line prediction mode is not enabled for the current block. When the intra_luma_ref_idx is not equal to 0, it means that the reference line of the target prediction mode of the current block is not the adjacent line of the current block, that is, the multi-reference line prediction mode is enabled for the current block.

It can be seen from Table 22 that when the intra_luma_ref_idx is equal to 0, the first bit of the intra_luma_mpm_idx needs to select a context model from two different context models for coding/decoding based on whether the intra sub-block prediction mode is enabled for the current block. In addition, when the intra_luma_ref_idx is not equal to 0, it means that the multi-reference line prediction mode is enabled for the current block, and the target prediction mode of the multi-reference line prediction mode enabled for the current block also is from the MPM list.

The First Implementation of the Luma MPM

Figure 25:
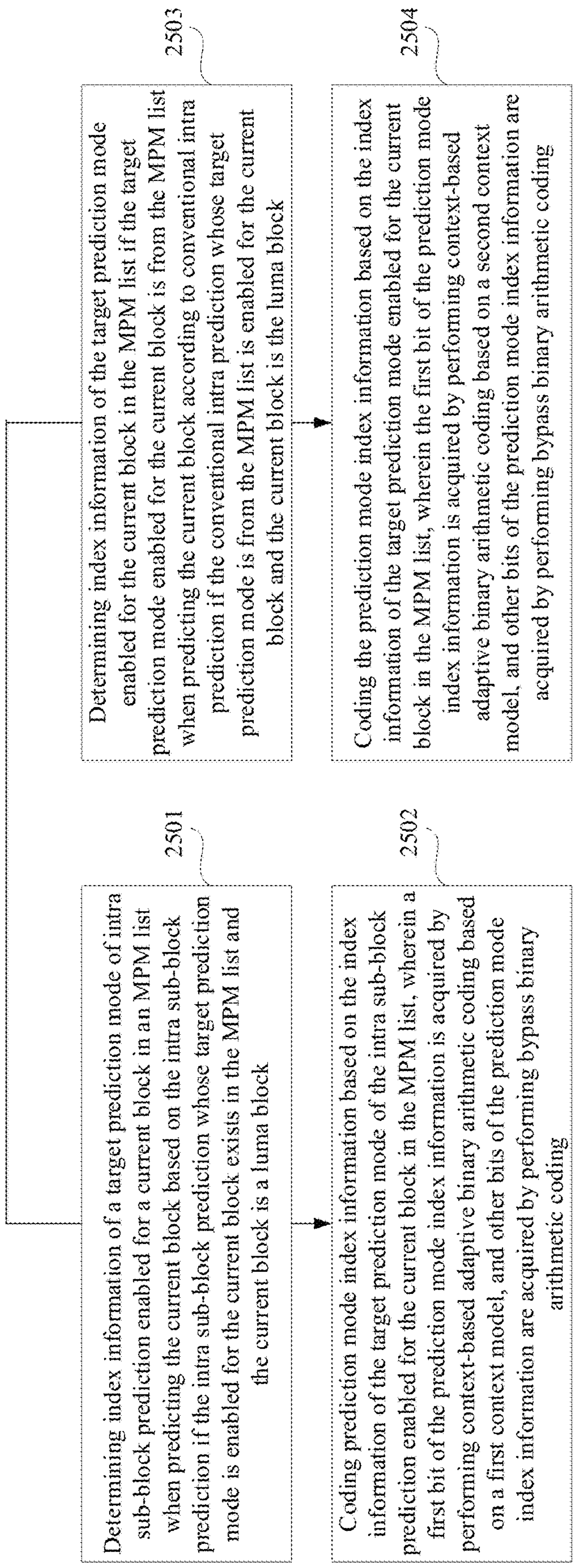
FIG. 25 is a flowchart of a coding method according to an embodiment of the present disclosure.

FIG. 25 is a flowchart of a coding method according to an embodiment of the present disclosure. The method is applicable to a coding terminal. As shown in FIG. 25, the method includes the following steps.

In 2501, index information of a target prediction mode of intra sub-block prediction enabled for a current block in an MPM list is determined when predicting the current block based on the intra sub-block prediction if the intra sub-block prediction whose target prediction mode is enabled for the current block exists in the MPM list and the current block is a luma block.

In 2502, prediction mode index information is coded based on the index information of the target prediction mode of the intra sub-block prediction enabled for the current block in the MPM list, wherein a first bit of the prediction mode index information is acquired by performing context-based adaptive binary arithmetic coding based on a first context model, and other bits of the prediction mode index information are acquired by performing bypass binary arithmetic coding.

In 2503, index information of the target prediction mode enabled for the current block in the MPM list is determined if the target prediction mode enabled for the current block is from the MPM list when predicting the current block according to conventional intra prediction if the conventional intra prediction whose target prediction mode is from the MPM list is enabled for the current block and the current block is the luma block.

In 2504, the prediction mode index information is coded based on the index information of the target prediction mode enabled for the current block in the MPM list, wherein the first bit of the prediction mode index information is acquired by performing context-based adaptive binary arithmetic coding based on a second context model, and other bits of the prediction mode index information are acquired by performing bypass binary arithmetic coding.

As an example, if the conventional intra prediction mode is enabled for the current block, a flag bit is further required to indicate whether the target prediction mode of the conventional prediction enabled for the current block is from the MPM list. If it is determined that the target prediction mode is from the MPM list, the index information of the target prediction mode in the MPM list is determined. If the target prediction mode does not derive from the MPM list, there is no need to determine the index information of the target prediction mode in the MPM list.

As an example, the coding terminal may construct the MPM list which may be shared by the intra sub-block prediction mode, the multi-reference line prediction mode and conventional intra prediction mode.

As an example, the coding terminal may select the finally used prediction mode, i.e., the target prediction mode, through RDO. If the target prediction mode is the intra sub-block prediction mode or the multi-reference line prediction mode, the target prediction mode must be selected from the MPM list, and the prediction mode index information (intra_luma_mpm_idx) is required to be coded to inform the decoding terminal which prediction mode is selected. If the target prediction mode is the conventional intra prediction, a flag bit is further required to be coded to indicate whether the target prediction mode of the conventional prediction enabled for the current block is from the MPM list. If it is determined that the target prediction mode is from the MPM list, the index information of the target prediction mode in the MPM list is determined. If the target prediction mode does not derive from the MPM list, there is no need to determine the index information of the target prediction mode in the MPM list.

Figure 26:
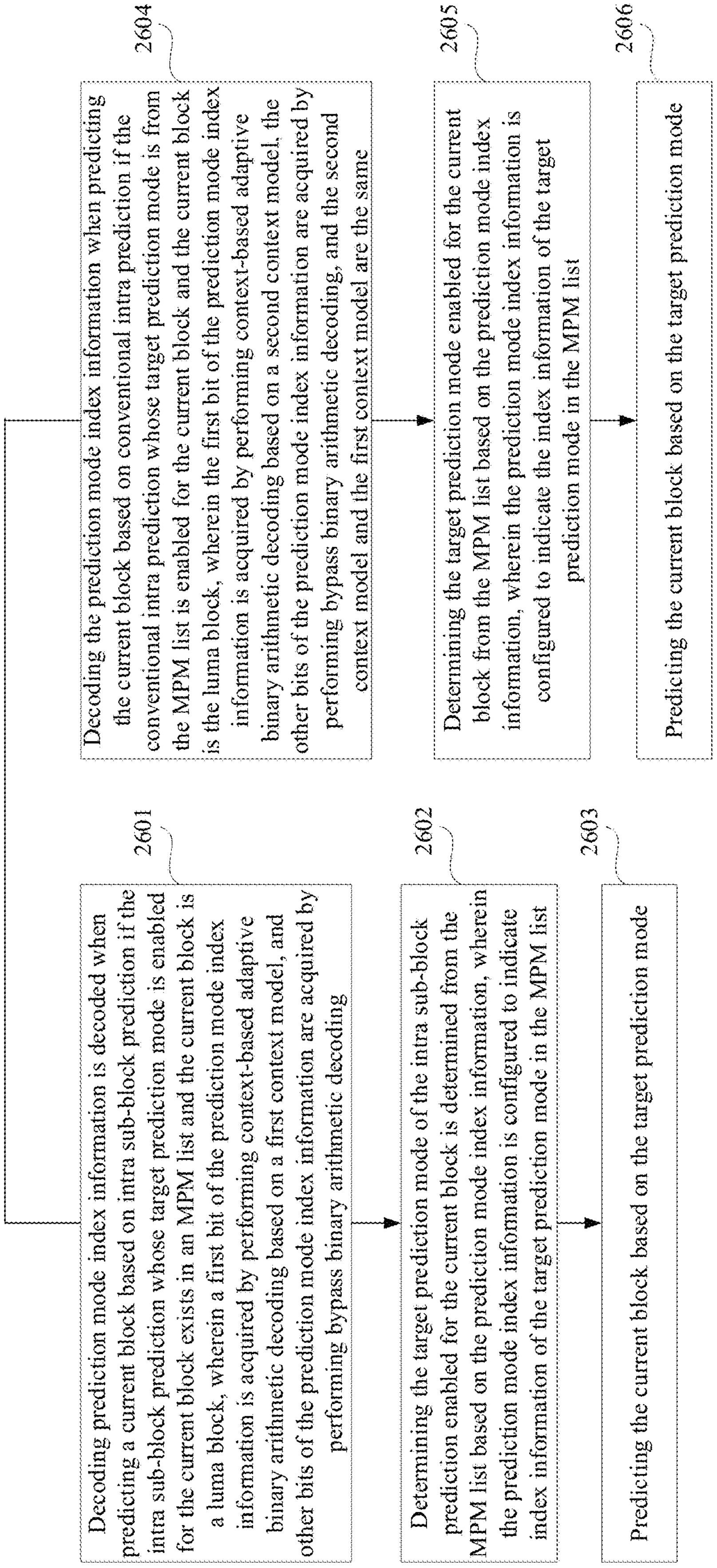
FIG. 26 is a flowchart of a decoding method according to an embodiment of the present disclosure.

FIG. 26 is a flowchart of a decoding method according to an embodiment of the present disclosure. The method is applicable to a decoding terminal and is a decoding method corresponding to the coding method shown in FIG. 25. As shown in FIG. 26, the method includes the following steps.

In 2601, prediction mode index information is decoded when predicting a current block based on intra sub-block prediction if the intra sub-block prediction whose target prediction mode is enabled for the current block exists in an MPM list and the current block is a luma block, wherein a first bit of the prediction mode index information is acquired by performing context-based adaptive binary arithmetic decoding based on a first context model, and other bits of the prediction mode index information are acquired by performing bypass binary arithmetic decoding.

In 2602, the target prediction mode of the intra sub-block prediction enabled for the current block is determined from the MPM list based on the prediction mode index information, wherein the prediction mode index information is configured to indicate index information of the target prediction mode in the MPM list.

In 2603, the current block is predicated based on the target prediction mode.

In 2604, the prediction mode index information is decoded when predicting the current block based on conventional intra prediction if the conventional intra prediction whose target prediction mode is from the MPM list is enabled for the current block and the current block is the luma block, wherein the first bit of the prediction mode index information is acquired by performing context-based adaptive binary arithmetic decoding based on a second context model, the other bits of the prediction mode index information are acquired by performing bypass binary arithmetic decoding, and the second context model and the first context model are the same.

In 2605, the target prediction mode enabled for the current block is determined from the MPM list based on the prediction mode index information, wherein the prediction mode index information is configured to indicate the index information of the target prediction mode in the MPM list.

In 2606, the current block is predicated based on the target prediction mode.

As an example, the decoding terminal may first receive the coded stream, and may acquire a final target predication mode by analyzing an index value of the final target predication mode in the MPM list based on the premise that the used target predication mode must be from the MPM list if the intra sub-block prediction mode is enabled for the current block or the multi-reference line prediction mode and that the conventional intra prediction, the intra sub-block prediction mode and the multi-reference line prediction mode construct the same MPM list. If the conventional intra prediction is enabled for the current block, a flag bit is further required to be analyzed to determine whether the target prediction mode is from the MPM list. If it is from the MPM list, an index value of the target prediction mode in the MPM list is analyzed.

The decoding terminal may uniquely determine the prediction mode of the current block based on the value of the above flag bit, so as to acquire a predicted value of the current block used in the subsequent reconstruction process.

In the embodiment of the present disclosure, if the reference line of the target prediction mode of the current block is the adjacent line of the current block, when coding or decoding the first bit of the prediction mode index information, the same context model may be used no matter whether the intra sub-block prediction mode is enabled for the current block or not instead of selecting the context model from two different context models depending on whether the intra sub-block prediction mode is enabled for the current block, so as to perform context-based adaptive binary arithmetic coding or decoding on the first bit of the prediction mode index information. Thus, the number of the required context models may be reduced to 1, thereby reducing the complexity of the coding/decoding and the memory overheads.

As an example, the context model used by the prediction mode index information is shown in Table 24 below.

TABLE 24

| | Bin Idx | | | | | |
|---|---|---|---|---|---|---|
| Syntax element | 0 | 1 | 2 | 3 | 4 | 5 |
| intra_luma_mpm_idx[ ][ ] | intra_luma_ref_idx! = 0 ? na: 0) | Bypass | Bypass | Bypass | Bypass | na |

That is, when intra_luma_ref_idx is equal to 0, the context-based adaptive binary arithmetic coding or decoding may be performed on the first bit of the intra_luma_mpm_idx based on the same context model no matter whether the intra sub-block prediction mode is enabled for the current block or not.

The Second Implementation of the Luma MPM

Figure 27:
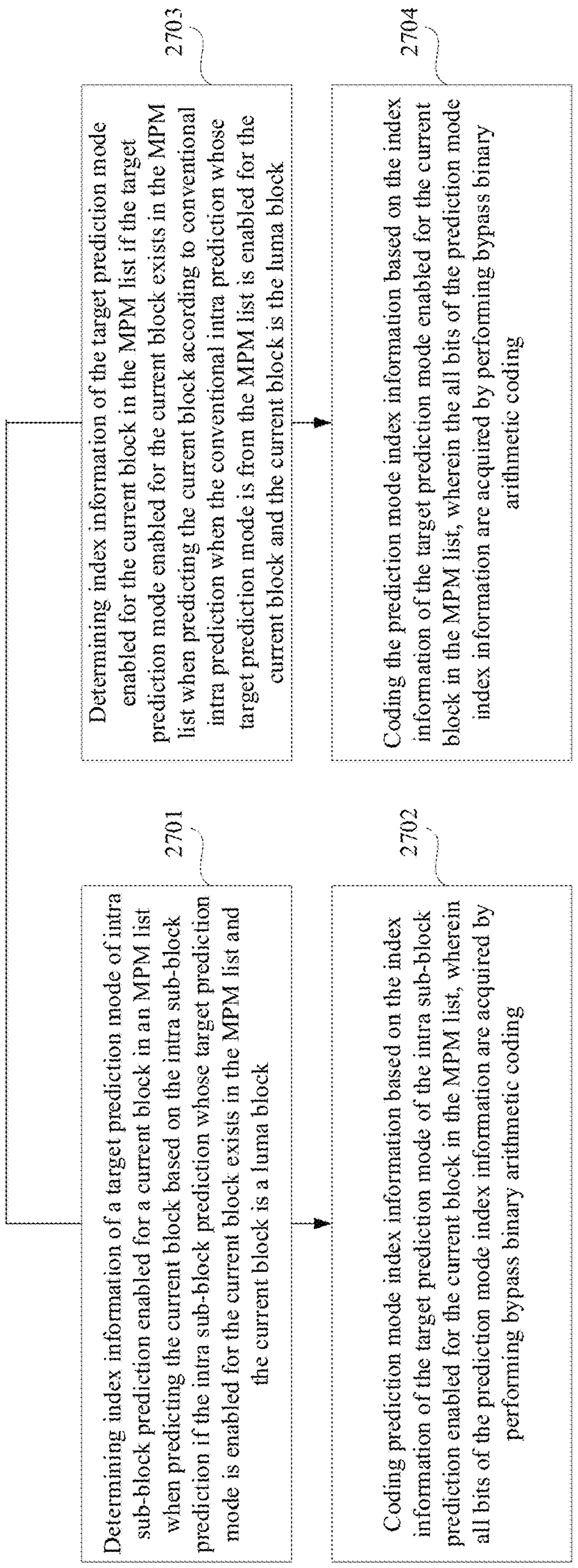
FIG. 27 is a flowchart of a coding method according to an embodiment of the present disclosure.

FIG. 27 is a flowchart of a coding method according to an embodiment of the present disclosure. The method is applicable to a coding terminal. As shown in FIG. 27, the method includes the following steps:

In 2701, index information of a target prediction mode of intra sub-block prediction enabled for a current block in an MPM list is determined when predicting the current block based on the intra sub-block prediction if the intra sub-block prediction whose target prediction mode is enabled for the current block exists in the MPM list and the current block is a luma block.

In 2702, prediction mode index information is coded based on the index information of the target prediction mode of the intra sub-block prediction enabled for the current block in the MPM list, wherein all bits of the prediction mode index information are acquired by performing bypass binary arithmetic coding.

In 2703, index information of the target prediction mode enabled for the current block in the MPM list is determined if the target prediction mode enabled for the current block exists in the MPM list when predicting the current block according to conventional intra prediction when the conventional intra prediction whose target prediction mode is from the MPM list is enabled for the current block and the current block is the luma block.

In 2704, the prediction mode index information is coded based on the index information of the target prediction mode enabled for the current block in the MPM list, wherein the all bits of the prediction mode index information are acquired by performing bypass binary arithmetic coding.

As an example, if the conventional intra prediction block is enabled for the current block, a flag bit is further required to indicate whether the target prediction mode of the conventional prediction enabled for the current block is from the MPM list. If it is determined that the target prediction mode is from the MPM list, the index information of the target prediction mode in the MPM list is determined. If the target prediction mode does not derive from the MPM list, there is no need to determine the index information of the target prediction mode in the MPM list.

Figure 28:
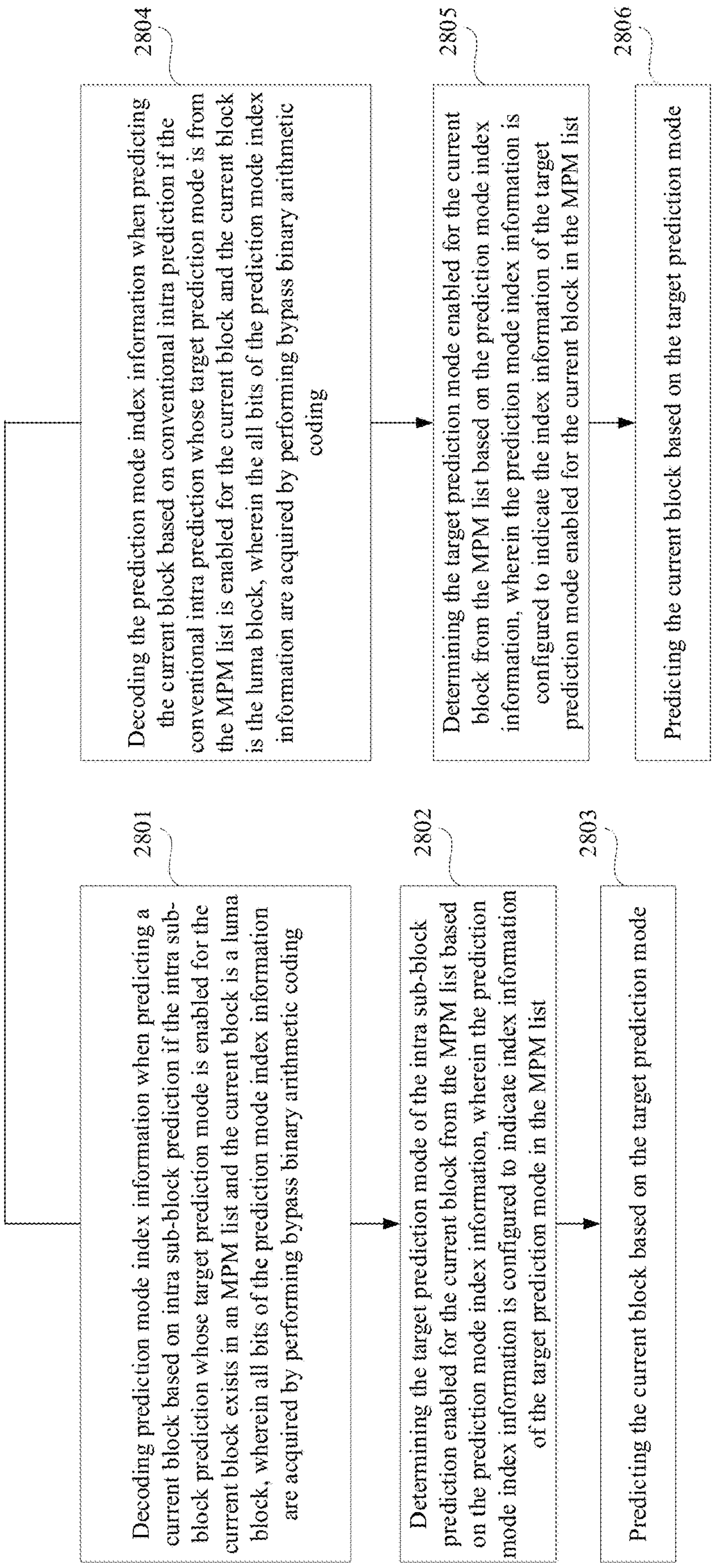
FIG. 28 is a flowchart of a decoding method according to an embodiment of the present disclosure.

FIG. 28 is a flowchart of a decoding method according to an embodiment of the present disclosure. The method is applicable to a decoding terminal and is a decoding method corresponding to the coding method shown in FIG. 27. As shown in FIG. 28, the method includes the following steps.

In 2801, prediction mode index information is decoded when predicting a current block based on intra sub-block prediction if the intra sub-block prediction whose target prediction mode is enabled for the current block exists in an MPM list and the current block is a luma block, wherein all bits of the prediction mode index information are acquired by performing bypass binary arithmetic coding.

In 2802, the target prediction mode of the intra sub-block prediction enabled for the current block is determined from the MPM list based on the prediction mode index information, wherein the prediction mode index information is configured to indicate index information of the target prediction mode in the MPM list.

In 2803, the current block is predicated based on the target prediction mode.

In 2804, the prediction mode index information is decoded when predicting the current block based on conventional intra prediction if the conventional intra prediction whose target prediction mode is from the MPM list is enabled for the current block and the current block is the luma block, wherein the all bits of the prediction mode index information are acquired by performing bypass binary arithmetic coding.

In 2805, the target prediction mode enabled for the current block is determined from the MPM list based on the prediction mode index information, wherein the prediction mode index information is configured to indicate the index information of the target prediction mode enabled for the current block in the MPM list.

In 2806, the current block is predicated based on the target prediction mode.

In the embodiment of the present disclosure, if the reference line of the target prediction mode of the current block is the adjacent line of the current block, that is, when intra_luma_ref_idx is equal to 0, when coding or decoding the first bit of the prediction mode index information, regardless of whether the intra sub-block prediction mode is enabled for the current block or not, that is, in the two different conditions that the intra sub-block prediction mode is enabled for the current block and the intra sub-block prediction mode is not enabled for the current block, bypass binary arithmetic coding or decoding is performed on the first bit of the prediction mode index information. Thus, the first bit of the prediction mode index information does not need to use the context model, such that the number of the required context models is reduced to 0, thereby reducing the complexity of coding/decoding and the memory overheads.

As an example, the context model used by the prediction mode index information is shown in Table 25 below.

TABLE 25

| | Bin Idx | | | | | |
|---|---|---|---|---|---|---|
| Syntax element | 0 | 1 | 2 | 3 | 4 | 5 |
| intra_luma_mpm_idx[ ][ ] | intra_luma_ref_idx! = 0 ? na: Bypass) | Bypass | Bypass | Bypass | Bypass | na |

That is, when intra_luma_ref_idx is equal to 0, bypass binary arithmetic coding or decoding is performed on the first bit of the intra_luma_mpm_idx no matter whether the intra sub-block prediction mode is enabled for the current block or not.

The Third Implementation of the Luma MPM

Figure 29:
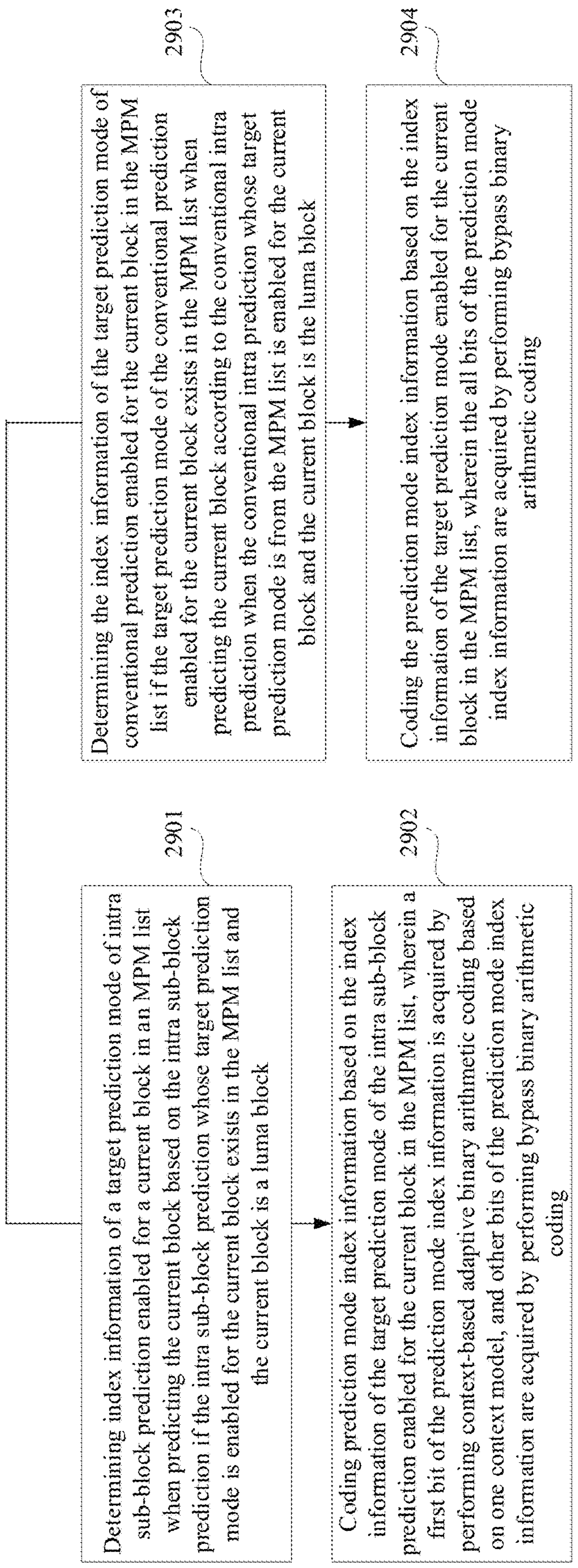
FIG. 29 is a flowchart of a coding method according to an embodiment of the present disclosure.

FIG. 29 is a flowchart of a coding method according to an embodiment of the present disclosure. The method is applicable to a coding terminal. As shown in FIG. 29, the method includes the following steps.

In 2901, index information of a target prediction mode of intra sub-block prediction enabled for a current block in an MPM list is determined when predicting the current block based on the intra sub-block prediction if the intra sub-block prediction whose target prediction mode is enabled for the current block exists in the MPM list and the current block is a luma block.

In 2902, prediction mode index information is coded based on the index information of the target prediction mode of the intra sub-block prediction enabled for the current block in the MPM list, wherein a first bit of the prediction mode index information is acquired by performing context-based adaptive binary arithmetic coding based on one context model, and other bits of the prediction mode index information are acquired by performing bypass binary arithmetic coding.

In 2903, the index information of the target prediction mode of conventional prediction enabled for the current block in the MPM list is determined if the target prediction mode of the conventional prediction enabled for the current block exists in the MPM list when predicting the current block according to the conventional intra prediction when the conventional intra prediction whose target prediction mode is from the MPM list is enabled for the current block and the current block is the luma block.

In 2904, the prediction mode index information is coded based on the index information of the target prediction mode enabled for the current block in the MPM list, wherein the all bits of the prediction mode index information are acquired by performing bypass binary arithmetic coding.

As an example, if the conventional intra prediction block is enabled for the current block, a flag bit is further required to indicate whether the target prediction mode of the conventional prediction enabled for the current block is from the MPM list. If it is determined that the target prediction mode is from the MPM list, the index information of the target prediction mode in the MPM list is determined. If the target prediction mode does not derive from the MPM list, there is no need to determine the index information of the target prediction mode in the MPM list.

Figure 30:
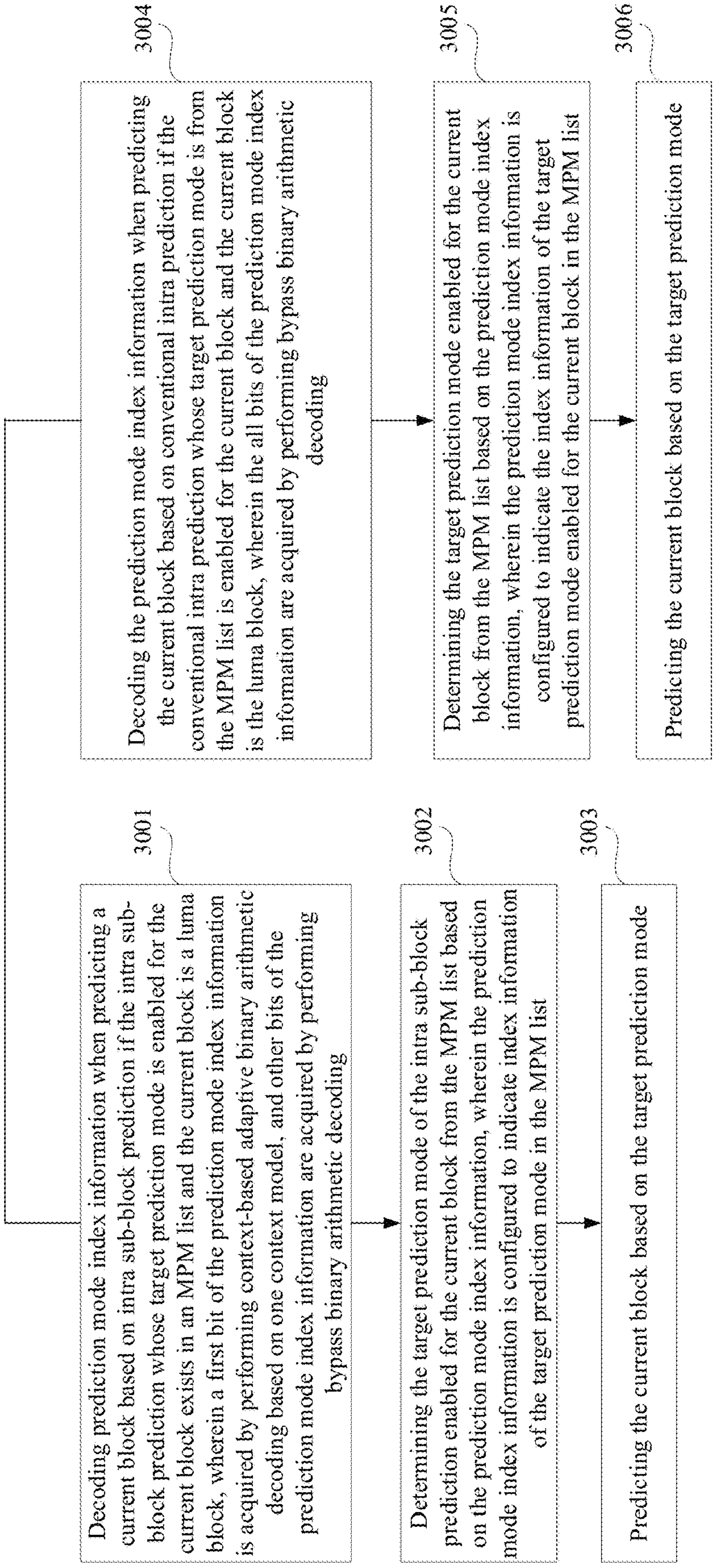
FIG. 30 is a flowchart of a decoding method according to an embodiment of the present disclosure.

FIG. 30 is a flowchart of a decoding method according to an embodiment of the present disclosure. The method is applicable to a decoding terminal and is a decoding method corresponding to the coding method shown in FIG. 29. As shown in FIG. 30, the method includes the following steps.

In 3001, prediction mode index information is decoded when predicting a current block based on intra sub-block prediction if the intra sub-block prediction whose target prediction mode is enabled for the current block exists in an MPM list and the current block is a luma block, wherein a first bit of the prediction mode index information is acquired by performing context-based adaptive binary arithmetic decoding based on one context model, and other bits of the prediction mode index information are acquired by performing bypass binary arithmetic decoding.

In 3002, the target prediction mode of the intra sub-block prediction enabled for the current block is determined from the MPM list based on the prediction mode index information, wherein the prediction mode index information is configured to indicate index information of the target prediction mode in the MPM list.

In 3003, the current block is predicated based on the target prediction mode.

In 3004, the prediction mode index information is decoded when predicting the current block based on conventional intra prediction if the conventional intra prediction whose target prediction mode is from the MPM list is enabled for the current block and the current block is the luma block, wherein the all bits of the prediction mode index information are acquired by performing bypass binary arithmetic decoding.

In 3005, the target prediction mode enabled for the current block is determined from the MPM list based on the prediction mode index information, wherein the prediction mode index information is configured to indicate the index information of the target prediction mode enabled for the current block in the MPM list.

In 3006, the current block is predicated based on the target prediction mode.

In the embodiment of the present disclosure, if the reference line of the target prediction mode of the current block is the adjacent line of the current block, that is, when intra_luma_ref_idx is equal to 0, when coding or decoding the prediction mode index information, if the intra sub-block prediction mode is enabled for the current block, based on one context model, the context-based adaptive binary arithmetic coding or decoding is performed on the first bit of the prediction mode index information. If the intra sub-block prediction mode is not enabled for the current block, bypass binary arithmetic coding or decoding is performed on the first bit of the prediction mode index information. Thus, only one context model is required for the coding/decoding of the prediction mode index information, such that the number of the required context models is reduced to 1, thereby reducing the complexity of coding/decoding and the memory overheads.

As an example, the context model used by the prediction mode index information is shown in Table 26 below.

TABLE 26

| | Bin Idx | | | | | |
|---|---|---|---|---|---|---|
| Syntax element | 0 | 1 | 2 | 3 | 4 | 5 |
| intra_luma_mpm_idx[ ][ ] | intra_luma_ref_idx! = 0 ? na: (intra_subpartitions_mode_flag? 0: Bypass) | Bypass | Bypass | Bypass | Bypass | na |

That is, when the intra_luma_ref_idx is equal to 0, and the ISP mode is enabled for the current block, the first bit of the intra_luma_mpm_idx is coded/decoded by using one context model. When the ISP mode is not enabled for the current block, the first bit of the intra_luma_ref_idx is coded/decoded by using Bypass.

The Fourth Implementation of the Luma MPM

Figure 31:
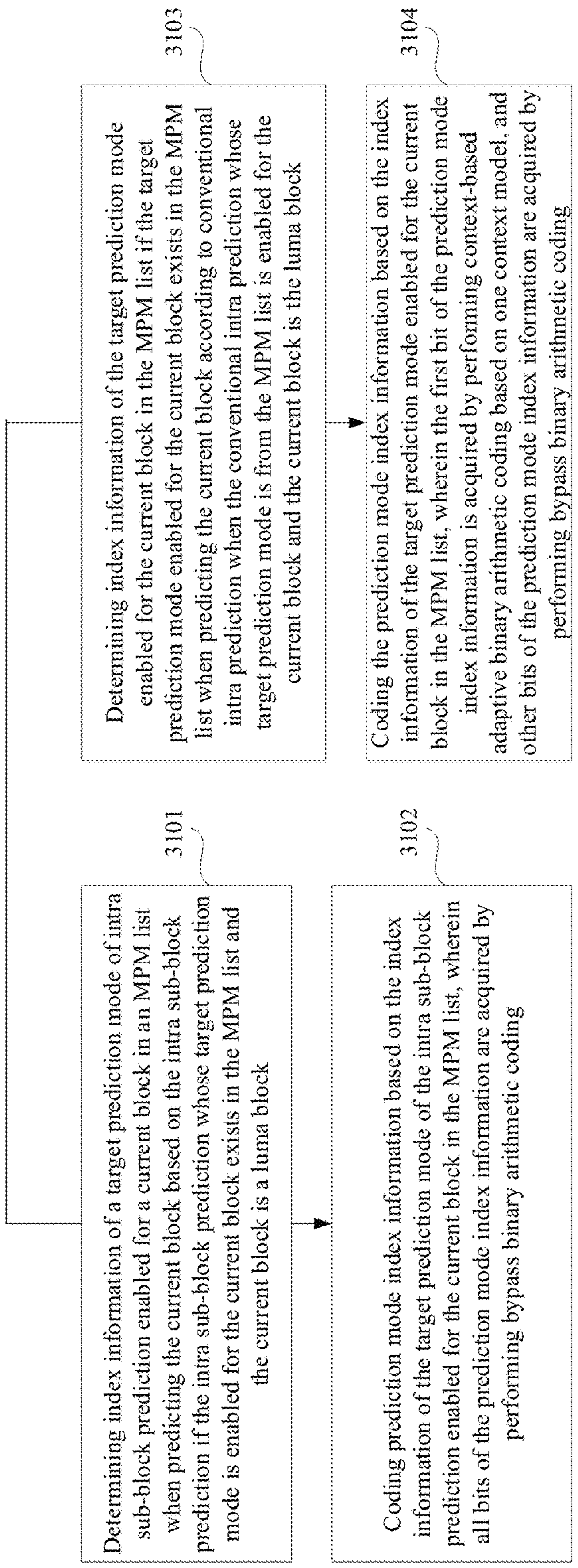
FIG. 31 is a flowchart of a coding method according to an embodiment of the present disclosure.

FIG. 31 is a flowchart of a coding method according to an embodiment of the present disclosure. The method is applicable to a coding terminal. As shown in FIG. 31, the method includes the following steps.

In 3101, index information of a target prediction mode of intra sub-block prediction enabled for a current block in an MPM list is determined when predicting the current block based on the intra sub-block prediction if the intra sub-block prediction whose target prediction mode is enabled for the current block exists in the MPM list and the current block is a luma block.

In 3102, prediction mode index information is coded based on the index information of the target prediction mode of the intra sub-block prediction enabled for the current block in the MPM list, wherein all bits of the prediction mode index information are acquired by performing bypass binary arithmetic coding.

In 3103, index information of the target prediction mode enabled for the current block in the MPM list is determined if the target prediction mode enabled for the current block exists in the MPM list when predicting the current block according to conventional intra prediction when the conventional intra prediction whose target prediction mode is from the MPM list is enabled for the current block and the current block is the luma block.

In 3104, the prediction mode index information is coded based on the index information of the target prediction mode enabled for the current block in the MPM list, wherein the first bit of the prediction mode index information is acquired by performing context-based adaptive binary arithmetic coding based on one context model, and other bits of the prediction mode index information are acquired by performing bypass binary arithmetic coding.

As an example, if the conventional intra prediction block is enabled for the current block, a flag bit is further required to indicate whether the target prediction mode of the conventional prediction enabled for the current block is from the MPM list. If it is determined that the target prediction mode is from the MPM list, the index information of the target prediction mode in the MPM list is determined. If the target prediction mode does not derive from the MPM list, there is no need to determine the index information of the target prediction mode in the MPM list.

Figure 32:
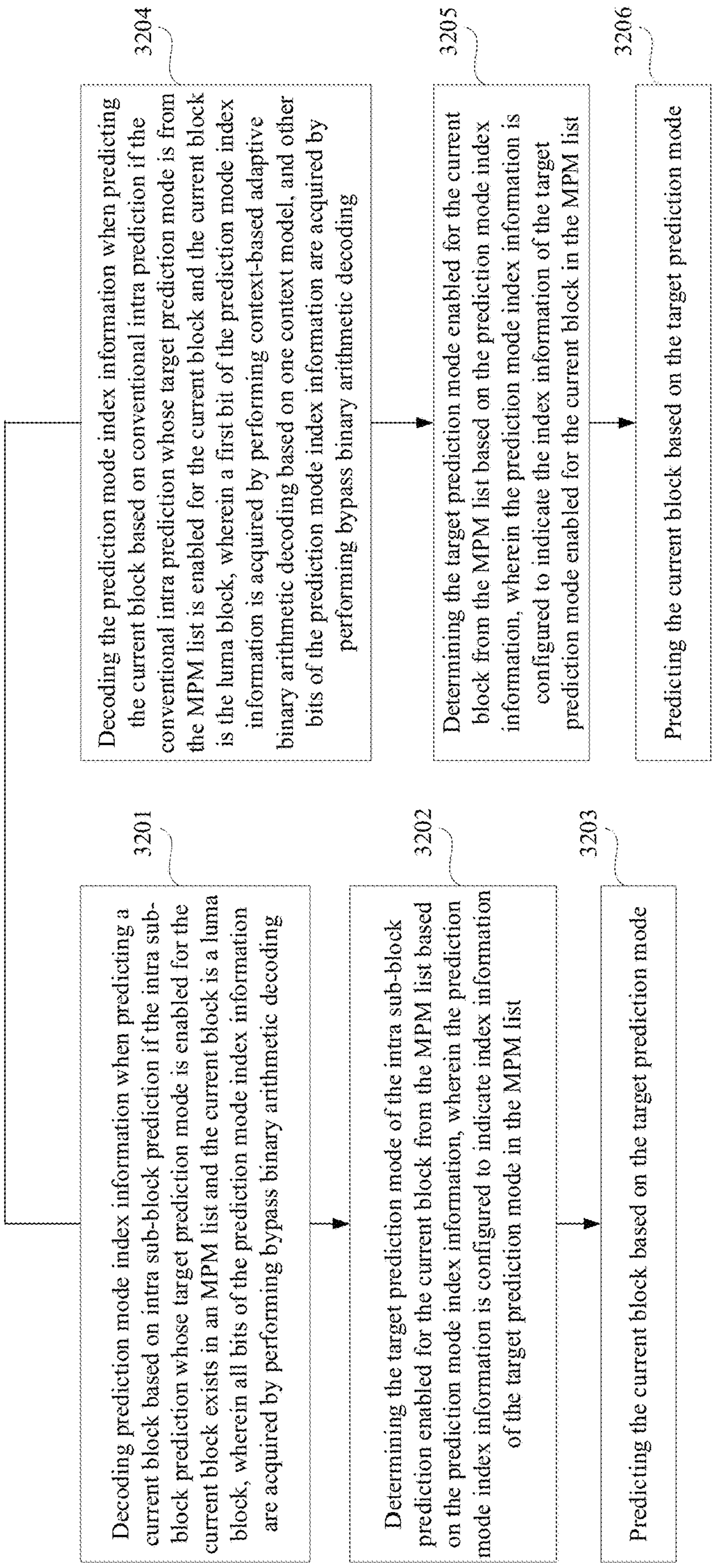
FIG. 32 is a flowchart of a decoding method according to an embodiment of the present disclosure.

FIG. 32 is a flowchart of a decoding method according to an embodiment of the present disclosure. The method is applicable to a decoding terminal and is a decoding method corresponding to the coding method shown in FIG. 31. As shown in FIG. 32, the method includes the following steps.

In 3201, prediction mode index information is decoded when predicting a current block based on intra sub-block prediction if intra sub-block prediction whose target prediction mode exists in an MPM list is enabled for the current block and the current block is a luma block, wherein all bits of the prediction mode index information are acquired by performing bypass binary arithmetic decoding.

In 3202, the target prediction mode of the intra sub-block prediction enabled for the current block is determined from the MPM list based on the prediction mode index information, wherein the prediction mode index information is configured to indicate index information of the target prediction mode in the MPM list.

In 3203, the current block is predicated based on the target prediction mode.

In 3204, the prediction mode index information is decoded when predicting the current block based on conventional intra prediction if the conventional intra prediction whose target prediction mode is from the MPM list is enabled for the current block and the current block is the luma block, wherein a first bit of the prediction mode index information is acquired by performing context-based adaptive binary arithmetic decoding based on one context model, and other bits of the prediction mode index information are acquired by performing bypass binary arithmetic decoding.

In 3205, the target prediction mode enabled for the current block is determined from the MPM list based on the prediction mode index information, wherein the prediction mode index information is configured to indicate the index information of the target prediction mode enabled for the current block in the MPM list.

In 3206, the current block is predicated based on the target prediction mode.

In the embodiment of the present disclosure, if the reference line of the target prediction mode of the current block is the adjacent line of the current block, that is, when intra_luma_ref_idx is equal to 0, when coding or decoding the prediction mode index information, if the intra sub-block prediction mode is enabled for the current block, the bypass binary arithmetic coding or decoding is performed on the first bit of the prediction mode index information. If the intra sub-block prediction mode is not enabled for the current block, the context-based adaptive binary arithmetic coding or decoding is performed on the first bit of the prediction mode index information based on one context model. Thus, only one context model is required for the coding/decoding of the prediction mode index information, such that the number of the required context models is reduced to 1, thereby reducing the complexity of coding/decoding and the memory overheads.

As an example, the context model used by the prediction mode index information is shown in Table 27 below.

As shown in Table 26, the planar indication information intra_luma_not_planar_flag is coded by using context-based adaptive binary arithmetic coding. The selection of the context depends on whether the intra sub-block prediction mode is enabled for the current block. That is, the coding/decoding of the planar indication information requires 2 different context models.

Figure 33:
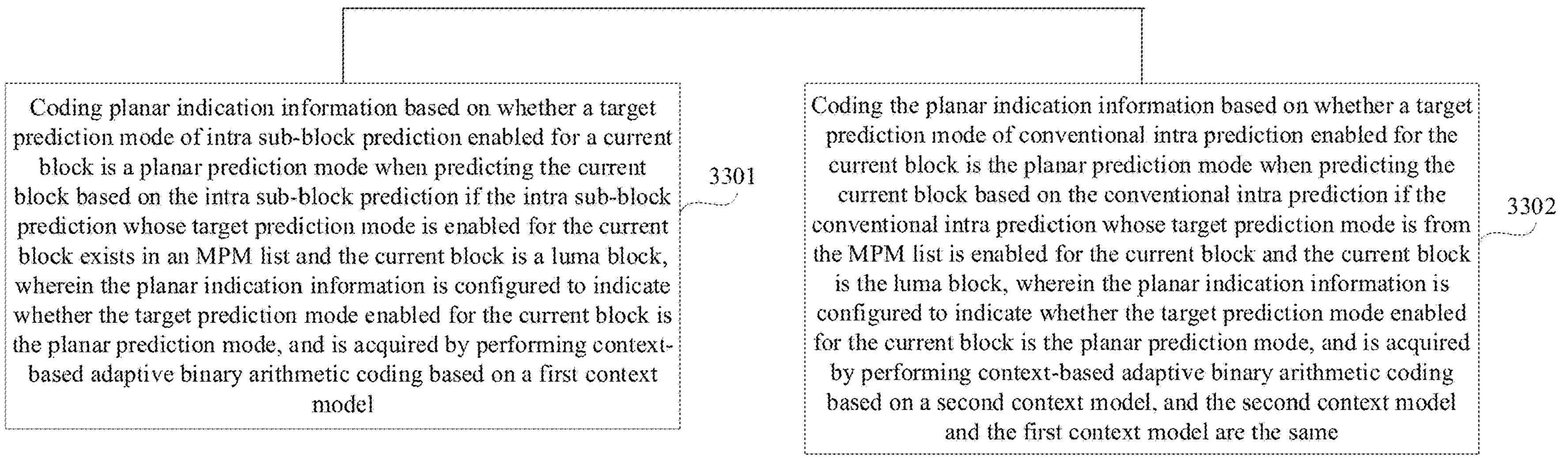
FIG. 33 is a flowchart of a coding method according to an embodiment of the present disclosure.

FIG. 33 is a flowchart of a coding method according to an embodiment of the present disclosure. The method is applicable to a coding terminal. As shown in FIG. 33, the method includes the following steps.

In 3301, planar indication information is coded based on whether a target prediction mode of intra sub-block prediction enabled for a current block is a planar prediction mode when predicting the current block based on the intra sub-block prediction if the intra sub-block prediction whose target prediction mode is enabled for the current block exists in an MPM list and the current block is a luma block, wherein the planar indication information is configured to indicate whether the target prediction mode enabled for the current block is the planar prediction mode, and is acquired by performing context-based adaptive binary arithmetic coding based on a first context model.

In 3302, the planar indication information is coded based on whether a target prediction mode of conventional intra prediction enabled for the current block is the planar prediction mode when predicting the current block based on the conventional intra prediction if the conventional intra prediction whose target prediction mode is from the MPM list is enabled for the current block and the current block is the luma block, wherein the planar indication information is configured to indicate whether the target prediction mode enabled for the current block is the planar prediction mode, and is acquired by performing context-based adaptive binary arithmetic coding based on a second context model, and the second context model and the first context model are the same.

TABLE 27

| Syntax element | Bin Idx 0 | 1 | 2 | 3 | 4 | 5 |
|---|---|---|---|---|---|---|
| intra_luma_mpm_idx[ ][ ] | intra_luma_ref_idx! = 0 ? na: (intra_subpartitions_mode_flag? Bypass: 0) | Bypass | Bypass | Bypass | Bypass | na |

That is, when the intra_luma_ref_idx is equal to 0, and the ISP mode is enabled for the current block, the first bit of the intra_luma_mpm_idx is coded/decoded by using one context model. When the ISP mode is enabled for the current block, the first bit of the intra_luma_ref_idx is coded/decoded by using Bypass.

The Fifth Implementation of the Luma MPM

Syntax elements transmitted between the coding terminal and the decoding terminal may also include planar indication information. The planar indication information is configured to indicate whether the target prediction mode of the current block is the planar prediction mode, and the planar indication information occupies one bit. In an exemplary embodiment, the planar indication information is intra_luma_not_planar_flag.

In the related art, the coding/decoding fashions of the planar indication information is shown in Table 28 below.

TABLE 28

| | | | | | | |
|---|---|---|---|---|---|---|
| intra_luma_not_planar_flag[ ][ ] | intra_subpartitions_mode_flag | na | na | na | na | na |
| intra_luma_mpm_idx[ ][ ] | Bypass | Bypass | Bypass | Bypass | na | na |

Figure 34:
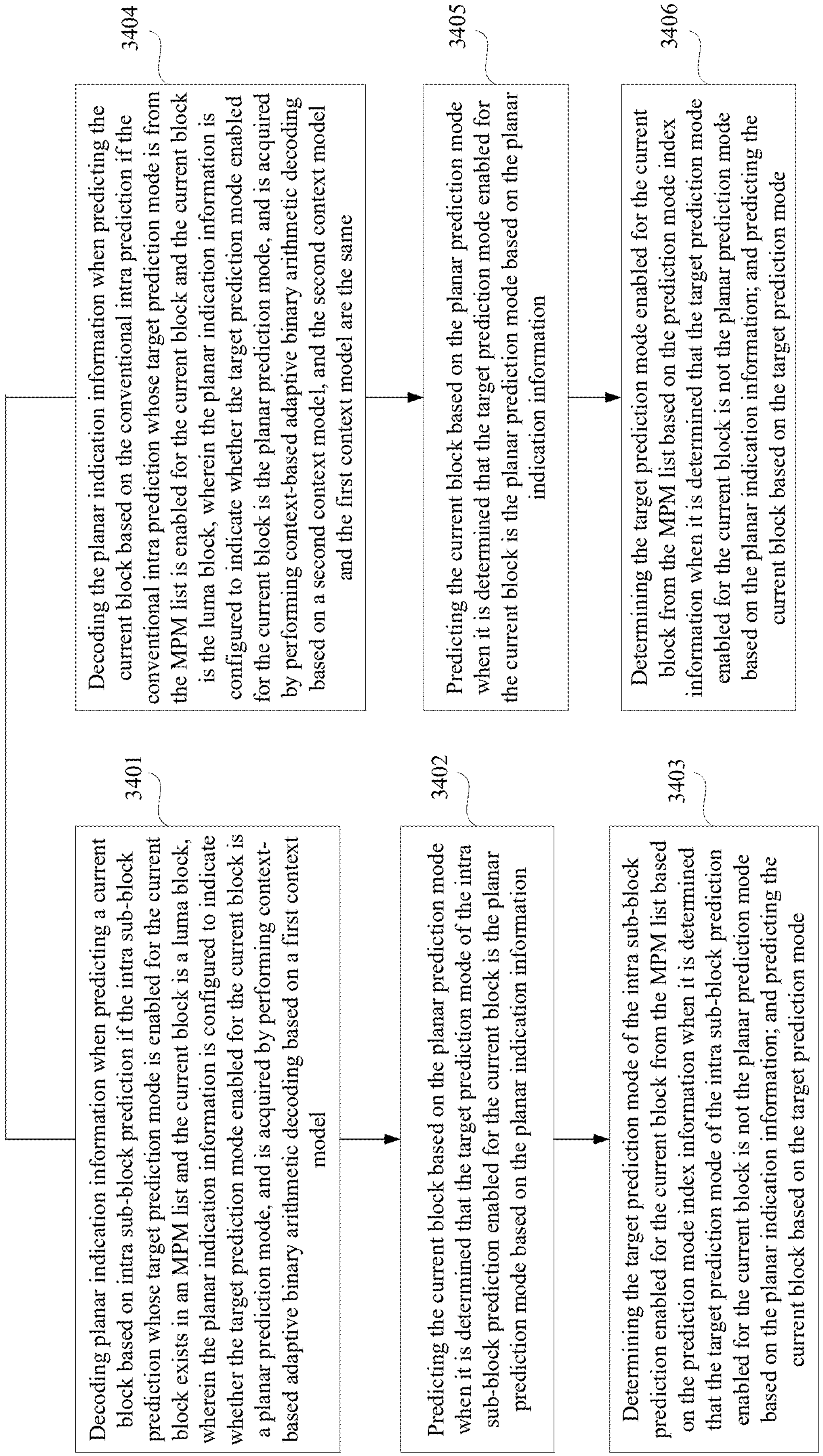
FIG. 34 is a flowchart of a decoding method according to an embodiment of the present disclosure.

FIG. 34 is a flowchart of a decoding method according to an embodiment of the present disclosure. The method is applicable to a decoding terminal and is a decoding method corresponding to the coding method shown in FIG. 33. As shown in FIG. 34, the method includes the following steps.

In 3401, planar indication information is decoded when predicting a current block based on intra sub-block prediction if the intra sub-block prediction whose target prediction mode is enabled for the current block exists in an MPM list and the current block is a luma block, wherein the planar indication information is configured to indicate whether the target prediction mode enabled for the current block is a planar prediction mode, and is acquired by performing context-based adaptive binary arithmetic decoding based on a first context model.

In 3402, the current block is predicted based on the planar prediction mode when it is determined that the target prediction mode of the intra sub-block prediction enabled for the current block is the planar prediction mode based on the planar indication information.

In 3403, the target prediction mode of the intra sub-block prediction enabled for the current block is determined from the MPM list based on the prediction mode index information when it is determined that the target prediction mode of the intra sub-block prediction enabled for the current block is not the planar prediction mode based on the planar indication information; and the current block is predicted based on the target prediction mode.

In 3404, the planar indication information is decoded when predicting the current block based on the conventional intra prediction if the conventional intra prediction whose target prediction mode is from the MPM list is enabled for the current block and the current block is the luma block, wherein the planar indication information is configured to indicate whether the target prediction mode enabled for the current block is the planar prediction mode, and is acquired by performing context-based adaptive binary arithmetic decoding based on a second context model, and the second context model and the first context model are the same.

In 3405, the current block is predicted based on the planar prediction mode when it is determined that the target prediction mode enabled for the current block is the planar prediction mode based on the planar indication information.

In 3406, the target prediction mode enabled for the current block is determined from the MPM list based on the prediction mode index information when it is determined that the target prediction mode enabled for the current block is not the planar prediction mode based on the planar indication information, and the current block is predicted based on the target prediction mode.

In the embodiment of the present disclosure, regardless of whether the intra sub-block prediction mode is enabled for the current block or not, when coding/decoding the planar indication information, context-based adaptive binary arithmetic coding or decoding is performed on the planar indication information based on the same context model in both conditions that the intra sub-block prediction mode is enabled for the current block and the conventional intra predication is enabled for the current block. Thus, the number of the context models required for the planar indication information is reduced to 1, thereby reducing the complexity of coding/decoding and the memory overheads.

As an example, the coding/decoding fashions of the planar indication information is shown in Table 29 below.

TABLE 29

| | | | | | | |
|---|---|---|---|---|---|---|
| intra_luma_not_planar_flag[ ][ ] | 0 | na | na | na | na | na |
| intra_luma_mpm_idx[ ][ ] | Bypass | Bypass | Bypass | Bypass | na | na |

As shown in Table 29, the planar indication information intra_luma_not_planar_flag is coded still by using context-based adaptive binary arithmetic coding/decoding. The selection of the context does not depend on whether the intra sub-block prediction mode is enabled for the current block; and one fixed context model is used for coding/decoding in both conditions that the intra sub-block prediction mode is enabled for the current block and the conventional intra predication is enabled for the current block.

The Sixth Implementation of the Luma MPM

Figure 35:
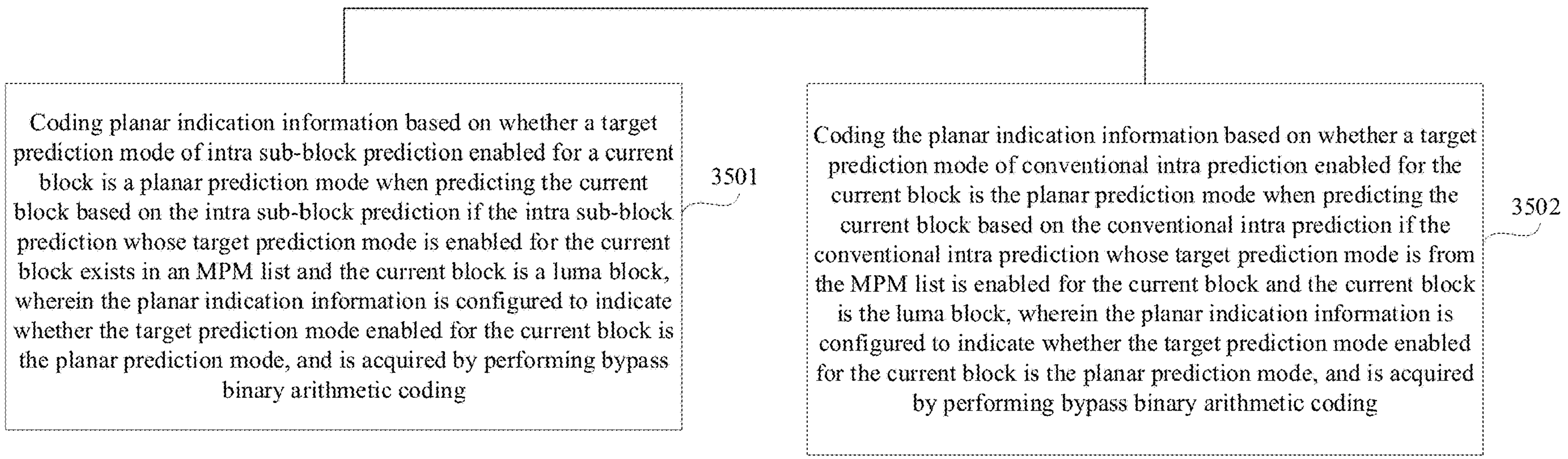
FIG. 35 is a flowchart of a coding method according to an embodiment of the present disclosure.

FIG. 35 is a flowchart of a coding method according to an embodiment of the present disclosure. The method is applicable to a coding terminal. As shown in FIG. 35, the method includes the following steps.

In 3501, planar indication information is coded based on whether a target prediction mode of intra sub-block prediction enabled for a current block is a planar prediction mode when predicting the current block based on the intra sub-block prediction if the intra sub-block prediction whose target prediction mode is enabled for the current block exists in an MPM list and the current block is a luma block, wherein the planar indication information is configured to indicate whether the target prediction mode enabled for the current block is the planar prediction mode, and is acquired by performing bypass binary arithmetic coding.

In 3502, the planar indication information is coded based on whether a target prediction mode of conventional intra prediction enabled for the current block is the planar prediction mode when predicting the current block based on the conventional intra prediction if the conventional intra prediction whose target prediction mode is from the MPM list is enabled for the current block and the current block is the luma block, wherein the planar indication information is configured to indicate whether the target prediction mode enabled for the current block is the planar prediction mode, and is acquired by performing bypass binary arithmetic coding.

Figure 36:
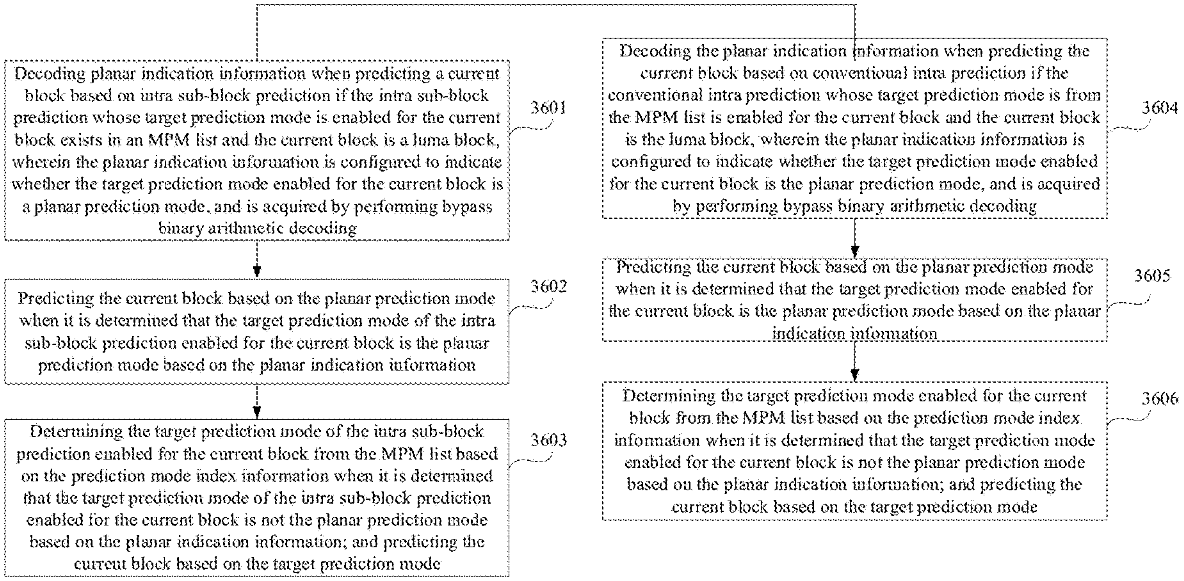
FIG. 36 is a flowchart of a decoding method according to an embodiment of the present disclosure.

FIG. 36 is a flowchart of a decoding method according to an embodiment of the present disclosure. The method is applicable to a decoding terminal and is a decoding method corresponding to the coding method shown in FIG. 35. As shown in FIG. 36, the method includes the following steps.

In 3601, planar indication information is decoded when predicting a current block based on intra sub-block prediction if the intra sub-block prediction whose target prediction mode is enabled for the current block exists in an MPM list and the current block is a luma block, wherein the planar indication information is configured to indicate whether the target prediction mode enabled for the current block is a planar prediction mode, and is acquired by performing bypass binary arithmetic decoding.

In 3602, the current block is predicted based on the planar prediction mode when it is determined that the target prediction mode of the intra sub-block prediction enabled for the current block is the planar prediction mode based on the planar indication information.

In 3603, the target prediction mode of the intra sub-block prediction enabled for the current block is determined from the MPM list based on the prediction mode index information when it is determined that the target prediction mode of the intra sub-block prediction enabled for the current block is not the planar prediction mode based on the planar indication information; and the current block is predicted based on the target prediction mode.

In 3604, the planar indication information is decoded when predicting the current block based on conventional intra prediction if the conventional intra prediction whose target prediction mode is from the MPM list is enabled for the current block and the current block is the luma block, wherein the planar indication information is configured to indicate whether the target prediction mode enabled for the current block is the planar prediction mode, and is acquired by performing bypass binary arithmetic decoding.

In 3605, the current block is predicted based on the planar prediction mode when it is determined that the target prediction mode enabled for the current block is the planar prediction mode based on the planar indication information.

In 3606, the target prediction mode enabled for the current block is determined from the MPM list based on the prediction mode index information when it is determined that the target prediction mode enabled for the current block is not the planar prediction mode based on the planar indication information, and the current block is predicted based on the target prediction mode.

In the embodiment of the present disclosure, regardless of whether the intra sub-block prediction mode is enabled for the current block or not, when coding/decoding the planar indication information, bypass binary arithmetic coding or decoding is performed on the planar indication information in both conditions that the intra sub-block prediction and the conventional intra predication are enabled for the current block. Thus, the number of the context models required for the planar indication information is reduced to 0, thereby reducing the complexity of coding/decoding and the memory overheads.

As an example, the coding/decoding fashions of the planar indication information is shown in Table 30 below.

TABLE 30

| | | | | | | |
|---|---|---|---|---|---|---|
| intra_luma_not_planar_flag[ ][ ] | intra_subpartitions_mode_flag | na | na | na | na | na |
| intra_luma_mpm_idx[ ][ ] | Bypass | Bypass | Bypass | Bypass | na | na |

As shown in Table 30, the planar indication information intra_luma_not_planar_flag adopts the bypass binary arithmetic coding or decoding in both conditions that the intra sub-block prediction mode is enabled for the current block and the conventional intra predication is enabled for the current block, instead of using the context-based adaptive binary arithmetic coding/decoding.

It should be noted that the above method can also be applied to a scene where only the conventional intra prediction is considered.

Embodiment 1

In another embodiment, a coding method is also provided. The coding method is applicable to a coding terminal, and includes the following steps.

In step 1, index information of a target prediction mode enabled for a current block in an MPM list is determined if the target prediction mode enabled for the current block is from the MPM list when predicting the current block according to conventional intra prediction if the conventional intra prediction whose target prediction mode is from the MPM list is enabled for the current block and the current block is the luma block.

In step 2, the prediction mode index information is coded based on the index information of the target prediction mode enabled for the current block in the MPM list, wherein a first bit of the prediction mode index information is acquired by performing context-based adaptive binary arithmetic coding based on one context model, and other bits of the prediction mode index information are acquired by performing bypass binary arithmetic coding.

As an example, if the conventional intra prediction block is enabled for the current block, a flag bit is further required to indicate whether the target prediction mode of the conventional prediction enabled for the current block is from the MPM list. If it is determined that the target prediction mode is from the MPM list, the index information of the target prediction mode in the MPM list is determined. If the target prediction mode does not derive from the MPM list, there is no need to determine the index information of the target prediction mode in the MPM list.

In another embodiment, a decoding method is also provided. The decoding method is applicable to a decoding terminal and is a decoding method corresponding to the above coding method, and includes the following steps.

In step 1, the prediction mode index information is decoded when predicting the current block based on the conventional intra prediction if the conventional intra prediction whose target prediction mode is from the MPM list is enabled for the current block and the current block is the luma block, wherein the first bit of the prediction mode index information is acquired by performing context-based adaptive binary arithmetic decoding based on second context model, the other bits of the prediction mode index information are acquired by performing bypass binary arithmetic decoding, and the second context model and the first context model are the same.

In step 2, the target prediction mode enabled for the current block is determined from the MPM list based on the prediction mode index information, wherein the prediction mode index information is configured to indicate the index information of the target prediction mode in the MPM list.

In step 3, the current block is predicated based on the target prediction mode.

Embodiment 2

In another embodiment, a coding method is also provided. The coding method is applicable to a coding terminal, and includes the following steps.

In step 1, index information of the target prediction mode enabled for the current block in the MPM list is determined if the target prediction mode enabled for the current block exists in the MPM list when predicting the current block according to conventional intra prediction when the conventional intra prediction whose target prediction mode is from the MPM list is enabled for the current block and the current block is the luma block.

In step 2, the prediction mode index information is coded based on the index information of the target prediction mode enabled for the current block in the MPM list, wherein the all bits of the prediction mode index information are acquired by performing bypass binary arithmetic coding.

As an example, if the conventional intra prediction block is enabled for the current block, a flag bit is further required to indicate whether the target prediction mode of the conventional prediction enabled for the current block is from the MPM list. If it is determined that the target prediction mode is from the MPM list, the index information of the target prediction mode in the MPM list is determined. If the target prediction mode does not derive from the MPM list, there is no need to determine the index information of the target prediction mode in the MPM list.

In another embodiment, a decoding method is also provided. The decoding method is applicable to a decoding terminal and is a decoding method corresponding to the above coding method, and includes the following steps.

In step 1, the prediction mode index information is decoded when predicting the current block based on conventional intra prediction if the conventional intra prediction whose target prediction mode is from the MPM list is enabled for the current block and the current block is the luma block, wherein the all bits of the prediction mode index information are acquired by performing bypass binary arithmetic coding.

In step 2, the target prediction mode enabled for the current block is determined from the MPM list based on the prediction mode index information, wherein the prediction mode index information is configured to indicate the index information of the target prediction mode enabled for the current block in the MPM list.

In step 3, the current block is predicated based on the target prediction mode.

Embodiment 3

In another embodiment, a coding method is also provided. The coding method is applicable to a coding terminal, and includes the following steps.

In step 1, the planar indication information is coded based on whether a target prediction mode of conventional intra prediction enabled for the current block is the planar prediction mode when predicting the current block based on the conventional intra prediction if the conventional intra prediction whose target prediction mode is from the MPM list is enabled for the current block and the current block is the luma block, wherein the planar indication information is configured to indicate whether the target prediction mode enabled for the current block is the planar prediction mode, and is acquired by performing context-based adaptive binary arithmetic coding based on one context model.

In another embodiment, a decoding method is also provided. The decoding method is applicable to a decoding terminal and is a decoding method corresponding to the above coding method, and includes the following steps.

In step 1, the planar indication information is decoded when predicting the current block based on conventional intra prediction if the conventional intra prediction whose target prediction mode is from the MPM list is enabled for the current block and the current block is the luma block, wherein the planar indication information is configured to indicate whether the target prediction mode enabled for the current block is the planar prediction mode, and is acquired by performing context-based adaptive binary arithmetic decoding based on one context model.

In step 2, the current block is predicted based on the planar prediction mode when it is determined that the target prediction mode enabled for the current block is the planar prediction mode based on the planar indication information.

In step 3, the target prediction mode enabled for the current block is determined from the MPM list based on the prediction mode index information when it is determined that the target prediction mode enabled for the current block is not the planar prediction mode based on the planar indication information, and the current block is predicted based on the target prediction mode.

Embodiment 4

In another embodiment, a coding method is also provided. The coding method is applicable to a coding terminal, and includes the following steps.

In step 1, the planar indication information is coded based on whether the target prediction mode of conventional intra prediction enabled for the current block is the planar prediction mode when predicting the current block based on the conventional intra prediction if the conventional intra prediction whose target prediction mode is from the MPM list is enabled for the current block and the current block is the luma block, wherein the planar indication information is configured to indicate whether the target prediction mode enabled for the current block is the planar prediction mode, and is acquired by performing bypass binary arithmetic coding.

In another embodiment, a decoding method is also provided. The decoding method is applicable to a decoding terminal and is a decoding method corresponding to the above coding method, and includes the following steps.

In step 1, the planar indication information is decoded when predicting the current block based on conventional intra prediction if the conventional intra prediction whose target prediction mode is from the MPM list is enabled for the current block and the current block is the luma block, wherein the planar indication information is configured to indicate whether the target prediction mode enabled for the current block is the planar prediction mode, and is acquired by performing bypass binary arithmetic decoding.

In step 2, the current block is predicted based on the planar prediction mode when it is determined that the target prediction mode enabled for the current block is the planar prediction mode based on the planar indication information.

In step 3, the target prediction mode enabled for the current block is determined from the MPM list based on the prediction mode index information when it is determined that the target prediction mode enabled for the current block is not the planar prediction mode based on the planar indication information, and the current block is predicted based on the target prediction mode.

Chroma MPM

Syntax elements transmitted between the coding terminal and the decoding terminal also includes chroma prediction mode index information which is configured to indicate index information of a target prediction mode of a current block in a corresponding candidate prediction mode list.

In the related art, the chroma prediction mode index information and its corresponding prediction mode are shown in Table 31 below.

TABLE 31

| Value of intra_chroma_pred_mode | Bin string |
|---|---|
| 7 (the same as the luma prediction mode) | 0 |
| 4 (the first cross-component prediction mode) | 10 |
| 5 (the second cross-component prediction mode) | 1110 |
| 6 (the third cross-component prediction mode) | 1111 |
| 0 (planar prediction mode) | 11000 |
| 1 (vertical prediction mode) | 11001 |
| 2 (horizontal prediction mode) | 11010 |
| 3 (DC prediction mode) | 11011 |

It can be seen from Table 31 that if the current block supports the cross-component prediction mode which is enabled for the current block, the chroma prediction mode index information occupies at most 4 bits. If the current block supports the cross-component prediction mode but the cross-component prediction mode is not enabled for the current block, the index information of the chroma prediction mode occupies at most 5 bits.

In the related art, if the current block supports the cross-component prediction mode which is enabled for the current block, the coding/decoding fashions of the chroma prediction mode index information are shown in Table 32 below.

TABLE 32

| | The first bin | The second bin | The third bin | The fourth bin |
|---|---|---|---|---|
| 4 (the first cross-component prediction mode) | 1 (the first context model) | 0 (the second context model) | / | / |
| 5 (the second cross-component prediction mode) | 1 (the first context model) | 1 (the second context model) | 1 (the third context model) | 0 (the third context model) |
| 6 (the third cross-component prediction mode) | 1 (the first context model) | 1 (the second context model) | 1 (the third context model) | 1 (the third context model) |

It can be seen from Table 32 that when the current block supports the cross-component prediction mode which is enabled for the current block, the first bit of the chroma prediction mode index information is acquired by performing context-based adaptive binary arithmetic decoding based on the first context model, the second bit of the chroma prediction mode index information is acquired by performing context-based adaptive binary arithmetic decoding based on the second context model, and the third and fourth bits of the chroma prediction mode index information are acquired by performing context-based adaptive binary arithmetic decoding based on the third context model, and the three context models are all different. That is, the chroma prediction mode index information needs to use three context models, resulting in high memory overheads.

The First Implementation of the Chroma MPM

Figure 37:
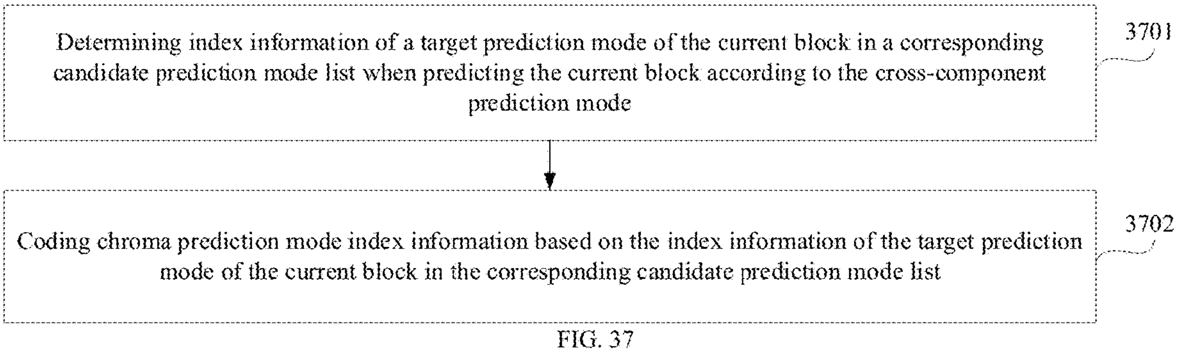
FIG. 37 is a flowchart of a coding method according to an embodiment of the present disclosure.

FIG. 37 is a flowchart of a coding method according to an embodiment of the present disclosure. The method is applicable to a coding terminal. As shown in FIG. 37, when a current block supports the cross-component prediction mode which is enabled for the current block, and the current block is a chroma block, the method includes the following steps.

In 3701, index information of a target prediction mode of the current block in a corresponding candidate prediction mode list is determined when predicting the current block according to the cross-component prediction mode.

The coding terminal may decide the final target prediction mode through rate distortion cost, and informs the decoding terminal which prediction mode is selected through the coding index information.

In 3702, chroma prediction mode index information is coded based on the index information of the target prediction mode of the current block in the corresponding candidate prediction mode list.

The chroma prediction mode index information is configured to indicate the index information of the target prediction mode of the current block in the corresponding candidate prediction mode list. The first bit of the chroma prediction mode index information is acquired by performing context-based adaptive binary arithmetic coding based on the first context model, and the second bit of the chroma prediction mode index information is acquired by performing context-based adaptive binary arithmetic coding based on the second context model. In addition, the first context model is different from the second context model. The third bit and the fourth bit of the chroma prediction mode index information are acquired by performing bypass binary arithmetic coding.

As an example, the coding terminal stores a chroma prediction mode candidate list. The coding terminal may decide a finally used target prediction mode through the RDO, and informs the decoding terminal which prediction mode is selected through the coding index information, namely, coding the chroma prediction mode index information.

As an example, the chroma prediction mode includes the prediction mode the same as the luma prediction mode, and the cross-component prediction mode. The cross-component prediction mode includes a mode in which linear model coefficients are deduced from templates on both sides, a mode in which the linear model coefficients are deduced from an upper template, and a mode in which the linear model coefficients are deduced from a left template, as well as the planar prediction mode, the DC Prediction mode, the vertical prediction mode and the horizontal prediction mode.

Figure 38:
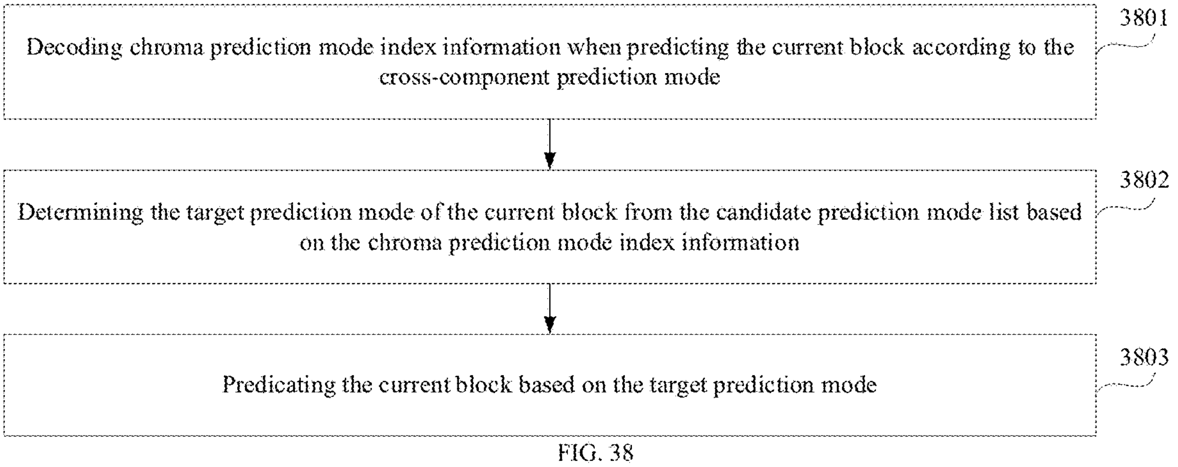
FIG. 38 is a flowchart of a decoding method according to an embodiment of the present disclosure.

FIG. 38 is a flowchart of a decoding method according to an embodiment of the present disclosure. The method is applicable to a decoding terminal, and is a decoding method corresponding to the coding method shown in FIG. 37. As shown in FIG. 38, when a current block supports the cross-component prediction mode which is enabled for the current block, and the current block is a chroma block, the method includes the following steps.

In 3801, chroma prediction mode index information is decoded when predicting the current block according to the cross-component prediction mode.

The first bit of the chroma prediction mode index information is acquired by performing context-based adaptive binary arithmetic decoding based on the first context model, and the second bit of the chroma prediction mode index information is acquired by performing context-based adaptive binary arithmetic decoding based on the second context model. The first context model is different from the second context model. The third bit and the fourth bit of the chroma prediction mode index information are acquired by performing bypass binary arithmetic decoding.

In 3802, the target prediction mode of the current block is determined from the candidate prediction mode list based on the chroma prediction mode index information.

In 3803, the current block is predicated based on the target prediction mode.

As an example, the decoding terminal may receive the coded stream, and analyzes syntax related to the chroma prediction modes from the coded stream. The coding bit overhead required for each prediction mode is different. The decoding terminal acquires a predicated value of the current block used in the subsequent reconstruction process by uniquely determining the chroma prediction mode of the current block by analyzing the chroma prediction mode index information.

In the embodiment of the present disclosure, when the current block supports the cross-component prediction mode which is enabled for the current block, the third and fourth bits of the chroma prediction mode index information may be acquired by performing bypass binary arithmetic decoding. Thus, the number of the context models required for the chroma prediction mode index information may be reduced to 2, thereby reducing the complexity of coding/decoding and memory overheads.

As an example, if the current block supports the cross-component prediction mode which is enabled for the current block, the coding/decoding fashions of the index information of the chroma prediction mode are shown in Tables 33 and 34 below.

TABLE 33

| | The first bin | The second bin | The third bin | The fourth bin |
|---|---|---|---|---|
| 4 (the first cross-component prediction mode) | 1 (the first context model) | 0 (the second context model) | / | / |
| 5 (the first cross-component prediction mode) | 1 (the first context model) | 1 (the second context model) | 1 (Bypass) | 0 (Bypass) |
| 6 (the first cross-component prediction mode) | 1 (the first context model) | 1 (the second context model) | 1 (Bypass) | 1 (Bypass) |

TABLE 34

| Syntax element | Bin Idx 0 | 1 | 2 | 3 | 4 | 5 |
|---|---|---|---|---|---|---|
| intra_chroma_pred_mode[ ][ ] sps_cclm_enabled_flag = = 1 && bin at binIdx equal to 2 = = 1 | 0 | 1 | bypass | bypass | na | na |

The Second Implementation of the Chroma MPM

Figure 39:
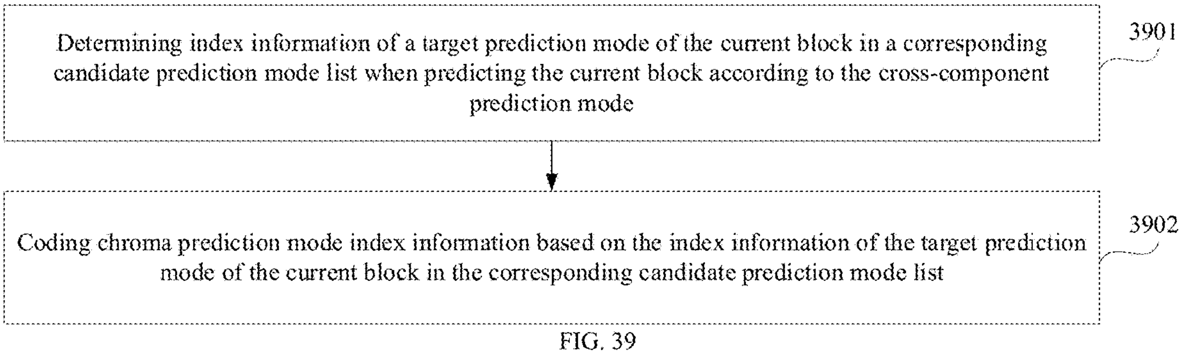
FIG. 39 is a flowchart of a coding method according to an embodiment of the present disclosure.

FIG. 39 is a flowchart of a coding method according to an embodiment of the present disclosure. The method is applicable to a coding terminal. As shown in FIG. 39, when a current block supports the cross-component prediction mode which is enabled for the current block, and the current block is a chroma block, the method includes the following steps.

In 3901, index information of a target prediction mode of the current block in a corresponding candidate prediction mode list is determined when predicting the current block according to the cross-component prediction mode.

The coding terminal may decide the final target prediction mode through rate distortion cost, and informs the decoding terminal which prediction mode is selected through the coding index information.

In 3902, chroma prediction mode index information is coded based on the index information of the target prediction mode of the current block in the corresponding candidate prediction mode list.

The chroma prediction mode index information is configured to indicate the index information of the target prediction mode of the current block in the corresponding candidate prediction mode list. The first bit of the chroma prediction mode index information is acquired by performing context-based adaptive binary arithmetic coding based on one context model, and the second, third and fourth bits of the chroma prediction mode index information are acquired by performing bypass binary arithmetic coding.

Figure 40:
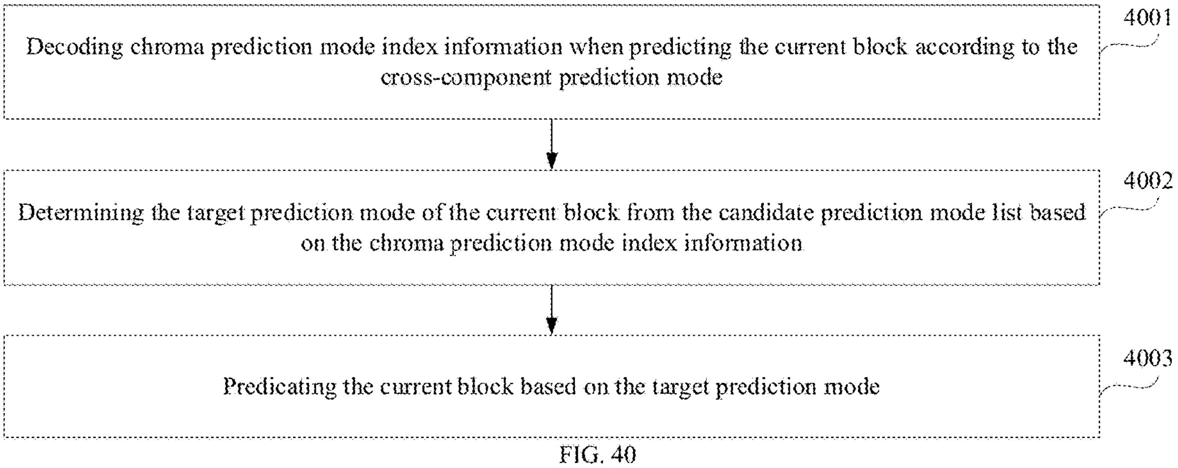
FIG. 40 is a flowchart of a decoding method according to an embodiment of the present disclosure.

FIG. 40 is a flowchart of a decoding method according to an embodiment of the present disclosure. The method is applicable to a decoding terminal, and is a decoding method corresponding to the coding method shown in FIG. 39. As shown in FIG. 40, when a current block supports the cross-component prediction mode which is enabled for the current block, and the current block is a chroma block, the method includes the following steps.

In 4001, chroma prediction mode index information is decoded when predicting the current block according to the cross-component prediction mode.

The first bit of the chroma prediction mode index information is acquired by performing context-based adaptive binary arithmetic decoding based on one context model, and the second, third and fourth bits of the chroma prediction mode index information are acquired by performing bypass binary arithmetic decoding.

In 4002, the target prediction mode of the current block is determined from the candidate prediction mode list based on the chroma prediction mode index information.

In 4003, the current block is predicated based on the target prediction mode.

In the embodiment of the present disclosure, when the current block supports the cross-component prediction mode which is enabled for the current block, the first bit of the chroma prediction mode index information uses one context model, and the second, third and fourth bits of the chroma prediction mode index information uses the bypass binary arithmetic coding/decoding fashion. Thus, the number of the context models required for the chroma prediction mode index information may be reduced to 1, thereby reducing the complexity of coding/decoding and memory overheads.

As an example, if the current block supports the cross-component prediction mode which is enabled for the current block, the coding/decoding fashions of the index information of the chroma prediction mode are shown in Tables 35 and 36 below.

TABLE 35

| | The first bin | The second bin | The third bin | The fourth bin |
|---|---|---|---|---|
| 4 (the first cross-component prediction mode) | 1 (the first context model) | 0 (Bypass) | / | / |
| 5 (the first cross-component prediction mode) | 1 (the first context model) | 1 (Bypass) | 1 (Bypass) | 0 (Bypass) |
| 6 (the first cross-component prediction mode) | 1 (the first context model) | 1 (Bypass) | 1 (Bypass) | 1 (Bypass) |

TABLE 36

| Syntax element | Bin Idx 0 | 1 | 2 | 3 | 4 | 5 |
|---|---|---|---|---|---|---|
| intra_chroma_pred_mode[ ][ ] sps_cclm_enabled_flag = = 1 && bin at binIdx equal to 2 = = 1 | 0 | bypass | bypass | bypass | na | na |

The Third Implementation of the Chroma MPM

Figure 41:
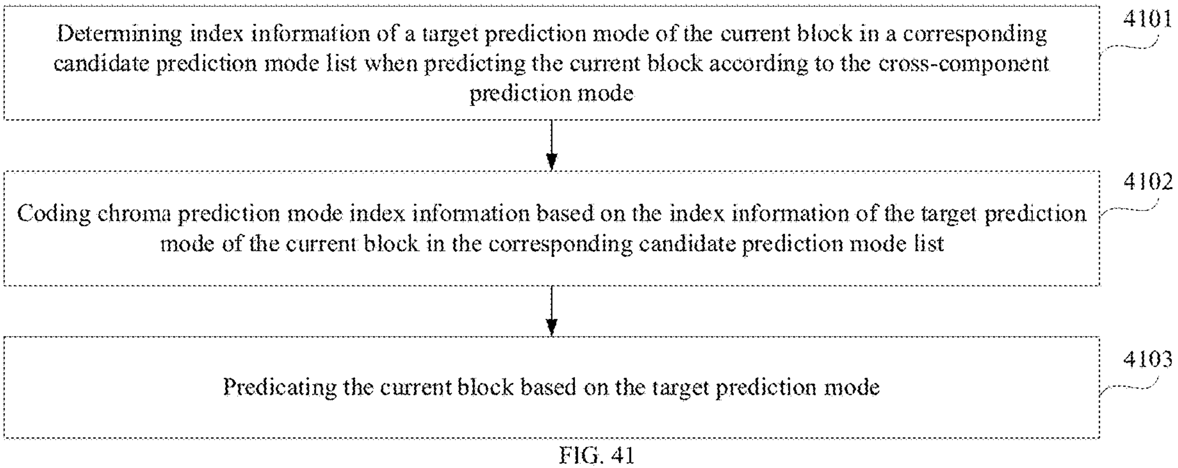
FIG. 41 is a flowchart of a coding method according to an embodiment of the present disclosure.

FIG. 41 is a flowchart of a coding method according to an embodiment of the present disclosure. The method is applicable to a coding terminal. As shown in FIG. 41, when a current block supports the cross-component prediction mode and is a chroma block, the method includes the following steps.

In 4101, index information of a target prediction mode of the current block in a corresponding candidate prediction mode list is determined when predicting the current block according to the cross-component prediction mode.

The coding terminal may decide the final target prediction mode through rate distortion cost, and informs the decoding terminal which prediction mode is selected through the coding index information.

In 4102, chroma prediction mode index information is coded based on the index information of the target prediction mode of the current block in the corresponding candidate prediction mode list.

The chroma prediction mode index information is configured to indicate the index information of the target prediction mode of the current block in the corresponding candidate prediction mode list.

As an example, if the chroma prediction mode index information is 10, the target prediction mode is the first cross-component prediction mode;

if the chroma prediction mode index information is 110, the target prediction mode is the second cross-component prediction mode;

if the chroma prediction mode index information is 111, the target prediction mode is the second cross-component prediction mode;

if the chroma prediction mode index information is 11110, the target prediction mode is the planar prediction mode;

if the chroma prediction mode index information is 111110, the target prediction mode is the vertical prediction mode;

if the chroma prediction mode index information is 1111110, the target prediction mode is the horizontal prediction mode; and if the chroma prediction mode index information is 1111111, the target prediction mode is the DC prediction mode.

In the related art, the chroma prediction mode index information and its corresponding prediction mode are shown in Table 37 below.

TABLE 37

| Value of intra_chroma_pred_mode | Bin string |
|---|---|
| 7 (the same as the luma prediction mode) | 0 |
| 4 (the first cross-component prediction mode) | 10 |
| 5 (the second cross-component prediction mode) | 110 |
| 6 (the third cross-component prediction mode) | 111 |
| 0 (planar prediction mode) | 111100 |
| 1 (vertical prediction mode) | 111101 |
| 2 (horizontal prediction mode) | 111110 |
| 3 (DC prediction mode) | 111111 |

It can be seen from Table 37 that when the current block supports the cross-component prediction mode which is enabled for the current block, the chroma prediction mode index information indicates the cross-component prediction mode. In this case, the chroma prediction mode index information at most occupies 3 bits, such that the bit overhead is reduced, thereby reducing the memory overheads. In addition, when the current block supports the cross-component prediction mode but the cross-component prediction mode is not enabled for the current block, the chroma prediction mode index information indicates conventional intra prediction. In this case, the chroma prediction mode index information occupies at most 6 bits.

As another example, if the chroma prediction mode index information is 10, the target prediction mode is the first cross-component prediction mode;

if the chroma prediction mode index information is 110, the target prediction mode is the second cross-component prediction mode;

if the chroma prediction mode index information is 111, the target prediction mode is the second cross-component prediction mode;

if the chroma prediction mode index information is 11110, the target prediction mode is the planar prediction mode;

if the chroma prediction mode index information is 111110, the target prediction mode is the vertical prediction mode;

if the chroma prediction mode index information is 1111110, the target prediction mode is the horizontal prediction mode; and if the chroma prediction mode index information is 1111111, the target prediction mode is the DC prediction mode.

In 4103, the current block is predicated based on the target prediction mode.

In the related art, the chroma prediction mode index information and its corresponding prediction mode are shown in Table 38 below.

TABLE 38

| Value of intra_chroma_pred_mode | Bin string |
|---|---|
| 7 (the same as the luma prediction mode) | 0 |
| 4 (the first cross-component prediction mode) | 10 |
| 5 (the second cross-component prediction mode) | 110 |
| 6 (the third cross-component prediction mode) | 111 |
| 0 (planar prediction mode) | 11110 |
| 1 (vertical prediction mode) | 111110 |
| 2 (horizontal prediction mode) | 1111110 |
| 3 (DC prediction mode) | 1111111 |

It can be seen from Table 38 that when the current block supports the cross-component prediction mode which is enabled for the current block, the chroma prediction mode index information indicates the cross-component prediction mode. In this case, the chroma prediction mode index information at most occupies 3 bits, such that the bit overhead is reduced, thereby reducing the memory overheads. In addition, when the current block supports the cross-component prediction mode but the cross-component prediction mode is not enabled for the current block, the chroma prediction mode index information indicates conventional intra prediction. In this case, the chroma prediction mode index information occupies at most 7 bits.

Figure 42:
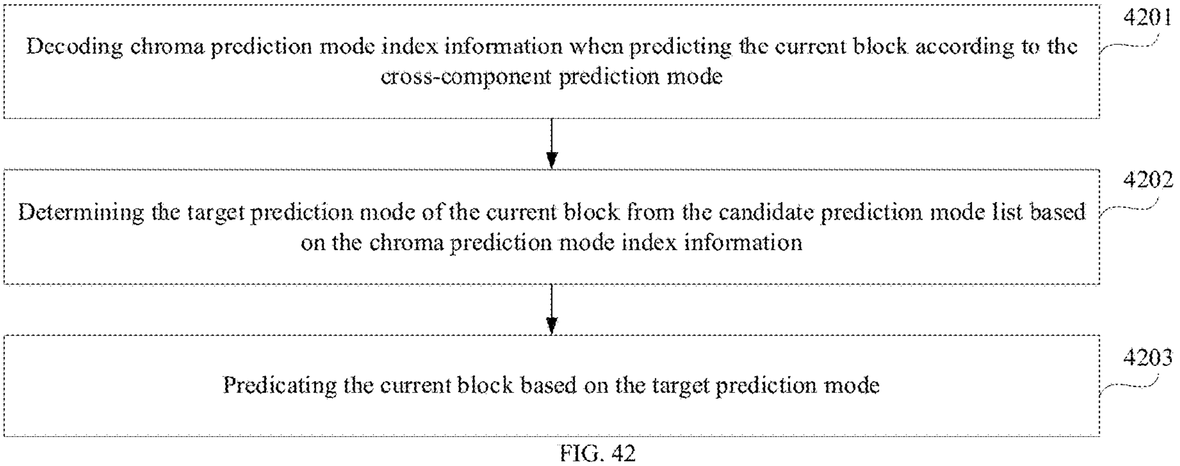
FIG. 42 is a flowchart of a decoding method according to an embodiment of the present disclosure.

FIG. 42 is a flowchart of a decoding method according to an embodiment of the present disclosure. The method is applicable to a decoding terminal, and is a decoding method corresponding to the coding method shown in FIG. 41. As shown in FIG. 42, when a current block supports the cross-component prediction mode and is a chroma block, the method includes the following steps.

In 4201, chroma prediction mode index information is decoded when predicting the current block according to the cross-component prediction mode.

In 4202, the target prediction mode of the current block is determined from the candidate prediction mode list based on the chroma prediction mode index information.

As an example, if the chroma prediction mode index information is 10, the target prediction mode is the first cross-component prediction mode,

- if the chroma prediction mode index information is 110, the target prediction mode is the second cross-component prediction mode;
- if the chroma prediction mode index information is 111, the target prediction mode is the second cross-component prediction mode;
- if the chroma prediction mode index information is 11110, the target prediction mode is the planar prediction mode;
- if the chroma prediction mode index information is 111110, the target prediction mode is the vertical prediction mode;
- if the chroma prediction mode index information is 1111110, the target prediction mode is the horizontal prediction mode; and
- if the chroma prediction mode index information is 1111111, the target prediction mode is the DC prediction mode.

As another example, if the chroma prediction mode index information is 10, the target prediction mode is the first cross-component prediction mode;

- if the chroma prediction mode index information is 110, the target prediction mode is the second cross-component prediction mode;
- if the chroma prediction mode index information is 111, the target prediction mode is the second cross-component prediction mode;
- if the chroma prediction mode index information is 11110, the target prediction mode is the planar prediction mode;
- if the chroma prediction mode index information is 111110, the target prediction mode is the vertical prediction mode;
- if the chroma prediction mode index information is 1111110, the target prediction mode is the horizontal prediction mode; and
- if the chroma prediction mode index information is 1111111, the target prediction mode is the DC prediction mode.

The current block is predicted based on the target prediction mode.

In 4203, the current block is predicated based on the target prediction mode.

In the embodiment of the present disclosure, when the current block supports the cross-component prediction mode which is enabled for the current block, the bit overhead of the chroma prediction mode index information can be reduced, thereby reducing the memory overhead.

CCLM Mode

Figure 43:
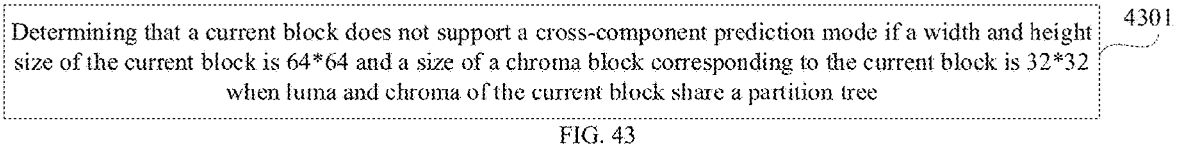
FIG. 43 is a flowchart of a coding/decoding method according to an embodiment of the present disclosure.

FIG. 43 is a flowchart of a coding/decoding method according to an embodiment of the present disclosure. The method is applicable to a coding terminal or a decoding terminal. As shown in FIG. 43, the method includes the following steps.

In 4301, it is determined that a current block does not support a cross-component prediction mode if a width and height size of the current block is 64*64 and a size of a chroma block corresponding to the current block is 32*32 when luma and chroma of the current block share a partition tree.

In the embodiment of the present disclosure, the dependence of the luma on the chroma in the CCLM mode is reduced, such that the chroma block does not need to wait for a reconstruction value of a 64*64 chroma block.

ALF Mode

The syntax elements transmitted between the coding terminal and the decoding terminal further include ALF indication information which is configured to indicate whether the ALF is enabled for the current block. In an exemplary embodiment, the ALF indication information is alf_ctb_flag.

In the related art, the coding/decoding fashions of the ALF indication information is shown in Table 39 below.

TABLE 39

| Syntax element | condL | condA | ctxSetIdx |
|---|---|---|---|
| alf_ctb_flag[x0][y0][cIdx] | alf_ctb_flag[xNbL][yNbL][cIdx] | alf_ctb_flag[xNbA][yNbA][cIdx] | cIdx |

A calculation formula for the selection of the context model is:

$$ctxInc=(condL \;\&\&\; availableL)+(condA \;\&\&\; availableA)+ctxSetIdx*3.$$

It can be seen from Table 39 and the above formula that the selection of the context model for the coding/decoding of the ALF indication information depends on three factors: whether the ALF is enabled for an upper block of the current block, whether a left block of the current block uses the ALF, and index of a current component. It is required to use 9 context models in total.

Specifically, if the current block supports the ALF and the current block is a luma block, context-based adaptive binary arithmetic coding or decoding is performed on the ALF indication information based on a target context model. The target context model is a context model selected from three different context models included in a first context model set based on whether the ALF is enabled for the upper block of the current block and whether the ALF is enabled for the left block of the current block.

If the current block supports the ALF and the current block is a CB chroma block, context-based adaptive binary arithmetic coding or decoding is performed on the ALF indication information based on a target context model. The target context model is a context model selected from three different context models included in a second context model set based on whether the ALF is enabled for the upper block of the current block and whether the ALF is enabled for the left block of the current block.

If the current block supports the ALF and the current block is a CR chroma block, context-based adaptive binary arithmetic coding or decoding is performed on the ALF indication information based on a target context model. The target context model is a context model selected from three different context models included in a third context model set based on whether the ALF is enabled for the upper block of the current block and whether the ALF is enabled for the left block of the current block. The above 9 context models are all different.

The First Implementation of the ALF Mode

Figure 44:
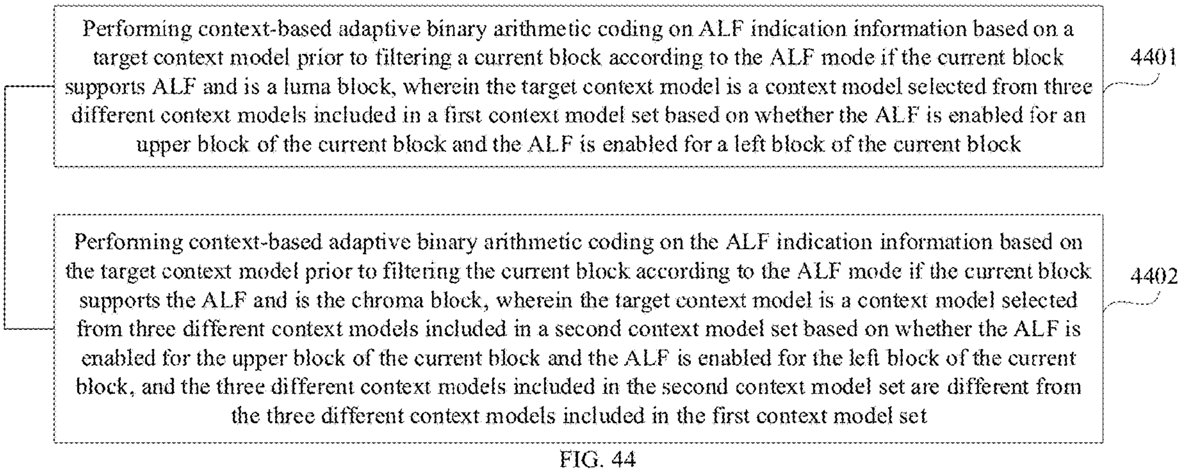
FIG. 44 is a flowchart of a coding method according to an embodiment of the present disclosure.

FIG. 44 is a flowchart of a coding method according to an embodiment of the present disclosure. The method is applicable to a coding terminal. As shown in FIG. 44, the method includes the following steps.

In 4401, context-based adaptive binary arithmetic coding is performed on ALF indication information based on a target context model prior to filtering a current block according to the ALF mode if the current block supports ALF and is a luma block, wherein the target context model is a context model selected from three different context models included in a first context model set based on whether the ALF is enabled for an upper block of the current block and the ALF is enabled for a left block of the current block.

As an example, the first context model set includes a first context model, a second context model, and a third context model. If the ALF is enabled for both the upper block of the current block and the left block of the current block, the target context model is the first context model. If the ALF is enabled for the upper block of the current block and the ALF is not enabled for the left block of the current block, or if the ALF is not enabled for the upper block of the current block and the ALF is enabled for the left block of the current block, the target context model is the second context model. If neither the upper block of the current block nor the ALF is enabled for the left block of the current block, the target context model is the third context model.

In 4402, context-based adaptive binary arithmetic coding is performed on the ALF indication information based on the target context model prior to filtering the current block according to the ALF mode if the current block supports the ALF and is the chroma block, wherein the target context model is a context model selected from three different context models included in a second context model set based on whether the ALF is enabled for the upper block of the current block and the ALF is enabled for the left block of the current block, and the three different context models included in the second context model set are different from the three different context models included in the first context model set.

The chroma block includes a CB chroma block and a CR chroma block.

As an example, the second context model set includes a fourth context model, a fifth context model, and a sixth context model. If the ALF is enabled for both the upper block of the current block and the left block of the current block, the target context model is the fourth context model. If the ALF is enabled for the upper block of the current block and the ALF is not enabled for the left block of the current block, or if the ALF is not enabled for the upper block of the current block and the ALF is enabled for the left block of the current block, the target context model is the fifth context model. If neither the upper block of the current block nor the ALF is enabled for the left block of the current block, the target context model is the sixth context model.

As an example, the coding terminal may decide whether the ALF is enabled for the current block through the RDO, namely, whether to use the adaptive loop filterer, and may code the ALF indication information in the coded stream to inform the decoding terminal whether to enable the ALF, so as to inform the decoding terminal whether to perform adaptive loop filtering. In addition, if the ALF is enabled, ALF-related syntax elements need to be coded, and the coding terminal also performs filtering.

Figure 45:
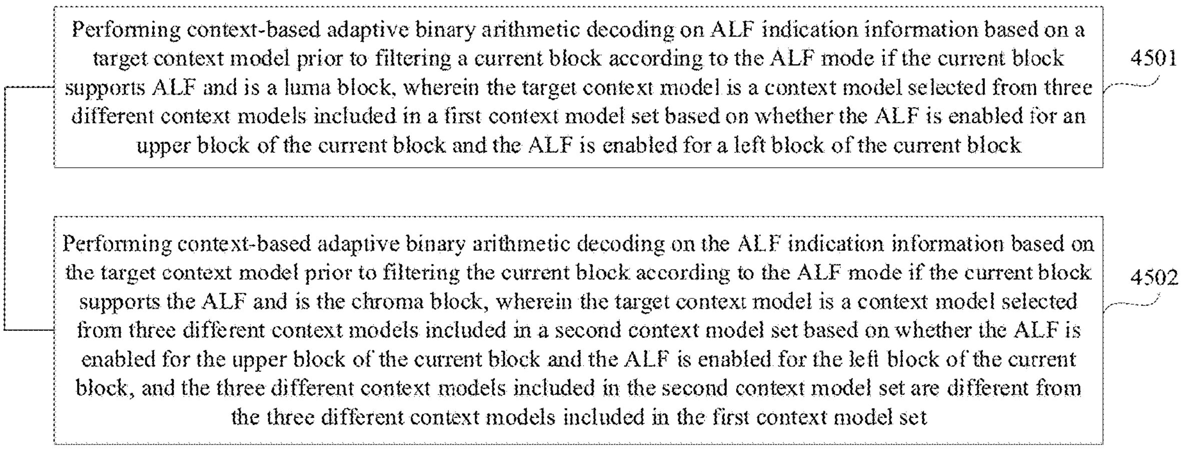
FIG. 45 is a flowchart of a decoding method according to an embodiment of the present disclosure.

FIG. 45 is a flowchart of a decoding method according to an embodiment of the present disclosure. The method is applicable to a decoding terminal and is a decoding method corresponding to the coding method shown in FIG. 44. As shown in FIG. 45, the method includes the following steps.

In 4501, context-based adaptive binary arithmetic decoding is performed on ALF indication information based on a target context model prior to filtering a current block according to the ALF mode if the current block supports ALF and is a luma block, wherein the target context model is a context model selected from three different context models included in a first context model set based on whether the ALF is enabled for an upper block of the current block and the ALF is enabled for a left block of the current block.

In 4502, context-based adaptive binary arithmetic decoding is performed on the ALF indication information based on the target context model prior to filtering the current block according to the ALF mode if the current block supports the ALF and is a chroma block, wherein the target context model is a context model selected from three different context models included in a second context model set based on whether the ALF is enabled for the upper block of the current block and the ALF is enabled for the left block of the current block, and the three different context models included in the second context model set are different from the three different context models included in the first context model set.

The chroma block includes a CB chroma block and a CR chroma block.

After receiving the coded stream, the decoding terminal may analyze whether the adaptive loop filtering is enabled for the current block by decoding the ALF indication information. If the ALF indication information indicates that the ALF is enabled for the current block, the decoding terminal may also continue to decode the ALF-related syntax elements to perform the adaptive loop filtering on the current block, so as to acquire a filtered reconstructed pixel.

As an example, the coding/decoding fashions of the ALF indication information is shown in Table 40 below.

TABLE 40

| Syntax element | condL | condA | ctxSetIdx |
|---|---|---|---|
| alf_ctb_flag[x0][y0][cIdx] | alf_ctb_flag[xNbL][yNbL][cIdx] | alf_ctb_flag[xNbA][yNbA][cIdx] | cIdx == 0 ? 0 : 1 |

A calculation formula for the selection of the context model is:

$$ctxInc=(condL \&\& availableL)+(condA \&\& availableA)+ctxSetIdx*3.$$

In the embodiment of the present disclosure, for the ALF indication information, the CB chroma block and the CR chroma block may share 3 different context models. Thus, the number of the context models used for the ALF indication information may be reduced to 6, thereby reducing the complexity of coding/decoding and the memory overheads.

The Second Implementation of the ALF Mode

Figure 46:
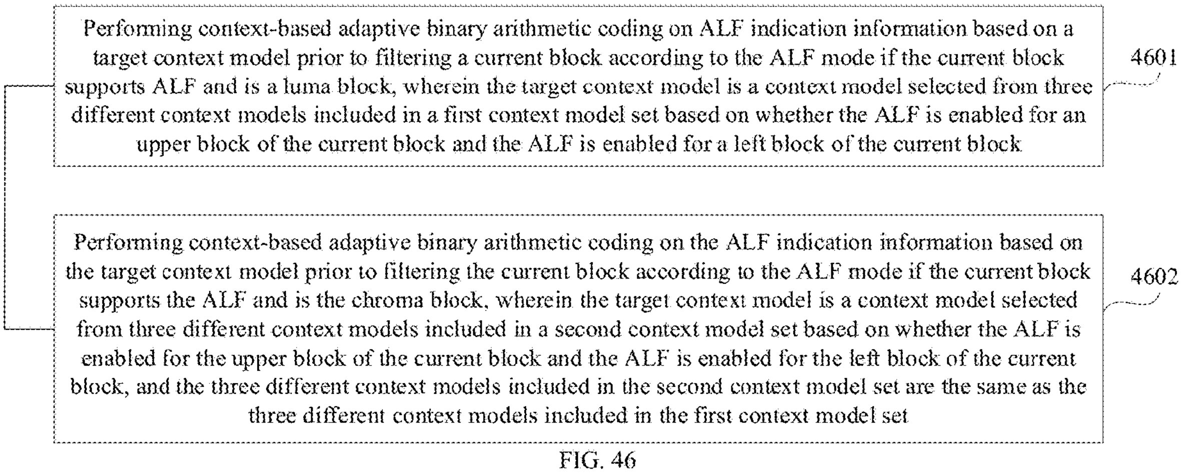
FIG. 46 is a flowchart of a coding method according to an embodiment of the present disclosure.

FIG. 46 is a flowchart of a coding method according to an embodiment of the present disclosure. The method is applicable to a coding terminal. As shown in FIG. 46, the method includes the following steps.

In 4601, context-based adaptive binary arithmetic coding is performed on ALF indication information based on a target context model prior to filtering a current block according to the ALF mode if the current block supports ALF and is a luma block, wherein the target context model is a context model selected from three different context models included in a first context model set based on whether the ALF is enabled for an upper block of the current block and the ALF is enabled for a left block of the current block.

As an example, the first context model set includes a first context model, a second context model, and a third context model. If the ALF is enabled for both the upper block of the current block and the left block of the current block, the target context model is the first context model. If the ALF is enabled for the upper block of the current block and the ALF is not enabled for the left block of the current block, or if the ALF is not enabled for the upper block of the current block and the ALF is enabled for the left block of the current block, the target context model is the second context model. If neither the upper block of the current block nor the ALF is enabled for the left block of the current block, the target context model is the third context model.

In 4602, context-based adaptive binary arithmetic coding is performed on the ALF indication information based on the target context model prior to filtering the current block according to the ALF mode if the current block supports the ALF and is a chroma block, wherein the target context model is a context model selected from three different context models included in a second context model set based on whether the ALF is enabled for the upper block of the current block and the ALF is enabled for the left block of the current block, and the three different context models included in the second context model set are the same as the three different context models included in the first context model set.

The chroma block includes a CB chroma block and a CR chroma block.

As an example, the second context model set includes a fourth context model, a fifth context model, and a sixth context model. If the ALF is enabled for both the upper block of the current block and the left block of the current block, the target context model is the fourth context model. If the ALF is enabled for the upper block of the current block and the ALF is not enabled for the left block of the current block, or if the ALF is not enabled for the upper block of the current block and the ALF is enabled for the left block of the current block, the target context model is the fifth context model. If neither the upper block of the current block nor the ALF is enabled for the left block of the current block, the target context model is the sixth context model.

Figure 47:
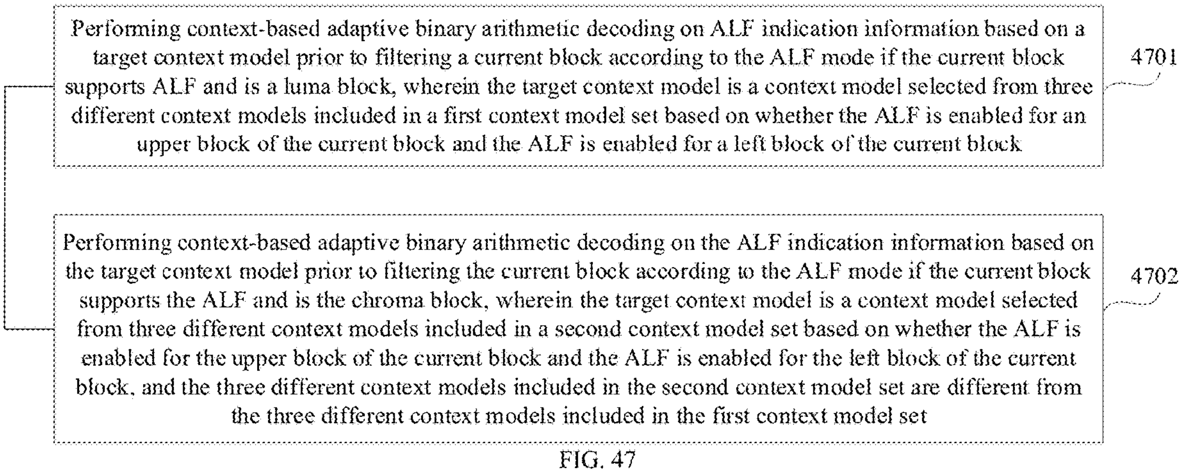
FIG. 47 is a flowchart of a decoding method according to an embodiment of the present disclosure.

FIG. 47 is a flowchart of a decoding method according to an embodiment of the present disclosure. The method is applicable to a decoding terminal and is a decoding method corresponding to the coding method shown in FIG. 46. As shown in FIG. 47, the method includes the following steps.

In 4701, context-based adaptive binary arithmetic decoding is performed on ALF indication information based on a target context model prior to filtering a current block according to the ALF mode if the current block supports ALF and is a luma block, wherein the target context model is a context model selected from three different context models included in a first context model set based on whether the ALF is enabled for an upper block of the current block and the ALF is enabled for a left block of the current block.

In 4702, context-based adaptive binary arithmetic decoding is performed on the ALF indication information based on the target context model prior to filtering the current block according to the ALF mode if the current block supports the ALF and is a chroma block, wherein the target context model is a context model selected from three different context models included in a second context model set based on whether the ALF is enabled for the upper block of the current block and the ALF is enabled for the left block of the current block, and the three different context models included in the second context model set are different from the three different context models included in the first context model set.

The chroma block includes a CB chroma block and a CR chroma block.

As an example, the coding/decoding fashions of the ALF indication information is shown in Table 41 below.

TABLE 41

| Syntax element | condL | condA | ctxSetIdx |
|---|---|---|---|
| alf_ctb_flag[x0][y0][cIdx] | alf_ctb_flag[xNbL][yNbL][cIdx] | alf_ctb_flag[xNbA][yNbA][cIdx] | 0 |

A calculation formula for the selection of the context model is:

$$ctxInc = (condL \&\& availableL) + (condA \&\& availableA) + ctxSetIdx * 3.$$

In the embodiment of the present disclosure, for the ALF indication information, the luma block, the CB chroma block and the CR chroma block may share 3 different context models. Thus, the number of the context models used for the ALF indication information may be reduced to 3, thereby reducing the complexity of coding/decoding and the memory overheads.

The Third Implementation of the ALF Mode

Figure 48:
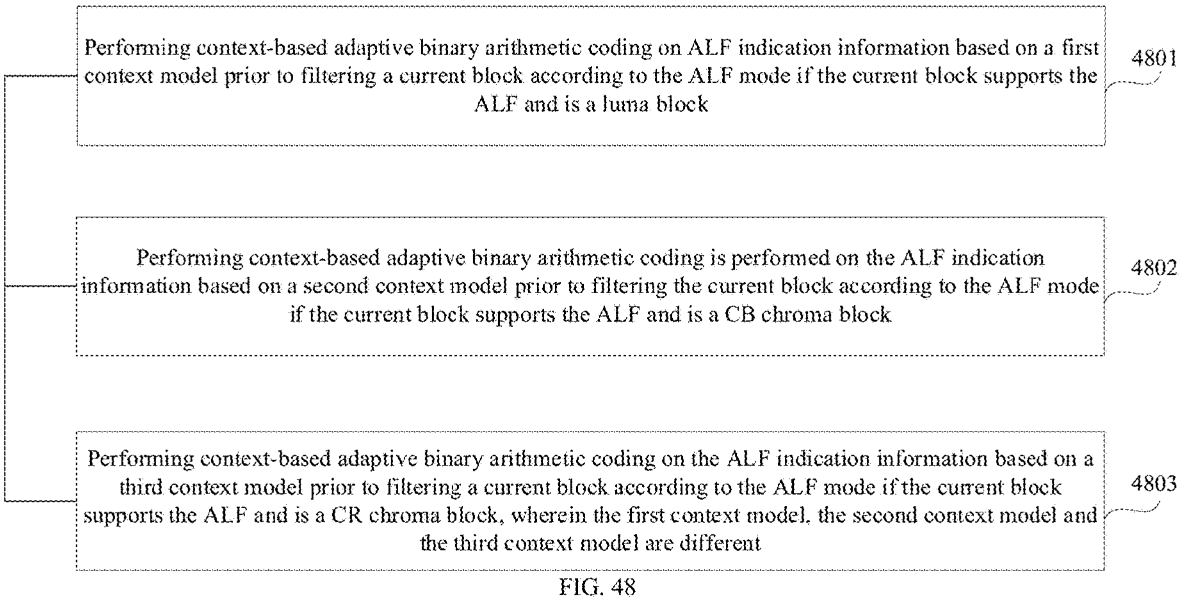
FIG. 48 is a flowchart of a coding method according to an embodiment of the present disclosure.

FIG. 48 is a flowchart of a coding method according to an embodiment of the present disclosure. The method is applicable to a coding terminal. As shown in FIG. 48, the method includes the following steps.

In 4801, context-based adaptive binary arithmetic coding is performed on ALF indication information based on a first context model prior to filtering a current block according to the ALF mode if the current block supports the ALF and is a luma block.

S In 4802, context-based adaptive binary arithmetic coding is performed on the ALF indication information based on a second context model prior to filtering the current block according to the ALF mode if the current block supports the ALF and is a CB chroma block.

In 4803, context-based adaptive binary arithmetic coding is performed on the ALF indication information based on a third context model prior to filtering a current block according to the ALF mode if the current block supports the ALF and is a CR chroma block, wherein the first context model, the second context model and the third context model are different.

Figure 49:
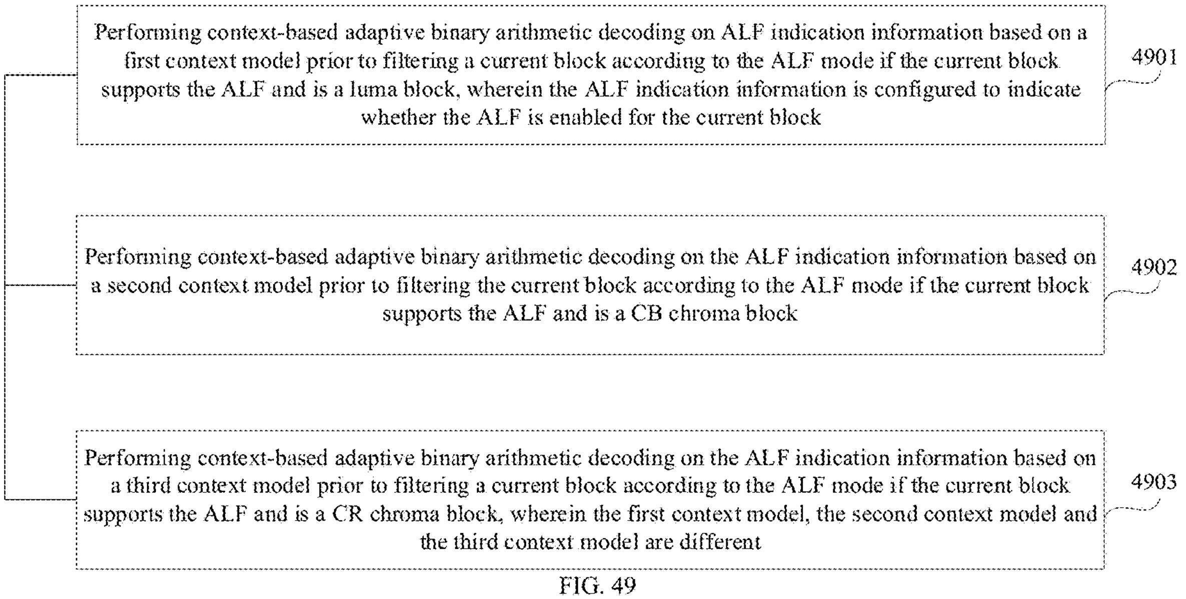
FIG. 49 is a flowchart of a decoding method according to an embodiment of the present disclosure.

FIG. 49 is a flowchart of a decoding method according to an embodiment of the present disclosure. The method is applicable to a decoding terminal and is a decoding method corresponding to the coding method shown in FIG. 48. As shown in FIG. 49, the method includes the following steps.

In 4901, context-based adaptive binary arithmetic decoding is performed on ALF indication information based on a first context model prior to filtering a current block according to the ALF mode if the current block supports the ALF and is a luma block, wherein the ALF indication information is configured to indicate whether the ALF is enabled for the current block.

In 4902, context-based adaptive binary arithmetic decoding is performed on the ALF indication information based on a second context model prior to filtering the current block according to the ALF mode if the current block supports the ALF and is a CB chroma block.

In 4903, context-based adaptive binary arithmetic decoding is performed on the ALF indication information based on a third context model prior to filtering a current block according to the ALF mode if the current block supports the ALF and is a CR chroma block, wherein the first context model, the second context model and the third context model are different.

As an example, the coding/decoding fashions of the ALF indication information is shown in Table 42 below.

TABLE 42

| Syntax element | condL | condA | ctxSetIdx |
|---|---|---|---|
| alf_ctb_flag[x0][y0][cIdx] | 0 | 0 | cIdx |

A calculation formula for the selection of the context model is:

$$ctxInc = (condL \&\& availableL) + (condA \&\& availableA) + ctxSetIdx.$$

In the embodiment of the present disclosure, for the ALF indication information, the luma blocks share one context model, the CB chroma blocks share one context model, and the CR chroma blocks share one context model. Thus, the number of the context models used for the ALF indication information may be reduced to 3, thereby reducing the complexity of coding/decoding and the memory overheads.

The Fourth Implementation of the ALF Mode

Figure 50:
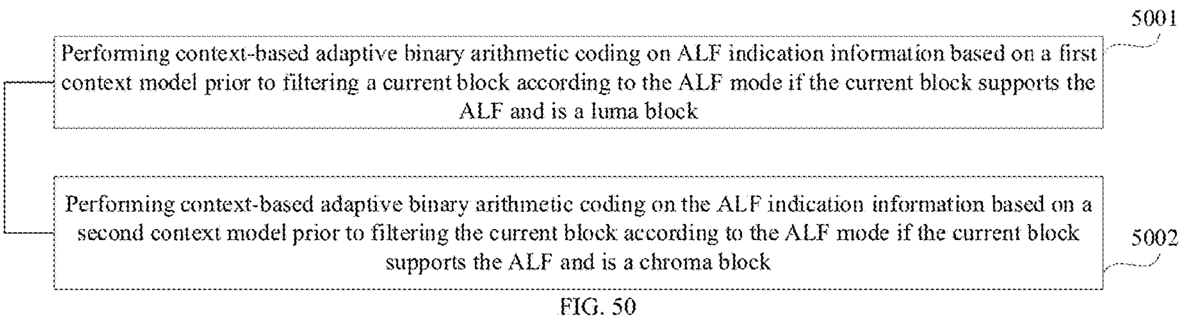
FIG. 50 is a flowchart of a coding method according to an embodiment of the present disclosure.

FIG. 50 is a flowchart of a coding method according to an embodiment of the present disclosure. The method is applicable to a coding terminal. As shown in FIG. 50, the method includes the following steps.

In 5001, context-based adaptive binary arithmetic coding is performed on ALF indication information based on a first context model prior to filtering a current block according to the ALF mode if the current block supports the ALF and is a luma block.

In 5002, context-based adaptive binary arithmetic coding is performed on the ALF indication information based on a second context model prior to filtering the current block according to the ALF mode if the current block supports the ALF and is a chroma block.

The chroma block includes a CB chroma block and a CR chroma block.

Figure 51:
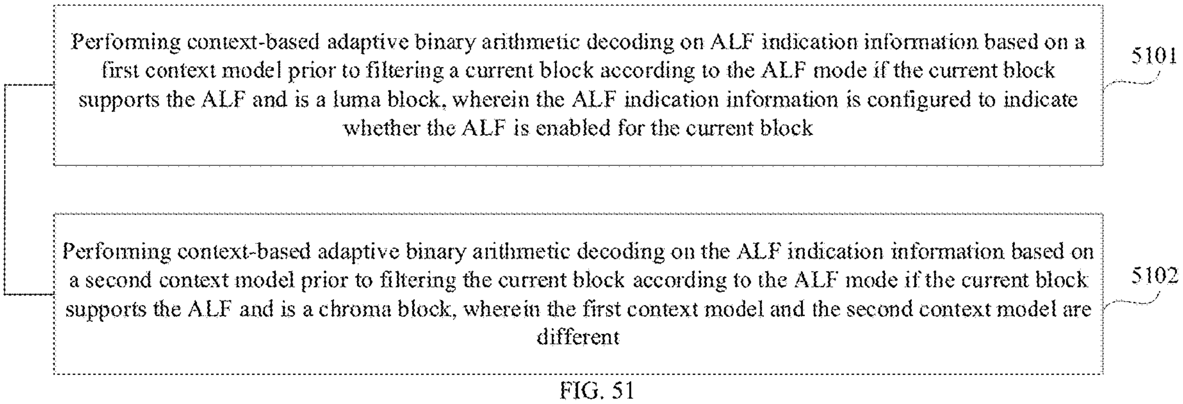
FIG. 51 is a flowchart of a decoding method according to an embodiment of the present disclosure.

FIG. 51 is a flowchart of a decoding method according to an embodiment of the present disclosure. The method is applicable to a decoding terminal and is a decoding method corresponding to the coding method shown in FIG. 50. As shown in FIG. 51, the method includes the following steps.

In 5101, context-based adaptive binary arithmetic decoding is performed on ALF indication information based on a first context model prior to filtering a current block according to the ALF mode if the current block supports the ALF and is a luma block, wherein the ALF indication information is configured to indicate whether the ALF is enabled for the current block.

In 5102, context-based adaptive binary arithmetic decoding is performed on the ALF indication information based on a second context model prior to filtering the current block according to the ALF mode if the current block supports the ALF and is a chroma block, wherein the first context model and the second context model are different.

As an example, the coding/decoding fashions of the ALF indication information is shown in Table 43 below.

TABLE 43

| Syntax element | condL | condA | ctxSetIdx |
|---|---|---|---|
| alf_ctb_flag[x0][y0][cIdx] | 0 | 0 | cIdx == 0 ? 0 : 1 |

A calculation formula for the selection of the context model is:

$$ctxInc = (condL \&\& availableL) + (condA \&\& availableA) + ctxSetIdx.$$

In the embodiment of the present disclosure, for the ALF indication information, the luma blocks share one context model, and the CB chroma block and the CR chroma block share one context model. Thus, the number of the context models used for the ALF indication information may be reduced to 2, thereby reducing the complexity of coding/decoding and the memory overheads.

The Fifth Implementation of the ALF Mode

Figure 52:
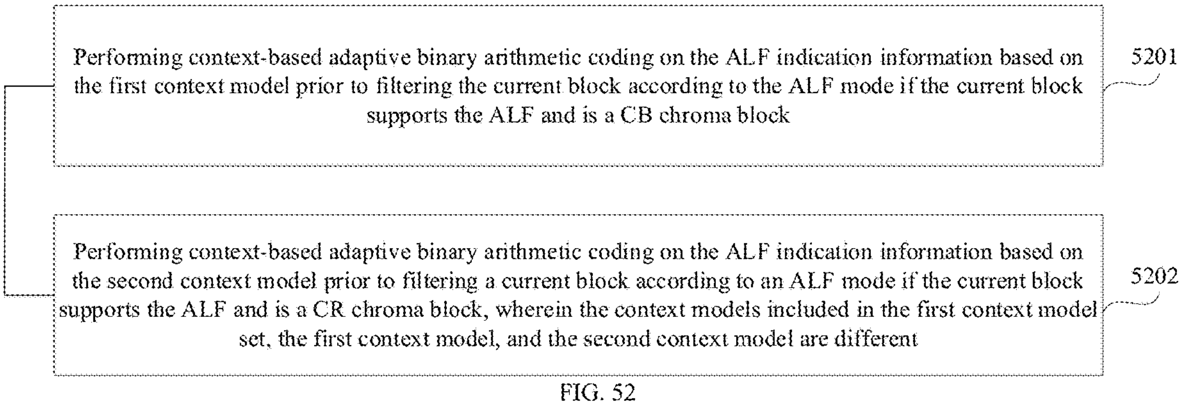
FIG. 52 is a flowchart of a coding method according to an embodiment of the present disclosure.

FIG. 52 is a flowchart of a coding method according to an embodiment of the present disclosure. The method is applicable to a coding terminal. As shown in FIG. 52, the method includes the following steps.

In 5201, context-based adaptive binary arithmetic coding is performed on ALF indication information based on a target context model prior to filtering a current block according to the ALF mode if the current block supports ALF and is a luma block, wherein the target context model is a context model selected from three different context models included in a first context model set based on whether the ALF is enabled for an upper block of the current block and the ALF is enabled for a left block of the current block.

As an example, the first context model set includes a first context model, a second context model, and a third context model. If the ALF is enabled for both the upper block of the current block and the left block of the current block, the target context model is the first context model. If the ALF is enabled for the upper block of the current block and the ALF is not enabled for the left block of the current block, or if the ALF is not enabled for the upper block of the current block and the ALF is enabled for the left block of the current block, the target context model is the second context model. If neither the upper block of the current block nor the ALF is enabled for the left block of the current block, the target context model is the third context model.

In 5202, context-based adaptive binary arithmetic coding is performed on the ALF indication information based on the first context model prior to filtering the current block according to the ALF mode if the current block supports the ALF and is a CB chroma block.

In 5203, context-based adaptive binary arithmetic coding is performed on the ALF indication information based on the second context model prior to filtering a current block according to an ALF mode if the current block supports the ALF and is a CR chroma block, wherein the context models included in the first context model set, the first context model, and the second context model are different.

Figure 53:
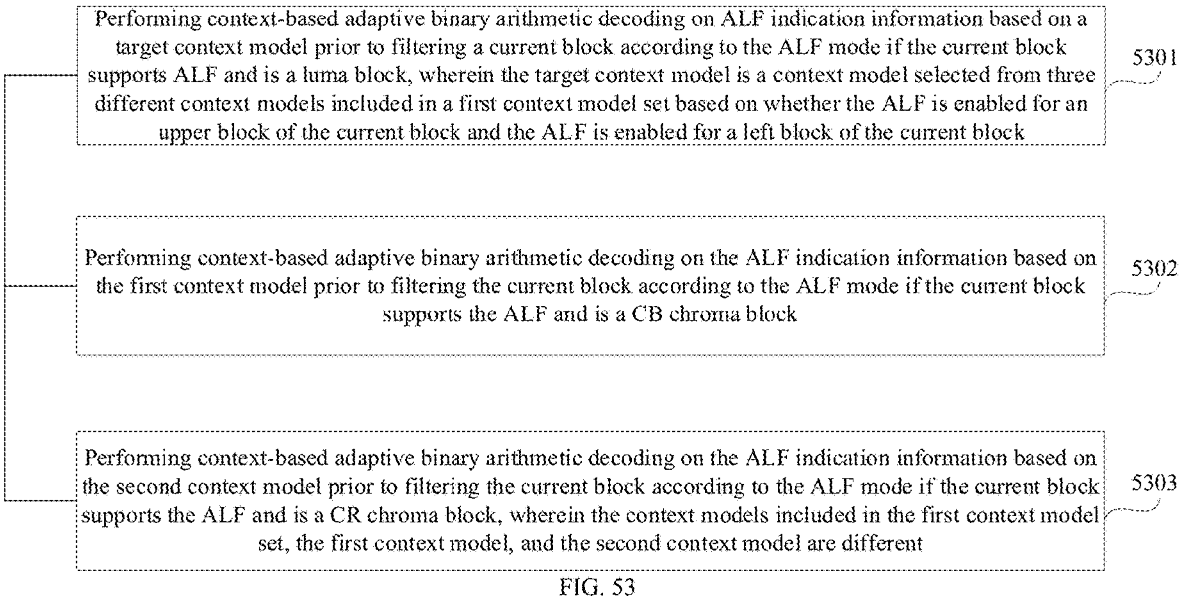
FIG. 53 is a flowchart of a decoding method according to an embodiment of the present disclosure.

FIG. 53 is a flowchart of a decoding method according to an embodiment of the present disclosure. The method is applicable to a decoding terminal and is a decoding method corresponding to the coding method shown in FIG. 52. As shown in FIG. 53, the method includes the following steps.

In 5301, context-based adaptive binary arithmetic decoding is performed on ALF indication information based on a target context model prior to filtering a current block according to the ALF mode if the current block supports ALF and is a luma block, wherein the target context model is a context model selected from three different context models included in a first context model set based on whether the ALF is enabled for an upper block of the current block and the ALF is enabled for a left block of the current block.

As an example, the first context model set includes a first context model, a second context model, and a third context model. If the ALF is enabled for both the upper block of the current block and the left block of the current block, the target context model is the first context model. If the ALF is enabled for the upper block of the current block and the ALF is not enabled for the left block of the current block, or if the ALF is not enabled for the upper block of the current block and the ALF is enabled for the left block of the current block, the target context model is the second context model. If neither the upper block of the current block nor the ALF is enabled for the left block of the current block, the target context model is the third context model.

In 5302, context-based adaptive binary arithmetic decoding is performed on the ALF indication information based on the first context model prior to filtering the current block according to the ALF mode if the current block supports the ALF and is a CB chroma block.

In 5303, context-based adaptive binary arithmetic decoding is performed on the ALF indication information based on the second context model prior to filtering the current block according to the ALF mode if the current block supports the ALF and is a CR chroma block, wherein the context models included in the first context model set, the first context model, and the second context model are different.

As an example, for the luma block, the coding/decoding fashions of the ALF indication information is shown in Table 44 below.

TABLE 44

| Syntax element | condL | condA | ctxSetIdx |
|---|---|---|---|
| alf_ctb_flag[x0] [y0][cIdx] | alf_ctb_flag[xNbL] [yNbL][cIdx] | alf_ctb_flag[xNbA] [yNbA][cIdx] | 0 |

A calculation formula for the selection of the context model is:

$$ctxInc = (condL \;\&\&\; availableL) + (condA \;\&\&\; availableA) + ctxSetIdx * 3.$$

As an example, for the chroma block, the coding/decoding fashions of the ALF indication information is shown in Table 45 below.

TABLE 45

| Syntax element | condL | condA | ctxSetIdx |
|---|---|---|---|
| alf_ctb_flag[x0][y0][cIdx] | 0 | 0 | cIdx == 0 ? 0 : 1 |

A calculation formula for the selection of the context model is:

$$ctxInc = (condL \;\&\&\; availableL) + (condA \;\&\&\; availableA) + ctxSetIdx.$$

In the embodiment of the present disclosure, for the ALF indication information, the luma blocks needs to use three different context models, the CB chroma blocks share one context model, and the CR chroma blocks share one context model different from the all former context models. Thus, the number of the context models used for the ALF indication information may be reduced to 5, thereby reducing the complexity of coding/decoding and the memory overheads.

The Sixth Implementation of the ALF Mode

Figure 54:
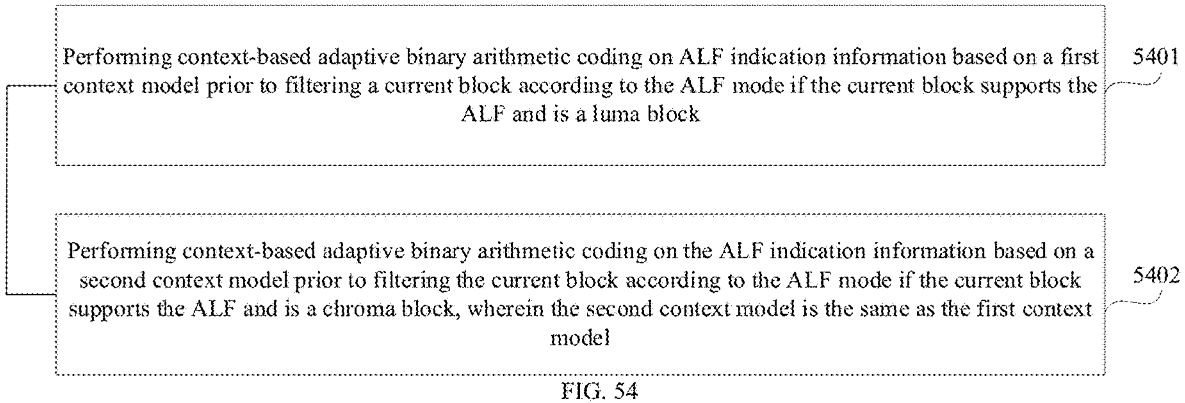
FIG. 54 is a flowchart of a coding method according to an embodiment of the present disclosure.

FIG. 54 is a flowchart of a coding method according to an embodiment of the present disclosure. The method is applicable to a coding terminal. As shown in FIG. 54, the method includes the following steps.

In 5401, context-based adaptive binary arithmetic coding is performed on ALF indication information based on a first context model prior to filtering a current block according to the ALF mode if the current block supports the ALF and is a luma block.

In 5402, context-based adaptive binary arithmetic coding is performed on the ALF indication information based on a second context model prior to filtering the current block according to the ALF mode if the current block supports the ALF and is a chroma block, wherein the second context model is the same as the first context model.

Figure 55:
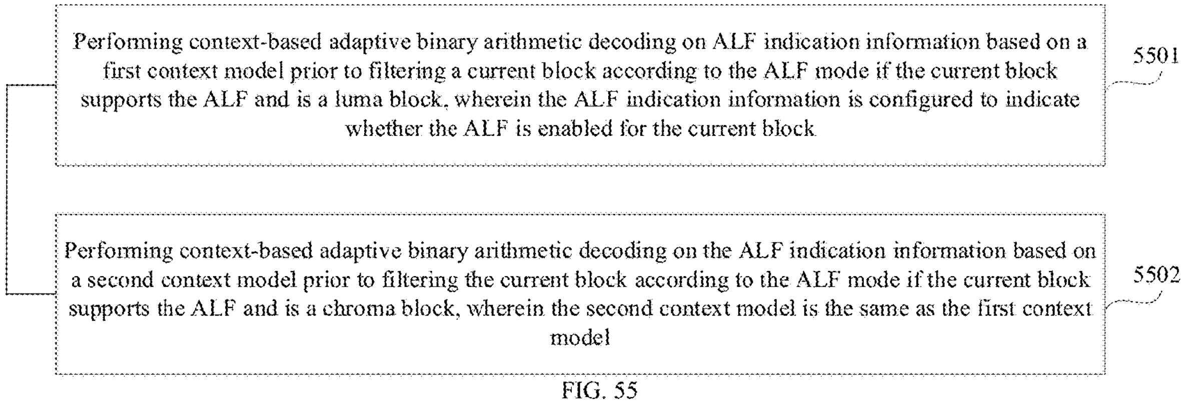
FIG. 55 is a flowchart of a decoding method according to an embodiment of the present disclosure.

FIG. 55 is a flowchart of a decoding method according to an embodiment of the present disclosure. The method is applicable to a decoding terminal and is a decoding method corresponding to the coding method shown in FIG. 54. As shown in FIG. 55, the method includes the following steps.

In 5501, context-based adaptive binary arithmetic decoding is performed on ALF indication information based on a first context model prior to filtering a current block according to the ALF mode if the current block supports the ALF and is a luma block, wherein the ALF indication information is configured to indicate whether the ALF is enabled for the current block.

In 5502, context-based adaptive binary arithmetic decoding is performed on the ALF indication information based on a second context model prior to filtering the current block according to the ALF mode if the current block supports the ALF and is a chroma block, wherein the second context model is the same as the first context model.

In the embodiment of the present disclosure, for the ALF indication information, the luma block, the CB chroma block and the CR chroma block share one context model. Thus, the number of the context models used for the ALF indication information may be reduced to 1, thereby reducing the complexity of coding/decoding and the memory overheads.

The Seventh Implementation of the ALF Mode

Figure 56:
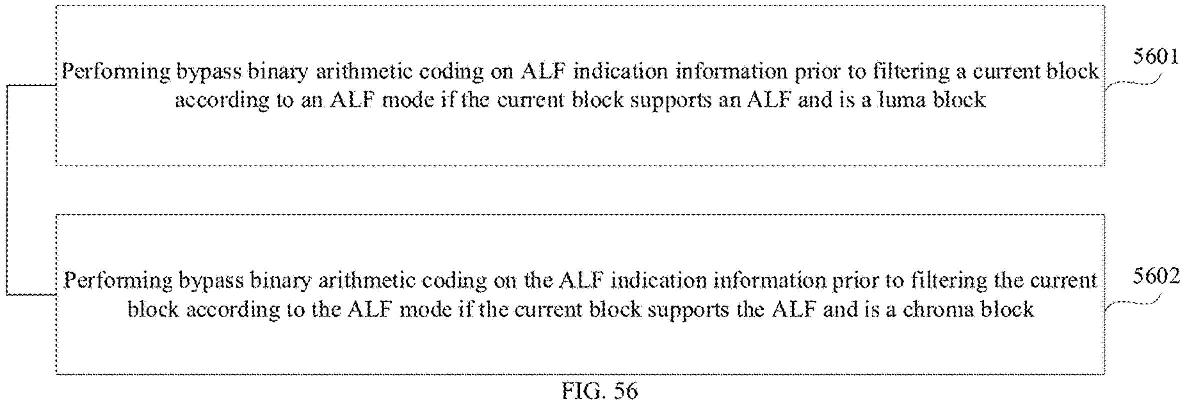
FIG. 56 is a flowchart of a coding method according to an embodiment of the present disclosure.

FIG. 56 is a flowchart of a coding method according to an embodiment of the present disclosure. The method is applicable to a coding terminal. As shown in FIG. 56, the method includes the following steps.

In 5601, bypass binary arithmetic coding is performed on ALF indication information prior to filtering a current block according to an ALF mode if the current block supports an ALF and is a luma block.

In 5602, bypass binary arithmetic coding is performed on the ALF indication information prior to filtering the current block according to the ALF mode if the current block supports the ALF and is a chroma block.

Figure 57:
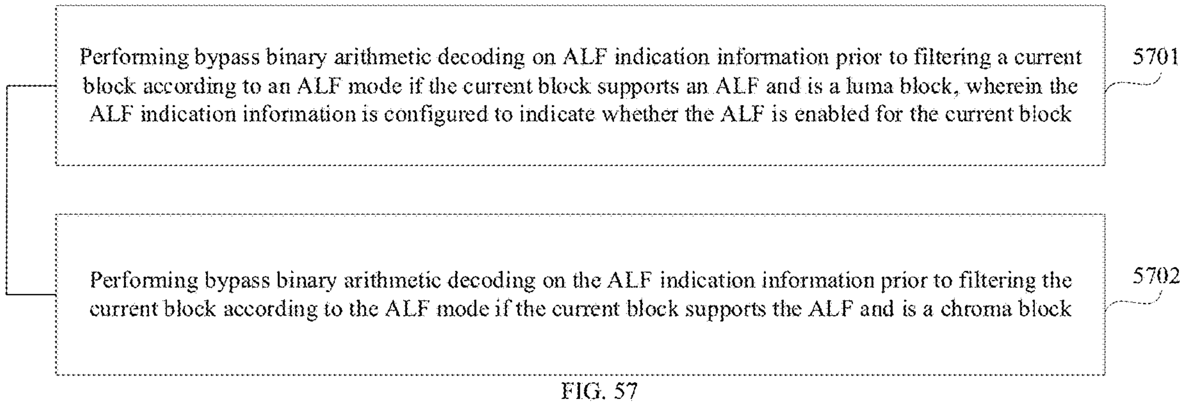
FIG. 57 is a flowchart of a decoding method according to an embodiment of the present disclosure.

FIG. 57 is a flowchart of a decoding method according to an embodiment of the present disclosure. The method is applicable to a decoding terminal and is a decoding method corresponding to the coding method shown in FIG. 56. As shown in FIG. 57, the method includes the following steps.

In 5701, bypass binary arithmetic decoding is performed on ALF indication information prior to filtering a current block according to an ALF mode if the current block supports an ALF and is a luma block, wherein the ALF indication information is configured to indicate whether the ALF is enabled for the current block.

In 5702, bypass binary arithmetic decoding is performed on the ALF indication information prior to filtering the current block according to the ALF mode if the current block supports the ALF and is a chroma block.

In the embodiment of the present disclosure, for the ALF indication information, when the current block is the luma block, the CB chroma block and the CR chroma block, the ALF indication information may be coded or decoded by the bypass binary arithmetic coding/decoding. Thus, the number of the context models used for the ALF indication information may be reduced to 0, thereby reducing the complexity of coding/decoding and the memory overheads.

The Eighth Implementation of the ALF Mode

Figure 58:
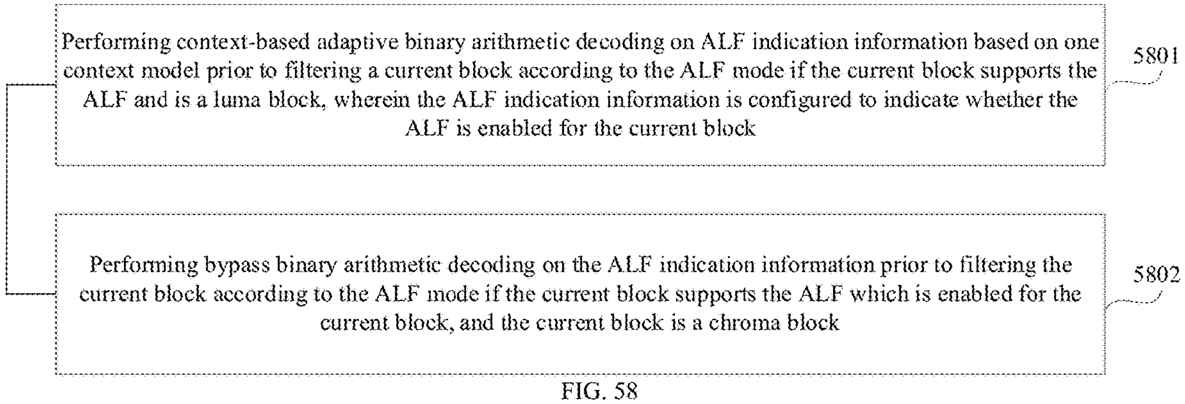
FIG. 58 is a flowchart of a coding method according to an embodiment of the present disclosure.

FIG. 58 is a flowchart of a coding method according to an embodiment of the present disclosure. The method is applicable to a coding terminal. As shown in FIG. 58, the method includes the following steps.

In 5801, context-based adaptive binary arithmetic coding is performed on ALF indication information based on one context model prior to filtering a current block according to the ALF mode if the current block supports the ALF and is a luma block, wherein the ALF indication information is configured to indicate whether the ALF is enabled for the current block.

In 5802, bypass binary arithmetic decoding is performed on the ALF indication information prior to filtering the current block according to the ALF mode if the current block supports the ALF which is enabled for the current block, and the current block is a chroma block.

The chroma block includes a CB chroma block and a CR chroma block.

Figure 59:
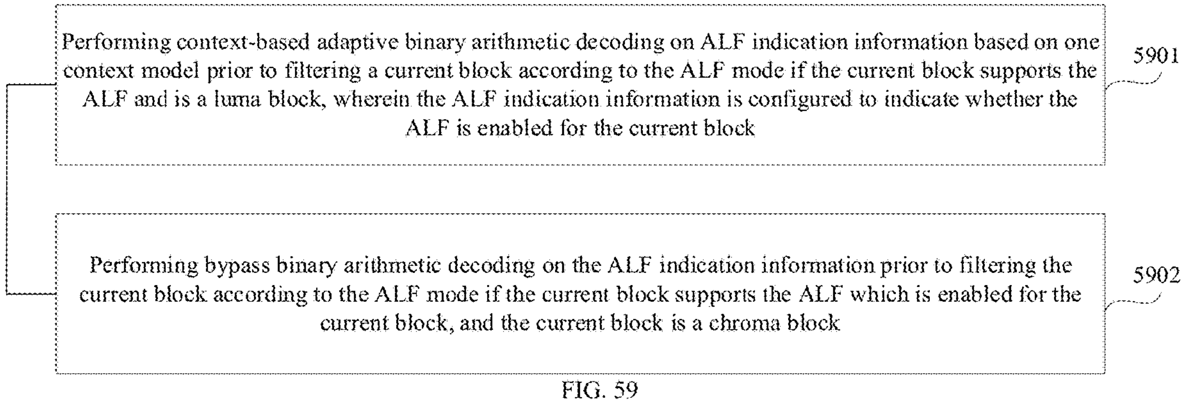
FIG. 59 is a flowchart of a decoding method according to an embodiment of the present disclosure.

FIG. 59 is a flowchart of a decoding method according to an embodiment of the present disclosure. The method is applicable to a decoding terminal and is a decoding method corresponding to the coding method shown in FIG. 58. As shown in FIG. 59, the method includes the following steps.

In 5901, context-based adaptive binary arithmetic decoding is performed on ALF indication information based on one context model prior to filtering a current block according to the ALF mode if the current block supports the ALF and is a luma block, wherein the ALF indication information is configured to indicate whether the ALF is enabled for the current block.

In 5902, bypass binary arithmetic decoding is performed on the ALF indication information prior to filtering the current block according to the ALF mode if the current block supports the ALF which is enabled for the current block, and the current block is a chroma block.

The chroma block includes a CB chroma block and a CR chroma block.

In the embodiment of the present disclosure, for the ALF indication information, the luma block uses one context model, and both the CB chroma block and the CR chroma block use the bypass binary arithmetic coding/decoding for coding or decoding. Thus, the number of the context models used for the ALF indication information may be reduced to 1, thereby reducing the complexity of coding/decoding and the memory overheads.

The Ninth Implementation of the ALF Mode

Figure 60:
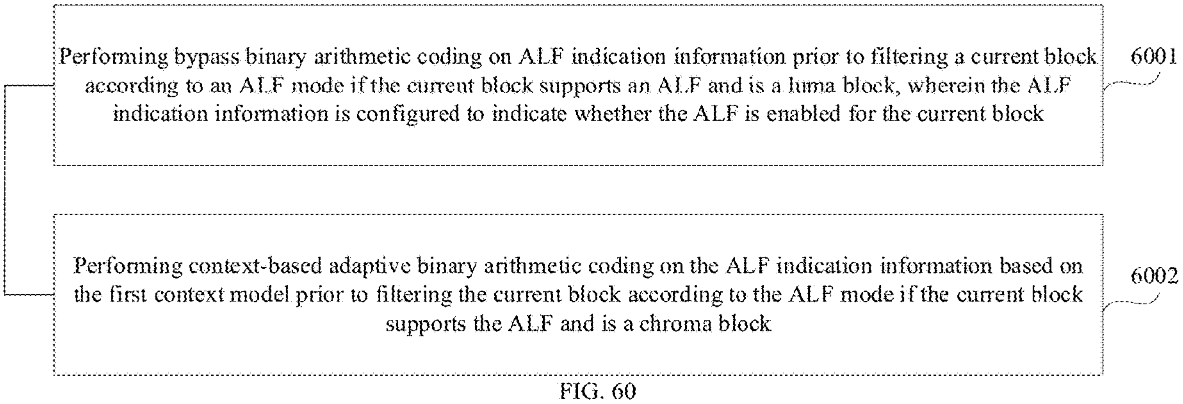
FIG. 60 is a flowchart of a coding method according to an embodiment of the present disclosure.

FIG. 60 is a flowchart of a coding method according to an embodiment of the present disclosure. The method is applicable to a coding terminal. As shown in FIG. 60, the method includes the following steps.

In 6001, bypass binary arithmetic coding is performed on ALF indication information prior to filtering a current block according to an ALF mode if the current block supports an ALF and is a luma block, wherein the ALF indication information is configured to indicate whether the ALF is enabled for the current block.

In 6002, context-based adaptive binary arithmetic coding is performed on the ALF indication information based on the first context model prior to filtering the current block according to the ALF mode if the current block supports the ALF and is a chroma block.

The chroma block includes a CB chroma block and a CR chroma block.

Figure 61:
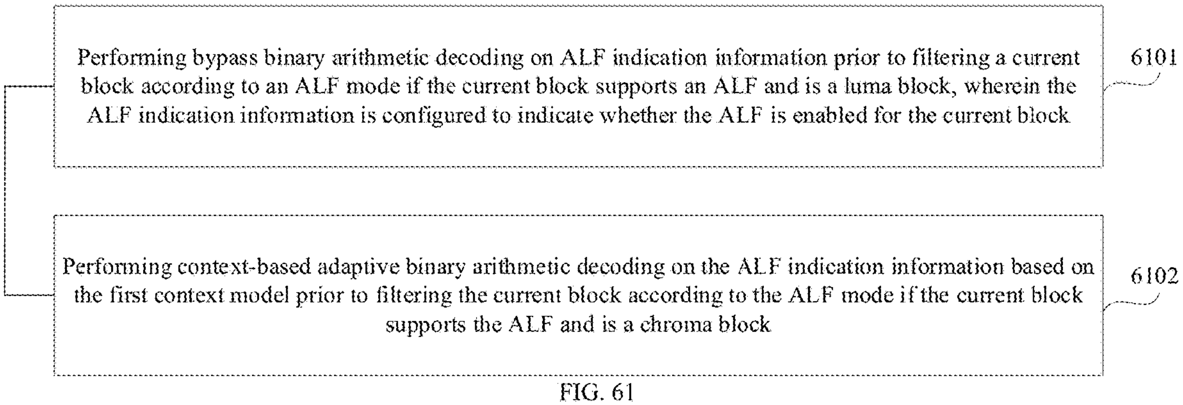
FIG. 61 is a flowchart of a decoding method according to an embodiment of the present disclosure.

FIG. 61 is a flowchart of a decoding method according to an embodiment of the present disclosure. The method is applicable to a decoding terminal and is a decoding method corresponding to the coding method shown in FIG. 60. As shown in FIG. 61, the method includes the following steps.

In 6101, bypass binary arithmetic decoding is performed on ALF indication information prior to filtering a current block according to an ALF mode if the current block supports an ALF and is a luma block, wherein the ALF indication information is configured to indicate whether the ALF is enabled for the current block.

In 6102, context-based adaptive binary arithmetic decoding is performed on the ALF indication information based on the first context model prior to filtering the current block according to the ALF mode if the current block supports the ALF and is a chroma block.

The chroma block includes a CB chroma block and the CR chroma block.

In the embodiment of the present disclosure, for the ALF indication information, the luma block uses the bypass binary arithmetic coding/decoding for coding or decoding, and the CB chroma block and the CR chroma block share one context model. Thus, the number of the context model used for the ALF indication information may be reduced to 1, thereby reducing the complexity of coding/decoding and the memory overheads.

MIP Mode

The syntax elements transmitted between the coding terminal and the decoding terminal further include MIP indication information which is configured to indicate whether a matrix-based intra prediction mode is enabled for a current block. In an exemplary embodiment, the MIP indication information is intra_MIP_flag.

In the related art, if the current block supports the matrix-based intra prediction mode, context-based adaptive binary arithmetic decoding is performed on the MIP indication information based on a target context model prior to predicting the current block according to the matrix-based intra prediction mode. The target context model is a context model selected from four different context models based on whether the matrix-based intra prediction mode is enabled for an upper block of the current block, whether the matrix-based intra prediction mode is enabled for a left block of the current block and whether the current block meets a preset size condition.

As an example, the preset size condition may be that the width of the current block is greater than twice its height, or the height of the current block is greater than twice its width. Of course, the preset size condition may be other conditions, and is not limited in the embodiment of the present disclosure.

Specifically, it is assumed that the above four different context models include a first context model, a second context model, a third context model, and a fourth context model. If the matrix-based intra prediction mode is enabled for both the upper block of the current block and the left block of the current block, and the current block does not meet the preset size condition, the target context model is the first context model. If the matrix-based intra prediction mode is enabled for the upper block of the current block, the matrix-based intra prediction mode is not enabled for the left block of the current block, and the current block does not meet the preset size condition, or if the matrix-based intra prediction mode is not enabled for the upper block of the current block, the matrix-based intra prediction mode is enabled for the left block of the current block, and the current block does not meet the preset size condition, the target context model is the second context model. If neither the upper block of the current block nor the matrix-based intra prediction mode is enabled for the left block of the current block, and the current block does not meet the preset size condition, the target context model is the third context model. If the current block meets the preset size condition, the target context model is the fourth context model.

It can be seen from the above that in the MIP mode, the MIP indication information needs to use four different context models, resulting in high memory overheads.

The First Implementation in the MIP Mode

Figure 62:
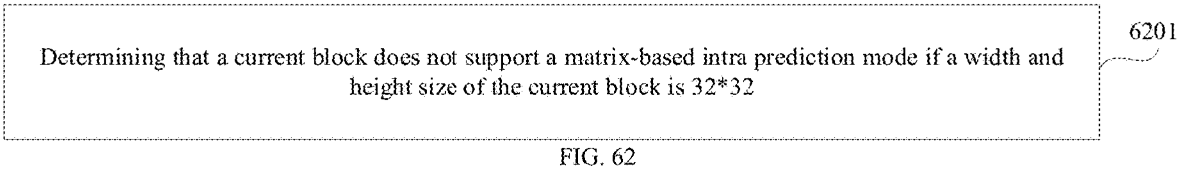
FIG. 62 is a flowchart of a coding/decoding method according to an embodiment of the present disclosure.

FIG. 62 is a flowchart of a coding/decoding method according to an embodiment of the present disclosure. The method is applicable to a coding terminal or a decoding terminal. As shown in FIG. 62, the method includes the following steps.

In 6201, it is determined that a current block does not support a matrix-based intra prediction mode if a width and height size of the current block is 32*32.

The current block is a luma block or a chroma block. For example, if the current block is a luma block, and the width and height size of the current block is 32*32, the current block does not support the matrix-based intra prediction mode.

As another example, if the width and height size of the current block is 32*16, the current block does not support the matrix-based intra prediction mode. In an exemplary embodiment, the current block is a luma block or a chroma block.

As another example, if the width and height size of the current block is 4*4, the current block does not support the matrix-based intra prediction mode. In an exemplary embodiment, the current block is the luma block or the chroma block.

In the embodiment of the present disclosure, it can be guaranteed that when the current block is a large-size block, the current block does not support the matrix-based intra prediction mode, that is, the matrix-based intra prediction mode cannot be enabled for the current block. Thus, the calculation complexity can be reduced.

The Second Implementation in the MIP Mode

Figure 63:
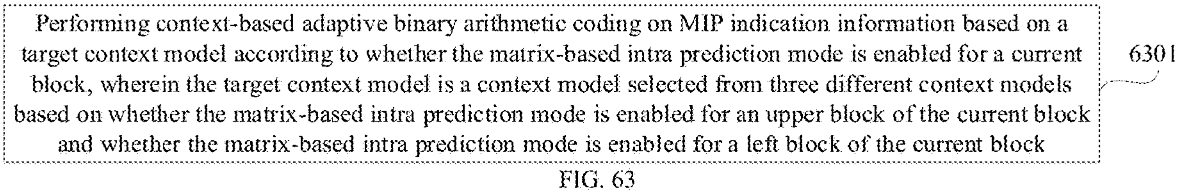
FIG. 63 is a flowchart of a coding/decoding method according to an embodiment of the present disclosure.

FIG. 63 is a flowchart of a coding/decoding method according to an embodiment of the present disclosure. The method is applicable to a coding terminal. As shown in FIG. 63, if a current block supports the matrix-based intra prediction mode, the method includes the following steps.

In 6301, context-based adaptive binary arithmetic coding is performed on MIP indication information based on a target context model according to whether the matrix-based intra prediction mode is enabled for the current block, wherein the target context model is a context model selected from three different context models based on whether the matrix-based intra prediction mode is enabled for an upper block of the current block and whether the matrix-based intra prediction mode is enabled for a left block of the current block.

As an example, it is assumed that the above three different context models include a first context model, a second context model, and a third context model. If the matrix-based intra prediction mode is enabled for both the upper block of the current block and the left block of the current block, the target context model is the first context model. If the matrix-based intra prediction mode is enabled for the upper block of the current block and the matrix-based intra prediction mode is not enabled for the left block of the current block, or if the matrix-based intra prediction mode is not enabled for the upper block of the current block and the matrix-based intra prediction mode is enabled for the left block of the current block, the target context model is the second context model. If neither the upper block of the current block nor the matrix-based intra prediction mode is enabled for the left block of the current block, the target context model is the third context model.

As an example, if the coding terminal determines that the current block meets a matrix-based intra prediction condition, the coding terminal may determine whether the MIP mode is enabled for the current block through RDO, namely, whether to use the matrix-based intra prediction method, and may code the MIP indication information in the coded stream to inform the decoding terminal whether to enable the MIP mode.

In the coded stream, the above MIP indication information is coded according to a specific situation. In addition, if the MIP mode is enabled for the current block, other syntax elements related to MIP need to be coded.

Figure 64:
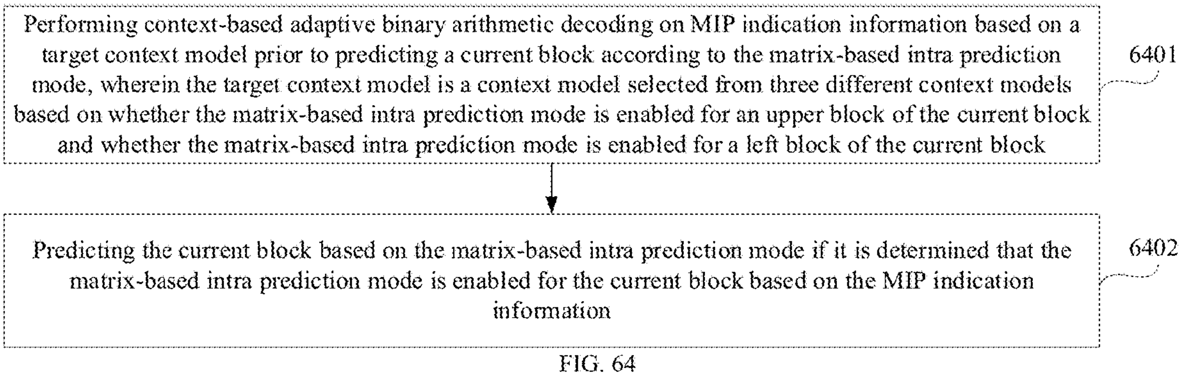
FIG. 64 is a flowchart of a coding/decoding method according to an embodiment of the present disclosure.

FIG. 64 is a flowchart of a coding/decoding method according to an embodiment of the present disclosure. The method is applicable to a decoding terminal and is a decoding method corresponding to the coding method shown in FIG. 63. As shown in FIG. 64, if a current block supports the matrix-based intra prediction mode, the method includes the following steps.

In 6401, context-based adaptive binary arithmetic decoding is performed on MIP indication information based on a target context model prior to predicting the current block according to the matrix-based intra prediction mode, wherein the target context model is a context model selected from three different context models based on whether the matrix-based intra prediction mode is enabled for an upper block of the current block and whether the matrix-based intra prediction mode is enabled for a left block of the current block.

As an example, it is assumed that the above three different context models include a first context model, a second context model, and a third context model. If the matrix-based intra prediction mode is enabled for both the upper block of the current block and the left block of the current block, the target context model is the first context model. If the matrix-based intra prediction mode is enabled for the upper block of the current block and the matrix-based intra prediction mode is not enabled for the left block of the current block, or if the matrix-based intra prediction mode is not enabled for the upper block of the current block and the matrix-based intra prediction mode is enabled for the left block of the current block, the target context model is the second context model. If neither the upper block of the current block nor the matrix-based intra prediction mode is enabled for the left block of the current block, the target context model is the third context model.

In 6402, the current block is predicated based on the matrix-based intra prediction mode if it is determined that the matrix-based intra prediction mode is enabled for the current block based on the MIP indication information.

As an example, the decoding terminal receives the coded stream, and analyzes the MIP indication information if it is determined that the current block meets an analytic condition, so as to determine whether the MIP mode is enabled for the current block. The analytic condition includes: the current block is a luma block, and the current block size meets a certain condition. Of course, the analytic condition is not limited to the above conditions, and may also include others.

The decoding terminal may determine whether the prediction mode of the current block is the matrix-based intra prediction mode through the MIP indication information. If the prediction mode of the current block is the matrix-based intra prediction mode, the decoding terminal may continue to analyze other syntax related to the mode to acquire its prediction mode information, and thus acquires the predicted value.

In the embodiment of the present disclosure, regardless of the size condition of the current block in the MIP mode, one context model is selected from three different context models only based on whether the matrix-based intra-prediction mode is enabled for the upper block of the current block and whether the matrix-based intra-prediction mode is enabled for the left block of the current block. Thus, the number of the context models required for the MIP indication information may be reduced to 3, thereby reducing the complexity of coding/decoding and the memory overheads.

The Third Implementation in the MIP Mode

Figure 65:
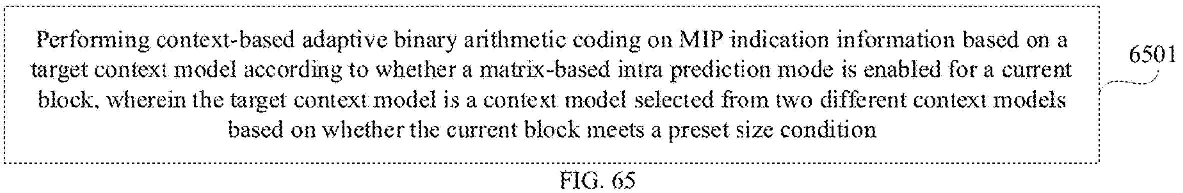
FIG. 65 is a flowchart of a coding/decoding method according to an embodiment of the present disclosure.

FIG. 65 is a flowchart of a coding/decoding method according to an embodiment of the present disclosure. The method is applicable to a coding terminal. As shown in FIG. 65, if a current block supports the matrix-based intra prediction mode, the method includes the following steps.

In 6501, context-based adaptive binary arithmetic coding is performed on MIP indication information based on a target context model according to whether the matrix-based intra prediction mode is enabled for the current block, wherein the target context model is a context model selected from two different context models based on whether the current block meets a preset size condition.

The preset size condition may be that the width of the current block is greater than twice its height, or the height of the current block is greater than twice its width.

As an example, it is assumed that the above two different context models include a first context model, and a second context model. If the size of the current block meets the preset size condition, the target context model is the first context model. If the size of the current block does not meet the preset size condition, the target context model is the second context model.

Figure 66:
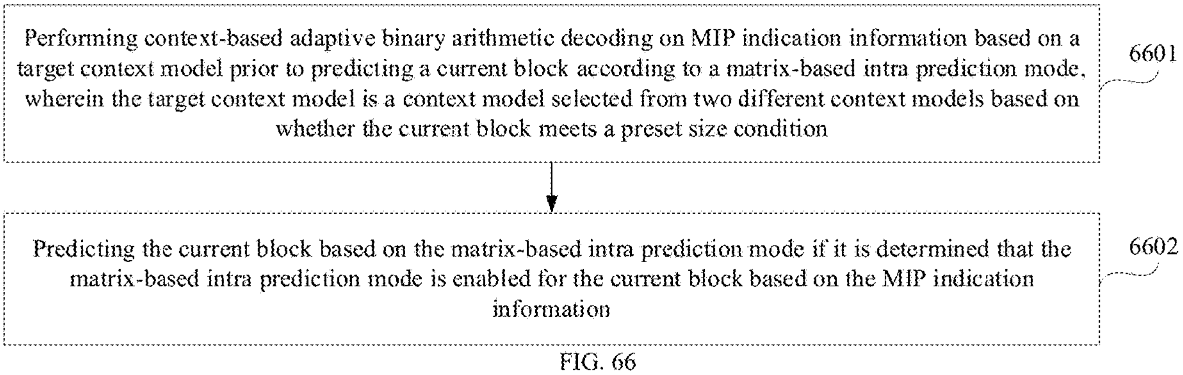
FIG. 66 is a flowchart of a coding/decoding method according to an embodiment of the present disclosure.

FIG. 66 is a flowchart of a coding/decoding method according to an embodiment of the present disclosure. The method is applicable to a decoding terminal and is a decoding method corresponding to the coding method shown in FIG. 65. As shown in FIG. 66, if a current block supports the matrix-based intra prediction mode, the method includes the following steps.

In 6601, context-based adaptive binary arithmetic decoding is performed on MIP indication information based on a target context model prior to predicting the current block according to the matrix-based intra prediction mode, wherein the target context model is a context model selected from two different context models based on whether the current block meets a preset size condition.

The preset size condition may be that the width of the current block is greater than twice its height, or the height of the current block is greater than twice its width.

As an example, it is assumed that the above two different context models include a first context model, and a second context model. If the size of the current block meets the preset size condition, the target context model is the first context model. If the size of the current block does not meet the preset size condition, the target context model is the second context model.

In 6602, the current block is predicated based on the matrix-based intra prediction mode if it is determined that the matrix-based intra prediction mode is enabled for the current block based on the MIP indication information.

In the embodiment of the present disclosure, for the selection of the context model for the MIP indication information in the MIP mode, the context model may be selected only according to the size condition without considering whether the matrix-based intra prediction mode is enabled for the upper block of the current block or whether the matrix-based intra prediction mode is enabled for the left block of the current block. Thus, the number of the context models required for the MIP indication information may be reduced to 2, thereby reducing the complexity of coding/decoding and the memory overheads.

The Fourth Implementation in the MIP Mode

Figure 67:
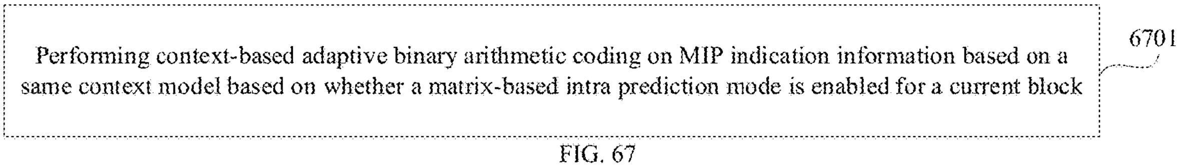
FIG. 67 is a flowchart of a coding/decoding method according to an embodiment of the present disclosure.

FIG. 67 is a flowchart of a coding/decoding method according to an embodiment of the present disclosure. The method is applicable to a coding terminal. As shown in FIG. 67, if a current block supports the matrix-based intra prediction mode, the method includes the following steps.

In 6701, context-based adaptive binary arithmetic coding is performed on MIP indication information based on a same context model according to whether the matrix-based intra prediction mode is enabled for the current block.

Figure 68:
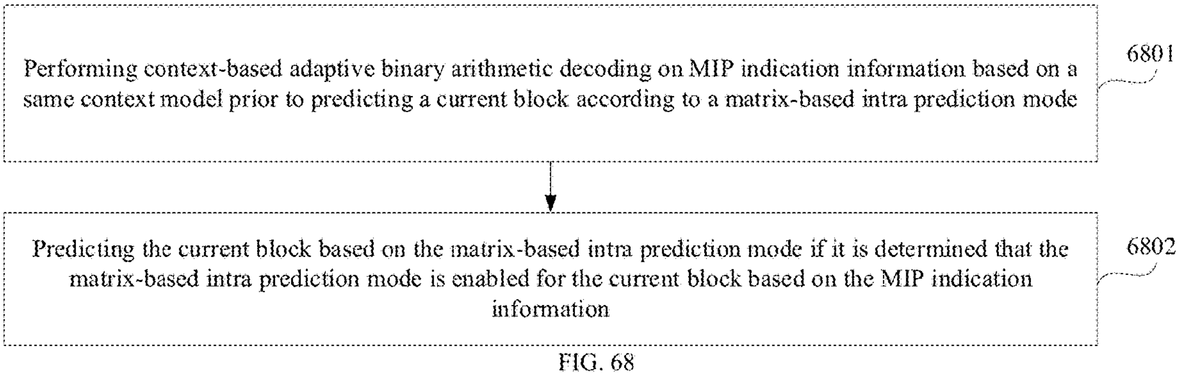
FIG. 68 is a flowchart of a coding/decoding method according to an embodiment of the present disclosure.

FIG. 68 is a flowchart of a decoding method according to an embodiment of the present disclosure. The method is applicable to a decoding terminal and is a decoding method corresponding to the coding method shown in FIG. 67. As shown in FIG. 68, if a current block supports the matrix-based intra prediction mode, the method includes the following steps.

In 6801, context-based adaptive binary arithmetic decoding is performed on MIP indication information based on a same context model prior to predicting the current block according to the matrix-based intra prediction mode.

In 6802, the current block is predicated based on the matrix-based intra prediction mode if it is determined that the matrix-based intra prediction mode is enabled for the current block based on the MIP indication information.

In the embodiment of the present disclosure, for the selection of the context model for the MIP indication information in the MIP mode, the context-based adaptive binary arithmetic coding or decoding is performed on the MIP indication information based on the same context model under different conditions without considering whether the matrix-based intra prediction mode is enabled for the upper block of the current block or whether the matrix-based intra prediction mode is enabled for the left block of the current block and without considering the size condition. Thus, the number of the context models required for the MIP indication information may be reduced to 1, thereby reducing the complexity of coding/decoding and the memory overheads.

The Fifth Implementation in the MIP Mode

Figure 69:
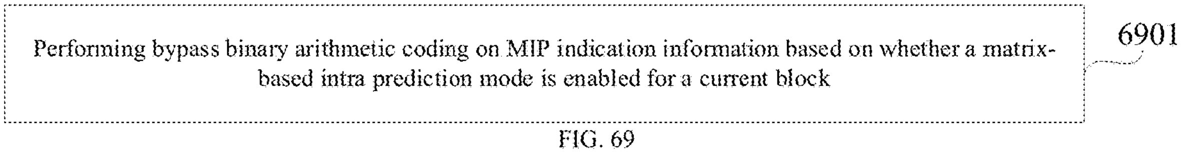
FIG. 69 is a flowchart of a coding/decoding method according to an embodiment of the present disclosure.

FIG. 69 is a flowchart of a coding/decoding method according to an embodiment of the present disclosure. The method is applicable to a coding terminal. As shown in FIG. 69, if a current block supports the matrix-based intra prediction mode, the method includes the following steps.

In 6901, bypass binary arithmetic coding is performed on MIP indication information based on whether the matrix-based intra prediction mode is enabled for the current block.

Figure 70:
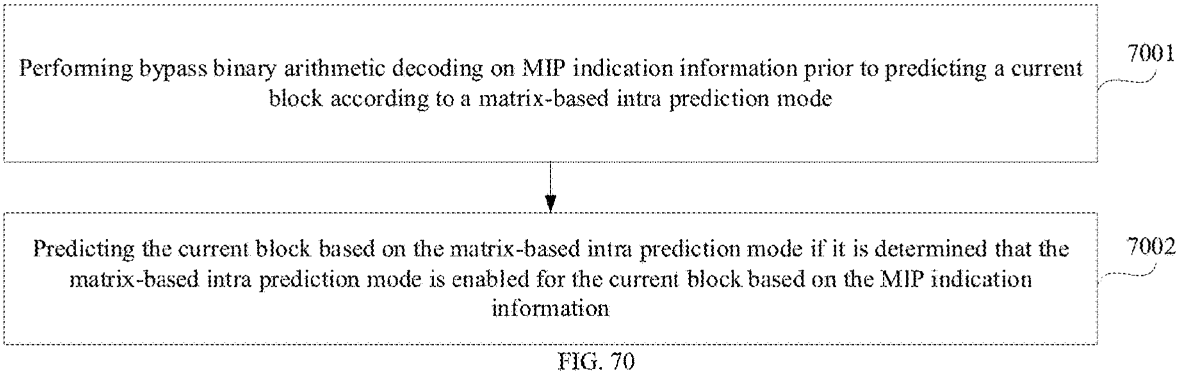
FIG. 70 is a flowchart of a coding/decoding method according to an embodiment of the present disclosure.

FIG. 70 is a flowchart of a decoding method according to an embodiment of the present disclosure. The method is applicable to a decoding terminal and is a decoding method corresponding to the coding method shown in FIG. 69. As shown in FIG. 70, if a current block supports the matrix-based intra prediction mode, the method includes the following steps.

In 7001, bypass binary arithmetic decoding is performed on MIP indication information prior to predicting the current block according to the matrix-based intra prediction mode.

In 7002, the current block is predicated based on the matrix-based intra prediction mode if it is determined that the matrix-based intra prediction mode is enabled for the current block based on the MIP indication information.

In the embodiment of the present disclosure, in the MIP mode, the bypass binary arithmetic coding or decoding is performed on the MIP indication information, that is, the context-based adaptive binary arithmetic coding or decoding is not used, under different conditions without considering whether the matrix-based intra prediction mode is enabled for the upper block of the current block or whether the matrix-based intra prediction mode is enabled for the left block of the current block and without considering the size condition. Thus, the number of the context models required for the MIP indication information may be reduced to 0, thereby reducing the complexity of coding/decoding and the memory overheads.

It should be noted that the current block or image block described in the embodiment of the present disclosure may also be another processing unit at the sequence level, the picture parameter set, or the block level, which is not limited in the embodiment of the present disclosure.

Figure 71:
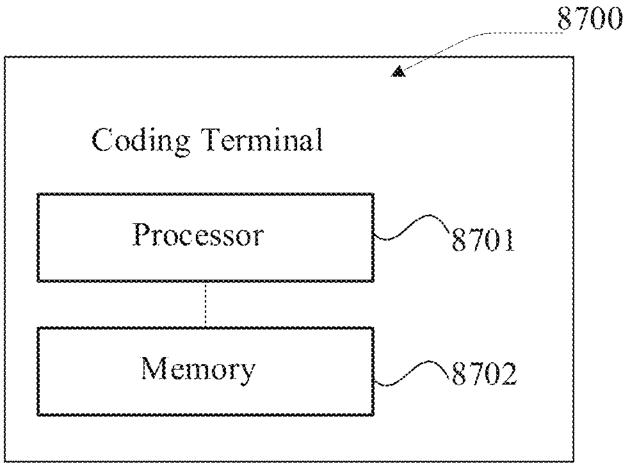
FIG. 71 is a schematic structural diagram of a coding terminal according to an embodiment of the present disclosure.

FIG. 71 is a schematic structural diagram of a coding terminal 8700 according to an embodiment of the present disclosure. The coding terminal 8700 may vary greatly due to different configurations or performances, and may include one or more central processing units (CPUs) 8701 and one or more memories 8702 storing at least one instruction therein, wherein the at least one instruction, when loaded and executed by the CPU 8701, causes the CPU 8701 to implement any of the coding methods provided by the above method embodiments. Of course, the coding terminal 8700 may also have a wired or wireless network interface, a keyboard, an input/output interface, and other components for facilitating input and output. The coding terminal 8700 may also include other components for implementing device functions, which are not repeated herein.

Figure 72:
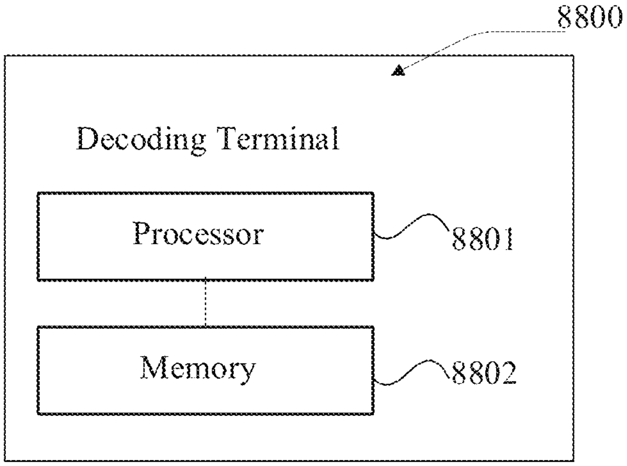
FIG. 72 is a schematic structural diagram of a decoding terminal according to an embodiment of the present disclosure.

FIG. 72 is a schematic structural diagram of a decoding terminal 8800 according to an embodiment of the present disclosure. The decoding terminal 8800 may vary greatly due to different configurations or performances, and may include one or more central processing units (CPUs) 8801 and one or more memories 8802 storing at least one instruction therein, wherein the at least one instruction, when loaded and executed by the CPU 8801, causes the CPU 8701 to implement any of the decoding methods provided by the above method embodiments. Of course, the decoding terminal 8800 may also have a wired or wireless network interface, a keyboard, an input/output interface, and other components for facilitating input and output. The coding terminal 8800 may also include other components for implementing device functions, which are not repeated herein.

In another embodiment, a computer-readable storage medium storing an instruction therein is further provided, wherein the instruction, when executed by a processor, causes the processor to execute any one of the above coding methods, decoding methods or coding/decoding methods.

In another embodiment, a computer program product including instruction therein is further provided, wherein the instruction, when run on a computer, causes the computer to execute any one of the above coding methods, decoding methods or coding/decoding methods.

It should be understood by those skilled in the art that all or part of the steps in the above each of the embodiments may be completed by hardware or by a program instructing relevant hardware. The program may be stored in a computer-readable storage medium such as an ROM, a magnetic disk, an optical disc, or the like.

The above description is only preferred embodiments of the present disclosure, and is not intended to limit the present disclosure. Any modifications, equivalent replacements, improvements and the like made within the spirit and principles of the present disclosure should be included within the scope of protection of the present disclosure.

What is claimed is:

1. A decoding method, comprising:

predicting, when a multi-reference line prediction mode is enabled for a current block, the current block based on a target reference line when the current block is predicted according to the multi-reference line prediction mode, wherein the target reference line is determined based on reference line indication information;

wherein the reference line indication information is configured to indicate index information of the target reference line used in predicting the current block based on the multi-reference line prediction mode, and the target reference line is one line selected from candidate reference lines, wherein the number of the candidate reference lines corresponding to the multi-reference line prediction mode is 3, and three lines and three columns closest to a boundary of the current block are used as the candidate reference lines; and the reference line indication information occupies at most 2 bits, and the 2 bits are decoded using a first context model and a second context model, wherein a first bit of the reference line indication information is decoded based on the first context model, a second bit of the reference line indication information is decoded based on the second context model when decoding of the second bit of the reference line indication information is required, and the first context model is different from the second context model.

2. The method according to claim 1, wherein the line is one of a line on an upper side of the current block and a column on a left side of the current block.

3. The method according to claim 1, wherein the three lines and the three columns closest to the boundary of the current block being used as the candidate reference lines, comprises:

a 0th line, a first line and a second line being used as the candidate reference lines, wherein the 0th line is a line adjacent to a boundary of the current block, the first line is a line next adjacent to the boundary of the current block, and the second line is a line adjacent to the first line.

4. The method according to claim 1, wherein when a candidate reference line having index information of 0 is a 0th line, a candidate reference line having index information of 1 is a first line, and a candidate reference line having index information of 2 is a second line, the target reference line being determined based on reference line indication information comprises:

the target reference line being the 0th line when the index information indicated by the reference line indication information is 0;

the target reference line being the first line when the index information indicated by the reference line indication information is 1; and the target reference line being the second line when the index information indicated by the reference line indication information is 2.

5. The method according to claim 1, wherein the three lines and the three columns closest to the boundary of the current block being used as the candidate reference lines, comprises: a 0th line, a first line, a second line, a 0th column, a first column and a second column being used as the candidate reference lines; wherein the 0th line is a line adjacent to an upper boundary of the current block, the first line is a line next adjacent to the upper boundary of the current block, the second line is a line adjacent to the first line; the 0th column is a column adjacent to a left boundary of the current block, the first column is a column next adjacent to the left boundary of the current block, the second column is a column adjacent to the first column; the target reference line being determined based on reference line indication information comprises: the target reference line being the 0th line and 0th column when the index information indicated by the reference line indication information is 0; the target reference line being the first line and the first column when the index information indicated by the reference line indication information is 1; and the target reference line being the second line and the second column when the index information indicated by the reference line indication information is 2.

6. The method according to claim 5, wherein the multi-reference line prediction mode is used to predict the current block based on reference pixels of the current block, wherein the reference pixels used to predict the current block derive from one of the 0th line and the 0th column when the target reference line is the 0th line and the 0th column, the reference pixels used to predict the current block derive from one of the first line and the first column when the target reference line is the first line and the first column, and the reference pixels used to predict the current block derive from one of the second line and the second column when the target reference line is the second line and the second column.

7. The method according to claim 1, further comprising:

determining whether the current block meets a condition of supporting multi-reference line prediction technology;

determining that the multi-reference line prediction mode is enabled for the current block when the current block meets the condition of supporting multi-reference line prediction technology; wherein the condition of supporting multi-reference line prediction technology comprises: the current block is a luma intra block, a size of the current block meets a certain restriction, and the current block does not include a first line of a coding tree unit.

8. The method according to claim 1, wherein the multi-reference line prediction mode is used to predict the current block based on reference pixels of the current block, wherein the reference pixels used to predict the current block derive from the target reference line of the current block.

9. The method according to claim 1, wherein the index information of the target reference line is represented by intra_luma_ref_idx.

10. A coding method, comprising:

determining a target reference line used in predicting the current block based on a multi-reference line prediction mode;

coding a first bit of reference line indication information based on a first context model; and coding a second bit of the reference line indication information based on a second context model when coding of the second bit of the reference line indication information is required;

wherein the reference line indication information occupies at most 2 bits, the 2 bits are coded using the first context model and the second context model, the first context model is different from the second context model, and the reference line indication information is configured to indicate index information of the target reference line used in predicting the current block based on the multi-reference line prediction mode; wherein the target reference line is one line selected from candidate reference lines based on the index information in the reference line indication information, wherein the number of the candidate reference lines corresponding to the multi-reference line prediction mode is 3, and three lines and three columns closest to a boundary of the current block are used as the candidate reference lines.

11. The method according to claim 10, wherein the line is one of a line on an upper side of the current block and a column on a left side of the current block.

12. The method according to claim 10, wherein the 0th line is a line adjacent to a boundary of the current block, the first line is a line next adjacent to the boundary of the current block, and the second line is a line adjacent to the first line; and when a candidate reference line having index information of 0 is the 0th line, a candidate reference line having index information of 1 is the first line, and a candidate reference line having index information of 2 is the second line, the target reference line being one line selected from the candidate reference lines based on the index information in the reference line indication information comprises:

the target reference line being the 0th line when the index information indicated by the reference line indication information is 0;

the target reference line being the first line when the index information indicated by the reference line indication information is 1; and the target reference line being the second line when the index information indicated by the reference line indication information is 2.

13. The method according to claim 10, wherein the three lines and the three columns closest to the boundary of the current block being used as the candidate reference lines, comprises: a 0th line, a first line, a second line, a 0th column, a first column and a second column being used as the candidate reference lines; wherein the 0th line is a line adjacent to an upper boundary of the current block, the first line is a line next adjacent to the upper boundary of the current block, the second line is a line adjacent to the first line; the 0th column is a column adjacent to a left boundary of the current block, the first column is a column next adjacent to the left boundary of the current block, the second column is a column adjacent to the first column; the target reference line being determined based on reference line indication information comprises: the target reference line being the 0th line and 0th column when the index information indicated by the reference line indication information is 0; the target reference line being the first line and the first column when the index information indicated by the reference line indication information is 1; and the target reference line being the second line and the second column when the index information indicated by the reference line indication information is 2.

14. The method according to claim 13, wherein the multi-reference line prediction mode is used to predict the current block based on reference pixels of the current block, wherein the reference pixels used to predict the current block derive from one of the 0th line and the 0th column when the target reference line is the 0th line and the 0th column, the reference pixels used to predict the current block derive from one of the first line and the first column when the target reference line is the first line and the first column, and the reference pixels used to predict the current block derive from one of the second line and the second column when the target reference line is the second line and the second column.

15. The method according to claim 10, further comprising:

determining whether the current block meets a condition of supporting multi-reference line prediction technology;

determining that the multi-reference line prediction mode is enabled for the current block when the current block meets the condition of supporting multi-reference line prediction technology; wherein the condition of supporting multi-reference line prediction technology comprises: the current block is a luma intra block, a size of the current block meets a certain restriction, and the current block does not include a first line of a coding tree unit.

16. A decoding device comprising a processor and a non-transitory computer-readable storage medium, wherein the storage medium stores computer-executable instructions capable of being executed by the processor; and the processor is configured to execute the computer-executable instructions to:

predict, when a multi-reference line prediction mode is enabled for a current block, the current block based on a target reference line when the current block is predicted according to the multi-reference line prediction mode, wherein the target reference line is determined based on reference line indication information;

wherein the reference line indication information is configured to indicate index information of the target reference line used in predicting the current block based on the multi-reference line prediction mode, and the target reference line is one line selected from candidate reference lines, wherein the number of the candidate reference lines corresponding to the multi-reference line prediction mode is 3, and three lines and three columns closest to a boundary of the current block are used as the candidate reference lines; and the reference line indication information occupies at most 2 bits, and the 2 bits are decoded using a first context model and a second context model, wherein a first bit of the reference line indication information is decoded based on the first context model, a second bit of the reference line indication information is decoded based on the second context model when decoding of the second bit of the reference line indication information is required, and the first context model is different from the second context model.

17. A coding device comprising a processor and a non-transitory computer-readable storage medium, wherein the storage medium stores computer-executable instructions capable of being executed by the processor; and the processor is configured to execute the computer-executable instructions to perform the method according to claim 10.

18. A non-transitory computer-readable storage medium storing an instruction therein, wherein the instruction, when executed by a processor, causes the processor to perform the method according to claim 1.

* * * * *